United States Patent [19]
Tanaka et al.

[11] Patent Number: 5,230,409
[45] Date of Patent: Jul. 27, 1993

[54] FLUID POWER TRANSMISSION SYSTEM WITH LOCK-UP CLUTCH

[75] Inventors: Koichi Tanaka, Mishima; Kiyohito Murata, Susono, both of Japan

[73] Assignee: Toyota Jidosha Kabushiki Kaisha, Toyota, Japan

[21] Appl. No.: 766,420

[22] Filed: Sep. 25, 1991

[30] Foreign Application Priority Data

| Sep. 27, 1990 | [JP] | Japan | 2-258273 |
| Oct. 24, 1990 | [JP] | Japan | 2-286771 |
| Oct. 31, 1990 | [JP] | Japan | 2-294128 |
| Oct. 31, 1990 | [JP] | Japan | 2-294129 |
| Nov. 6, 1990 | [JP] | Japan | 2-300205 |

[51] Int. Cl.$^5$ .................................. F16H 45/02
[52] U.S. Cl. .................. 192/3.28; 192/106.1; 192/106.2; 464/24; 464/67
[58] Field of Search ............ 192/3.28, 3.29, 3.3, 192/58 B, 106.1, 106.2; 464/24, 66, 67

[56] References Cited

U.S. PATENT DOCUMENTS

| 4,423,803 | 1/1984 | Malloy | 192/3.29 |
| 4,466,518 | 8/1984 | Mueller | 192/3.29 |
| 4,473,145 | 9/1984 | Bopp | 192/3.29 |
| 4,493,406 | 1/1985 | Bopp | 192/3.28 X |
| 4,540,076 | 9/1985 | Bopp | 192/58 B |
| 4,557,357 | 12/1985 | Tinholt | 192/3.21 |
| 4,564,094 | 1/1986 | Storz | 192/58 B |
| 4,739,866 | 4/1988 | Reik et al. | 192/106.2 X |
| 5,044,477 | 9/1991 | Bojas et al. | 192/106.2 X |
| 5,072,818 | 12/1991 | Kuhne | 192/106.1 |
| 5,097,722 | 3/1992 | Fukushima | 192/106.2 X |
| 5,119,693 | 6/1992 | Naudin et al. | 192/106.2 X |

FOREIGN PATENT DOCUMENTS

| 2848748 | 5/1980 | Fed. Rep. of Germany ... 192/106.2 |
| 3329420 | 2/1985 | Fed. Rep. of Germany . |
| 57-28944 | 2/1982 | Japan . |
| 58-34262 | 2/1983 | Japan . |
| 61-157746 | 9/1986 | Japan . |
| 61-252964 | 11/1986 | Japan . |
| 62-45459 | 3/1987 | Japan . |

Primary Examiner—Richard M. Lorence
Attorney, Agent, or Firm—Kenyon & Kenyon

[57] ABSTRACT

A torque converter wherein a fluid flow established by a pump impeller is fed to rotate a turbine runner, wherein a lock-up clutch to be engaged with and released from a first member integrated with the pump impeller is connected to an annular drive member, and wherein an annular driven member arranged to face the drive member and made rotatable relative to the drive member is connected to a second member integrated with the turbine runner, whereby torque is transmitted between the drive member and the driven member. The torque converter comprises: a plurality of first projections arranged at a circumferentially constant clearance on one of the surfaces of the drive member and the driven member facing each other and having a predetermined circumferential length; a plurality of second projections arranged at a circumferentially constant clearance on the other of the surfaces of the drive member and the driven member facing each other and having a predetermined circumferential length for meshing with the first projections at a radially slight clearance; damper springs arranged between the first projections or the second projections and adapted to be compressed by the first projections and the second projections; and a viscous fluid confined between the first projections and the second projections.

35 Claims, 32 Drawing Sheets

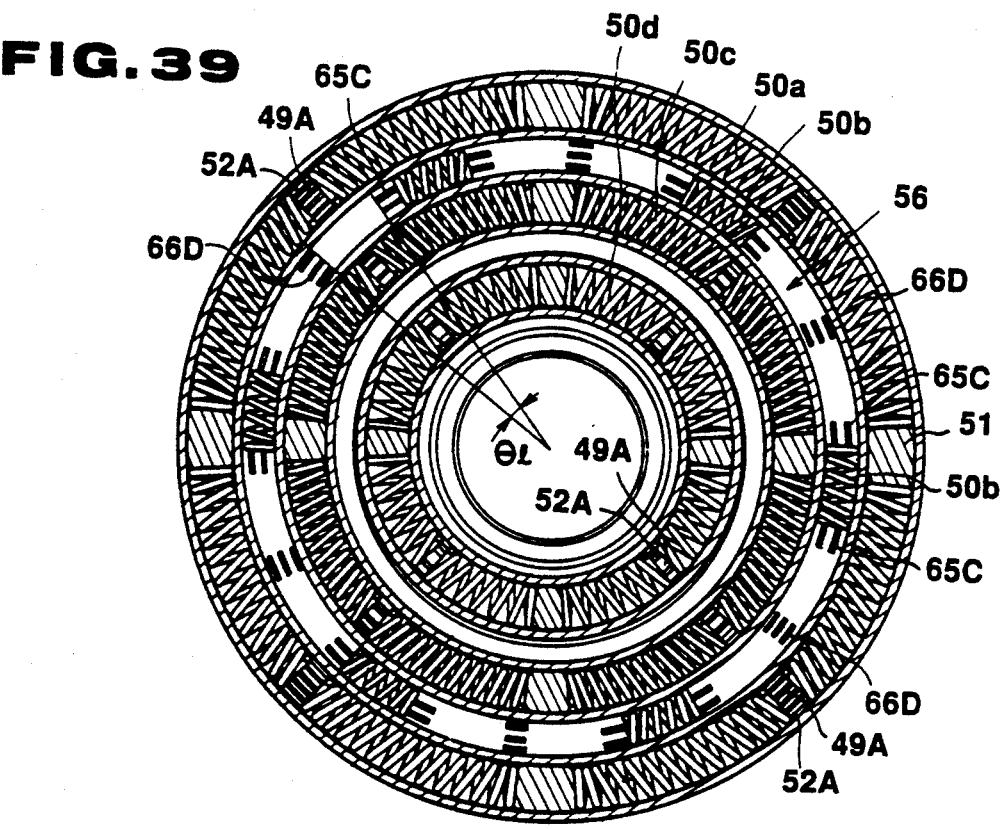
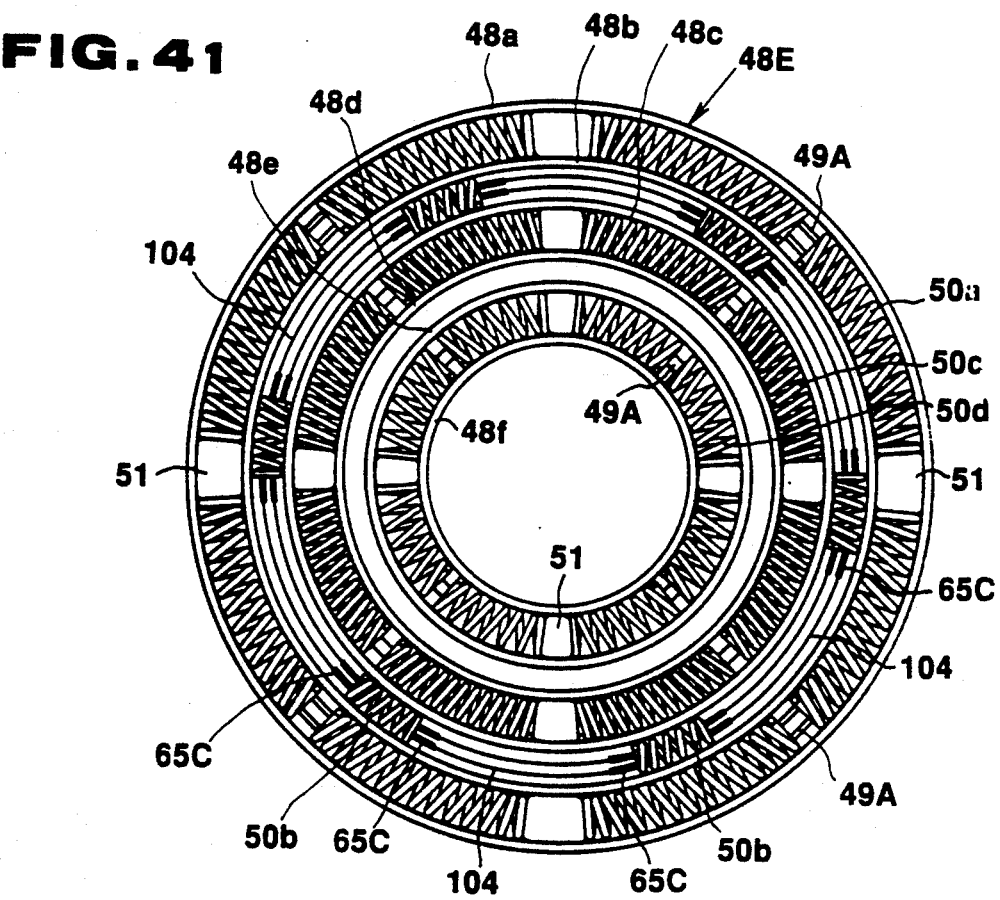

FLUID POWER TRANSMISSION SYSTEM WITH LOCK-UP CLUTCH

BACKGROUND OF THE INVENTION

The present invention relates to a fluid power transmission system such as a fluid coupling or torque converter for transmitting a torque through a fluid such as oil and, more particularly, to a fluid power transmission system provided with a lock-up clutch for connecting a drive side member and a driven side member directly.

A lock-up clutch to be mounted in a fluid power transmission system such as a torque converter is used to eliminate the power loss in case of transmitting the torque through a fluid. For example, a torque converter for a vehicle is arranged between the inner surface of a front cover and a turbine runner so that the torque may be directly transmitted from the front cover to an output shaft by pushing the lock-up clutch into engagement with the inner surface of the front cover. If this lock-up clutch is engaged, the torque is transmitted not through the fluid so that the torque transmission efficiency is substantially 100% without any power loss. However, the fluctuations of the engine torque are transmitted as they are to the output shaft. In case the fluctuations of the engine torque are high, the resultant vibrations are transmitted through the output shaft to a drive mechanism such as an automatic transmission to establish torsional resonations. As a result, the vibrations are transmitted through the mount to the body to vibrate the body panel and the floor panel. Then, there arises a defect that the so-called "booming noise" is generated in the car compartment.

In order to eliminate this defect which is caused by engaging such lock-up clutch, there has been proposed in the prior art a torque converter provided with the following means.

FIG. 45 shows a torque converter 1 which is provided with a lock-up clutch, as disclosed in Japanese Utility Model Laid-Open 157746/1986. A housing 2 connected to the (not shown) output shaft of the engine is constructed of a front cover 2a and the casing of a pump impeller 3. In the housing 2, there are disposed a stator 4 and a turbine runner 5. The stator 4 is held through a one-way clutch 4a, and the turbine runner 5 is connected to the output shaft 6 through a turbine hub 6a. Between the front cover 2a and the turbine runner 5, on the other hand, there is arranged a lock-up clutch 7. This lock-up clutch 7 is composed of: a disc-shaped driven member 8 which is fixed on the turbine hub 6a by means of rivets 13 so that it may rotate integrally with the turbine runner 5; and a disc-shaped drive member 10 which is arranged between the inner surface of the front cover 2a and the driven member 8 and which is interleaved relatively rotatably and axially movably on the outer circumference of the turbine hub 6a. Moreover, the driven member 8 is provided at its outer circumference with damper springs 9 for damping the driven member 8 and the drive member 10. The opposed surfaces of the driven member 8 and the drive member 10 are formed at their portions close to the center with annular projections 8a and 10a which are made so concentric that they can be interleaved on each other at a predetermined clearance. These projections 8a and 10a shear the AT oil, which is confined in between, when the driven member 8 and the drive member 10 rotate relative to each other, so that they establish a resistance acting as a force for attenuating the vibrations in the torsional direction. Here is provided a viscous attenuation mechanism 11.

When the running speed increases so that the vehicle state reaches the lock-up range, the oil pressure between the front cover 2a and the drive member 10 is set at a lower level than that of the oil pressure at the side of the turbine runner 5. Then, the drive member 10 is pushed by the pressure difference toward the front cover 2a and forced to contact with a friction member 12 which is fixed on the inner surface of the front cover 2a. Then, the lock-up clutch 7 is engaged so that the power is transmitted from the housing 2 through the drive member 10 and the damper springs 9 and further from the driven member 8 to the output shaft 6. If the lock-up clutch 7 is thus engaged, a part or most of the rotational torque of the engine is mechanically transmitted to the output shaft 6 not through the fluid. If the engine torque fluctuates in this state, the damper springs 9 connecting the drive member 10 and the driven member 8 are tensed or compressed in accordance with the input torque. As a result, the vibrations caused by the torque fluctuations are reduced by the damper springs 9, and the booming noise can be prevented by reducing the spring constants of the damper springs 9.

In the torque converter 1 thus far described, on the other hand, the damper springs 9 usually acting as vibration absorbing elements increase the vibrations under a special situation having a stepwise change in the input torque and may cause the so-called "surging phenomena". However, this surging phenomena can be prevented to provide an excellent driving feel at a lock-up time, because the viscous attention mechanism 11 arranged in parallel with the damper springs 9 acts to suppress the relative rotations of the drive member 10 and the driven member 8.

In the torque converter 1 of the prior art thus far described, however, the driven member 8 is provided with the damper springs 9 at its portion closer to the outer circumference and with the viscous attenuation mechanism 11 at its portion closer to the center. Thus, the torque converter 1 has the following problems.

The damper springs 9 are required to absorb the vibrations caused by the high fluctuations of the input torque and is spatially restricted by their aforementioned arrangement. In the prior art, therefore, the number of damper springs had to be decreased, and their respective spring constants also had to be increased. As a result, the vibrations having a relative frequency cannot be absorbed so that they are transmitted to the power transmission mechanism such as the automatic transmission to cause the booming noise.

One of the causes for generating the booming noise is that the spring constants of the damper springs 9 have large spring constants. In order to reduce the booming noise, it is conceivable to reduce the spring constants of the damper springs 9. In case, however, the spring constants of the damper springs 9 are reduced, the relative rotational angle of the drive member 10 and the driven member 8, i.e., the torsional angle is increased to enlarge the overall compression of the damper springs 9. This makes it necessary to increase the number of damper springs 9 or to elongate the individual damper springs 9 and accordingly to retain the space therefor. In case, on the other hand, the spring constants are decreased, the drive member 10 and the driven member 8 are highly twisted relative to each other even for a small change in the input torque. After this, the damper springs 9 release the energy so that the drive member 10 and the driven member 8 are highly twisted relative to each other in the opposite directions. As a result, the surging phenomena are liable to occur. Thus, it is necessary to enhance the attenuation characteristics of the aforementioned viscous attenuation mechanism.

If the spring constants of the damper springs 9 are thus reduced, the structures of the damper mechanism and the viscous attenuation mechanism 11 have to be accordingly changed from those of the prior art shown in FIG. 45. In the existing structure, in which the damper springs 9 are circumferentially arranged in one row on the circumference of the driven member 8 and which the viscous attenuation mechanism 11 is arranged circumferentially inside of the damper springs 9, there are independently necessary the space for fitting the numerous damper springs 9, the space for the rivets to hold the damper springs 9, and the space for mounting the viscous attenuation mechanism 11. It is, however, practically difficult to retain such wide spaces in the restricted inside space. After all, the restriction on the space makes it impossible to reduce the spring constants of the damper springs 9 sufficiently.

In the aforementioned torque converter 1 of the prior art, the drive member 10 is so fitted on the outer circumference of the turbine hub 6a as to move in the axial direction so that it may engage or release the lock-up clutch 7. On the contrary, the driven member 8 for forming the viscous attenuation mechanism 11 together with the drive member 10 is fixed integrally with the turbine runner 5 on the outer circumference of the turbine hub 6a by means of the rivets 13.

When the lock-up clutch 7 is engaged, the drive member 10 moves toward the front cover 2a while leaving the driven member 8 immovable. As a result, these two members 10 and 8 are apart from each other to reduce the axial overlapped length of the projections 10a and 8a of the viscous attenuation mechanism 11. Thus, there arises a problem that the viscous torque to be generated drops.

In the torque converter 1 of the prior art thus far described, moreover, the driven member 8 is at its portion closer to the outer circumference provided with the damper springs 9 and its portion closer to the center with the projections 8a and 10a of the viscous attenuation mechanism 11. Since these projections 8a and 10a are formed concentric and annular, their relative rotations never fail to establish the viscous torque. Even if the springs constants of the damper springs 9 are reduced, for example, the vibration attenuation can always be established to prevent the surging phenomena. In the aforementioned structure, however, the individual projections 8a and 10a are always positioned close to and facing each other through the oil. As a result, the fine vibrations having a relatively high frequency are transmitted from the drive member 10 to the driven member 8 through the individual projections 8a and 10a and the oil confined inbetween, thus causing a problem that the booming noise is serious.

On the other hand, the vibration attenuation by the viscous attenuation mechanism 11 is established as a result that the viscous fluid or oil is caused to absorb the kinetic energy in terms of the thermal energy by sharing the oil. In the structure of the prior art, therefore, the energy for rotating the drive member 10 and driven member 8 relative to each other is partially absorbed at all times. Thus, there arises a disadvantage that the energy is unnecessarily consumed to deteriorate the fuel economy of the vehicle.

On the other hand, FIG. 46 shows a torque converter which is provided with a lock-up clutch of the prior art, as disclosed in Japanese Utility Model Laid-Open No. 28944/1982. This torque converter 14 is constructed to include: a drive plate 15 connected to the output shaft of an engine; a housing 16 connected to the drive plate 15 by means of bolts; a pump impeller 17 integrally formed inside of the housing 16; a stator 19 fixed to a stationary shaft through a oneway clutch 18a; a turbine runner 20 arranged to face the pump impeller 17 across the stator 19; a disc-shaped driven member 22 fixed on a hub 21a which is so splined to an output shaft 21 as to move in the axial direction; and a disc-shaped drive member 24 so connected to the driven member 22 as to rotate integrally with the damper springs 23 and having its central side so attached to the hub 21a as to move in the axial direction. These driven member 22 and drive member 24 constitute a lock-up clutch 25 for transmitting the torque by engaging the circumferential edge of the drive member 24 with the inner surface of the front cover 16a of the housing 16.

In the torque converter 14 thus far described, too, the output torque of the engine is transmitted through the drive plate 15 to the housing 16 of the torque converter 14 so that the pump impeller 17 integrated with the housing 16 is rotated. With the lock-up clutch 25 being released, the torque is transmitted from the pump impeller 17 through the AT oil to the turbine runner 20 so that the output shaft 21, on which the turbine runner 20 is fixed through the hub 21a, is rotationally driven. Thus, the torque is transmitted through the AT oil so that the vibrations due to the fluctuations of the engine torque can be absorbed to provide a satisfactory driving feel.

If, on the other hand, the AT oil in the housing 16 has its pressure controlled to bring the circumferential edge of the drive member 24 into contact with the inner surface of the front cover 16a so that the lock-up clutch 25 is engaged, then the output torque of the engine is transmitted from the housing 16 through the drive member 22 and the damper springs 23 to the drive member 24 and further through the hub 21a to the output shaft 21. In this case, the torque is transmitted mechanically not through the liquid to the output shaft 21. Despite of this direct transmission, the vibrations to be caused by the fluctuations of the engine torque or the like are absorbed through the tensions or compressions of the damper springs 23 so that a satisfactory driving feel can be attained.

In the torque converter 14 of the prior art shown in FIG. 46, torque to be applied to the lock-up clutch 25 is high in case the torque inputted from wheels is increased, when the lock-up clutch 25 is engaged, by the undulations of the road surface. As a result, the extent of deformation of the damper springs 23 may exceed the allowable range. If this deformation extent of the damper springs 23 exceeds the allowable range, there arises a problem that the torque abruptly rises to cause the shocks.

If an excessive load is exerted upon the output shaft side (or the wheel side) while the lock-up clutch 25 being engaged so that the deformation extent frequently exceeds the allowable range, as has been described hereinbefore, the overload causes a problem that the lifetimes of the springs are shortened.

Incidentally, the damper mechanism in the torque converter must have a capacity for absorbing the maximum input torque anticipated. If the damper springs having large spring constants are used to stand the high torque, there arise defects that the vibrations cannot be sufficiently reduced and that the booming noise is intensified. Thus, the damper mechanism is required to increase the spring constants to some extent for its strength and to decrease the spring constants for reducing the vibrations. In order to satisfy these contradictory requirements, the damper mechanism is constructed in the prior art by using several kinds of damper springs having different spring constants.

This structure is exemplified in Japanese Patent Laid-Open No. 252964/1986, as will be briefly described in the following.

As shown in FIGS. 47 and 48, there is mounted in a housing 27 of a torque converter 26: a pump impeller 28; a turbine runner 29 arranged to face the pump impeller 28; a stator 30 arranged between the pump impeller 28 and the turbine runner 29; and a lock-up clutch 31 arranged between a front cover 27a and the turbine runner 29.

This lock-up clutch 31 is composed of a disc-shaped drive member 32 to be engaged with and released from the inner surface of the front cover 27a, and a disc-shaped driven member 34 arranged to face the drive member 32.

On the other hand, the driven member 34 is composed of: a first plate 34a connected to the outer circumference of the drive member 32; a second plate 34b connected to the first plate 34a through first damper springs 35; and a third plate 34c connected to the second plate 34b through second damper springs 36. The third plate 34c is fixed together with the turbine runner 29 on a hub 29a which is splined to the output shaft 33 of the torque converter 26. Moreover, the aforementioned first damper springs 35 and second damper springs 36 are given different spring constants such that the spring constants of the first damper springs 35 are set at smaller values than those of the second damper springs 36.

In the aforementioned torque converter 26 of the prior art, therefore, the first damper springs 35 are tensed or compressed to absorb the torque fluctuations, if an input torque in the lock-up state is low, and the second damper springs 36 having the larger spring constants are compressed to absorb the torque if a high torque is inputted. At a low torque time, the angle of torsion of the lock-up clutch 31 for a predetermined torque is enlarged. At a high torque time, the angle of torsion of the lock-up clutch 31 for the predetermined torque is reduced. Thus, the spring characteristics change in the two steps. As a result, the booming noise, which is caused by the fluctuations of the engine torque in the ordinary running state, can be prevented by the actions of the first damper springs 35 having the small spring constants. For a high torque inputted temporarily, on the other hand, the second damper springs 36 having the large spring constants act to prevent the damage.

The damper mechanism using the damper springs having different spring constants is advantageous in that they can stand a high socking torque, and is especially effective for a vehicle such as an off-road car, in which a high torque is relatively frequently inputted from wheels. Despite of these advantages, however, the following disadvantages are invited because the spring constants highly change across a predetermined angle of torsion.

In case impact torque is inputted, the damper springs having the smaller spring constants are at first compressed abruptly and highly. When the angle of torsion then reaches the value for changing the spring constant, then the abrupt and high torque is transmitted through the damper mechanism. As a result, the torque of the output shaft of the vehicle abruptly changes. This change is felt by the rider as such shocks as will be caused in case the drive mechanism chatters, and may deteriorate the riding comfort and the stability of the vehicle.

In the aforementioned structure of the prior art, moreover, the spring constants are changed abruptly and highly at a predetermined angle of torsion. In case high impact torque is inputted from the wheels while the vehicle is running on a rough road to compress the damper springs having the larger spring constants and to eliminate the input of the torque from the wheels, the energy stored in the damper springs having the larger spring constants is abruptly released until the changing point of the spring constants, i.e., until the angle of torsion comes to the angle at which the spring constants change. This is the situation similar to the case, in which the input torque is highly changed. These torque fluctuations are reduced by the damper springs having the smaller spring constants. As a result, the so-called "surging phenomena", in which the angle of torsion is repeatedly changed high and slowly, may be caused.

In the torque converter thus far described, the spring characteristics of the damper mechanism of the lock-up clutch is abruptly changed at the predetermined angle of torsion, to cause a disadvantage that the shocks or the surging phenomena may occur.

SUMMARY OF THE INVENTION

A main object of the present invention is to provide a fluid power transmission system capable of preventing the booming noise and the surging phenomena effectively.

Another object of the present invention is to provide a fluid power transmission system capable of retaining a wide space for arranging the damper springs and accordingly using damper springs having small spring constants.

Still another object of the present invention is to provide a fluid power transmission system capable of engaging the lock-up clutch at a low running speed to improve the fuel economy.

A further object of the present invention is to provide a fluid power transmission system which has viscous attenuation characteristics unchanged in accordance with the engaged state of the lock-up clutch.

A further object of the present invention is to provide a fluid power transmission system which has viscous attenuation characteristic changed in accordance with the magnitude of the torque inputted.

A further object of the present invention is to prevent the damage of the damper springs due to an overload.

A further object of the present invention is to provide a fluid power transmission system capable of changing the spring characteristics and suppressing the surging phenomena.

According to the present invention, there is provided a fluid power transmission system wherein a fluid flow established by a pump impeller is fed to rotate a turbine runner, wherein a lock-up clutch to be engaged with and released from a first member integrated with the pump impeller is connected to an annular drive member, and wherein an annular driven member arranged to face the drive member and made rotatable relative to the drive member is connected to a second member integrated with the turbine runner, whereby a torque is transmitted between the drive member and the driven member. The fluid power transmission system comprises: a plurality of first projections arranged at a circumferentially constant clearance on one of the surfaces of the drive member and the driven member facing each other and having a predetermined circumferential length; a plurality of second projections arranged at a circumferentially constant clearance on the other of the surfaces of the drive member and the driven member facing each other and having a predetermined circumferential length for meshing with the first projections at a radially slight clearance; damper springs arranged between the first projections or the second projections and adapted to be compressed by the first projections and the second projections; and a viscous fluid confined between the first projections and the second projections.

In the present invention, moreover, the drive member is arranged to get close to and apart from the inner surface of the front cover integrated with the pump impeller and has a friction member adhered thereto, and the driven member is arranged to move back and forth together with the drive member.

In the present invention, still moreover, the drive member and the driven member are provided with arcuate projections which are circumferentially brought, by the relative rotations thereof, to be fitted on through a viscous fluid and released from each other.

In the present invention, furthermore, the fluid power transmission system is provided with a plurality of damper springs having different spring constants.

The above and further objects and novel features of the present invention will more fully appear from the following detailed description when the same is read with reference to the accompanying drawings. It is to be expressly understood, however, that the drawings be for the purpose of illustration only and be not intended as a definition of the limits of the present invention.

BRIEF DESCRIPTION OF THE DRAWINGS

FIG. 39 is a front elevation showing the drive member which is provided with the driven member in the eighth embodiment;

FIG. 41 is a front elevation showing a drive member in a ninth embodiment;

DETAILED DESCRIPTION OF THE PREFERRED EMBODIMENTS

Figure 1:
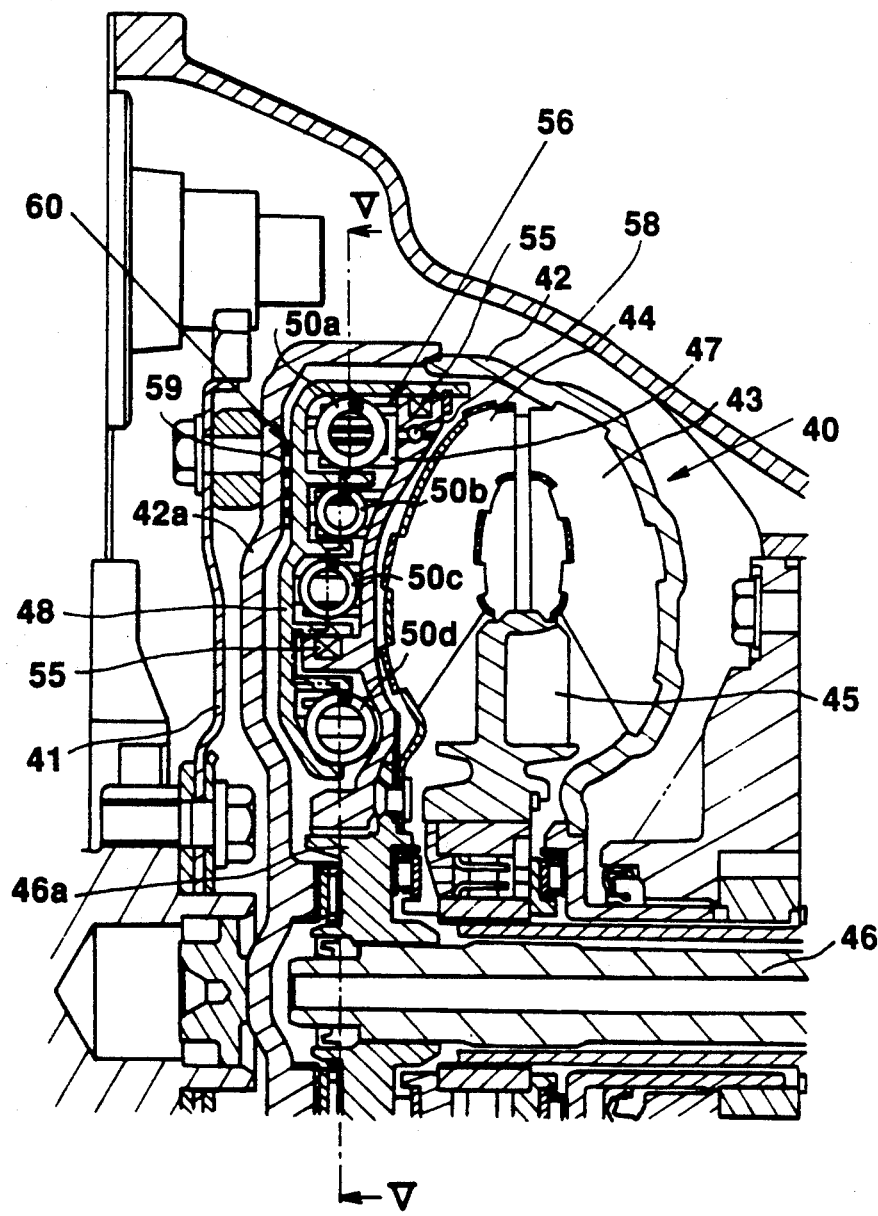
FIG. 1 is a section showing a torque converter according to a first embodiment of the present invention.

With reference to FIGS. 1 to 6, a torque converter 40 is constructed to have a structure substantially identical to that of the torque converter of the prior art, with the exception of a lock-up clutch anism and a viscous attenuation mechanism. Specifically, a housing 42 for connecting a drive plate attached to the (not shown) output shaft of an engine is formed of a front cover 42a and the casing of a pump impeller 43. In this housing 42: a turbine runner 44, to which the torque is to be transmitted from the pump impeller 43 by means of automatic transmission oil (i.e., At oil), is arranged to face the pump impeller 43; and a stator 45 for changing the flow direction of the AT oil, which is directed from the turbine runner 44 to the pump impeller 43, is arranged between the turbine runner 44 and the pump impeller 43. The turbine runner 44 is fixed on a hub 46a which is splined to an output shaft 46. On the outer circumference of this hub 46a, a generally disc-shaped driven member 47 is splined to move in the axial direction. The driven member 47 is interposed between the turbine runner 44 and the front cover 42a. Between the driven member 47 and the front cover 42a, moreover, there is arranged a drive member 48. The drive member 48 is formed, as shown in section in FIG. 1, of a disc-shaped portion facing the driven member 47 and a cylindrical portion extending axially from the outer circumference of the disc-shaped portion. The drive member 48 has its cylindrical portion so fitted on the driven member 47 that it can move in the axial direction.

Figure 2:
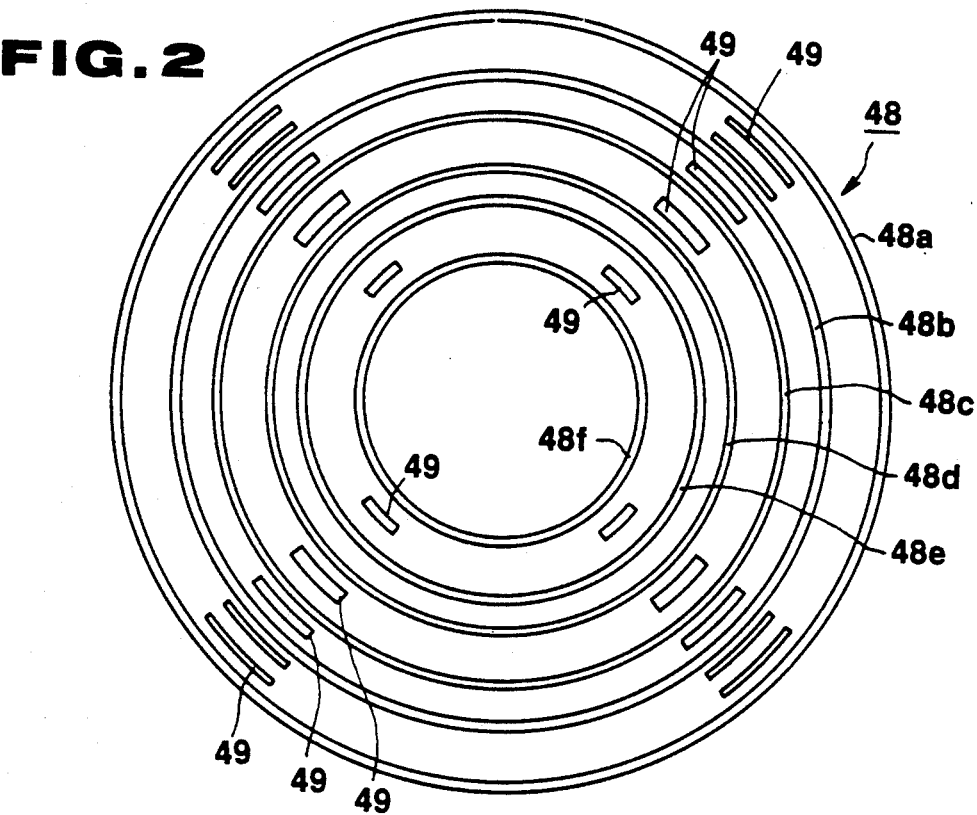
FIG. 2 is a front elevation showing a drive member in the first embodiment.
Figure 3:
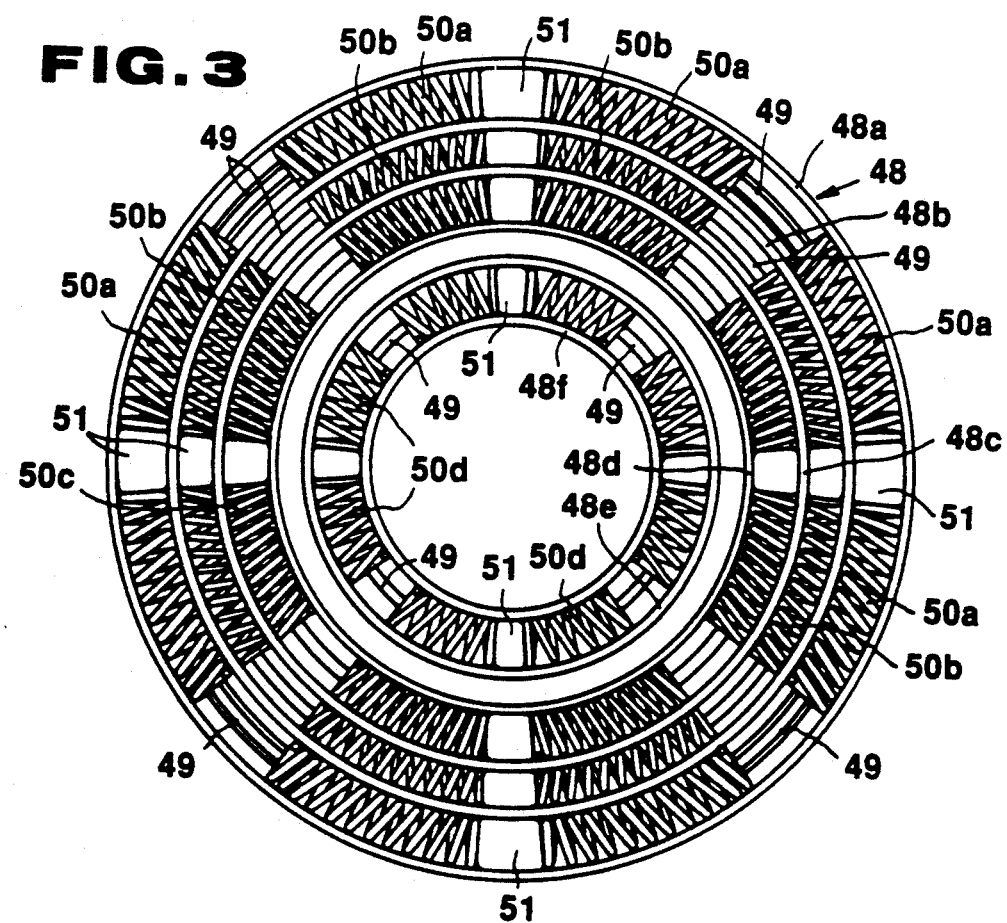
FIG. 3 is a front elevation showing the drive member which is provided with a damper spring.
Figure 4:
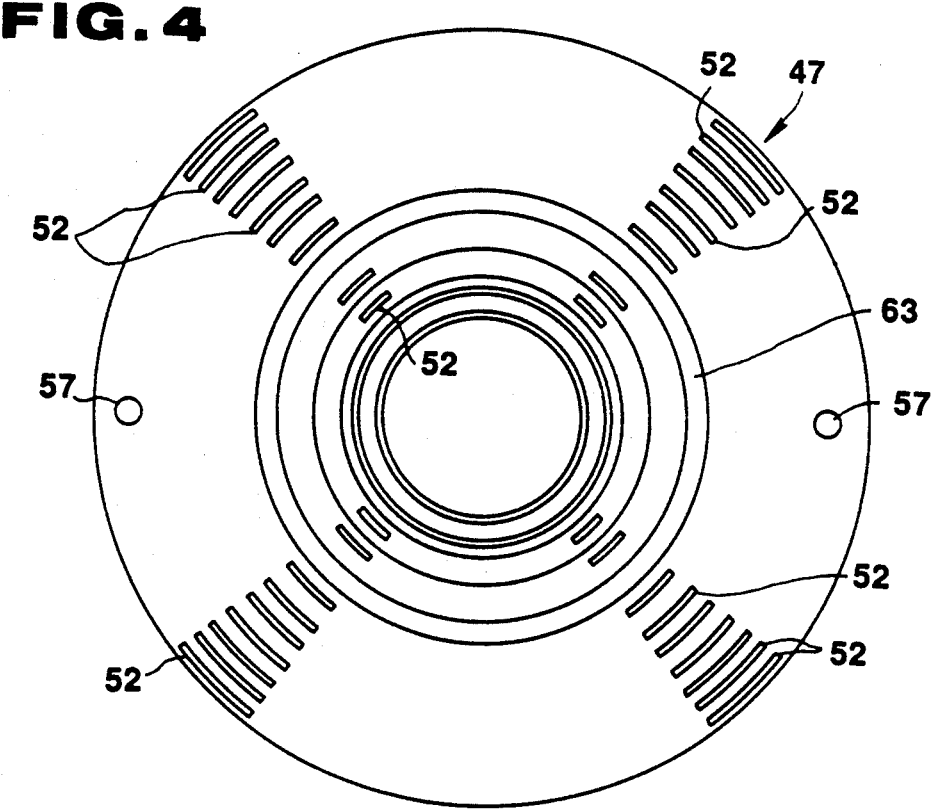
FIG. 4 is a front elevation showing a driven member in the first embodiment.
Figure 5:
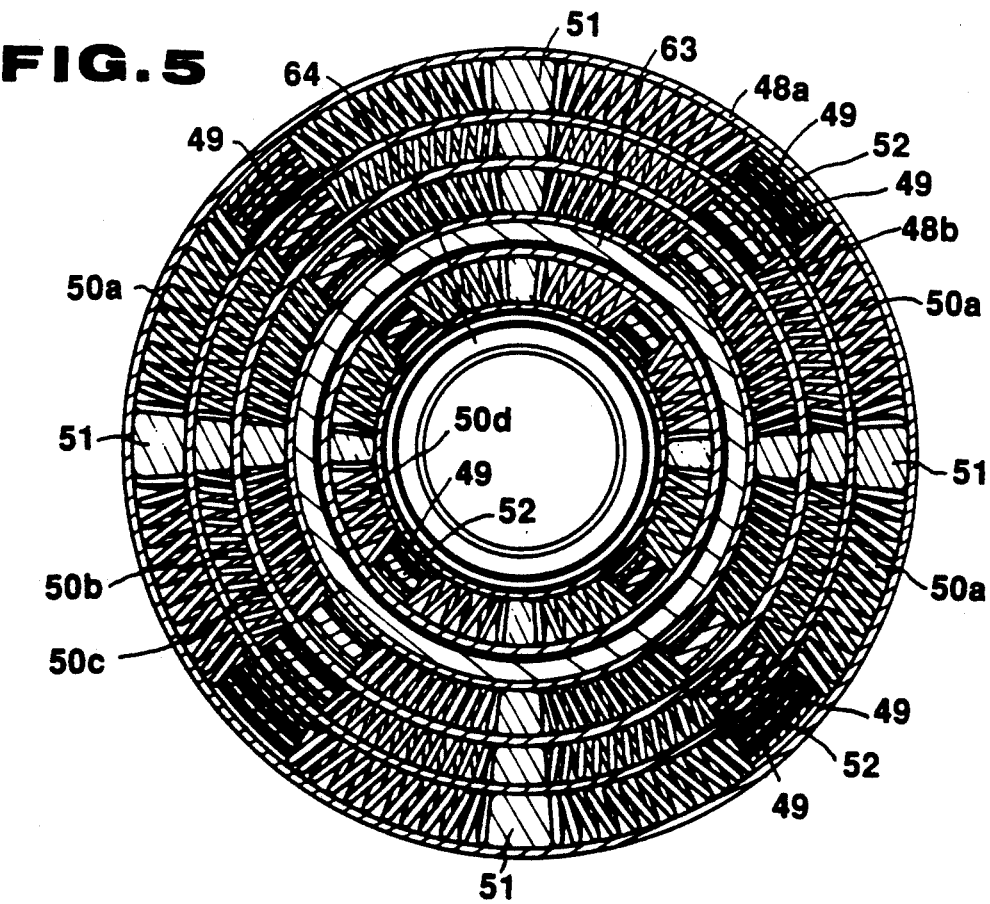
FIG. 5 is a section taken along line V—V of FIG. 1.

The drive member 48 will be described in more detail in the following. As shown in FIG. 2, the surface of the drive member 48 facing the driven member 47 is formed with six concentrically arranged annular projections 48a, 48b, 48c, 48d, 48e and 48f. These annular projections 48a to 48f are raised sequentially from the outer circumference and at a predetermined spacing. The four grooves between those annular projections 48a to 48f, i.e., the four of the five roots except that between the annular projections 48d and 48e are formed with stopper projections 49 for the damper springs. These stopper projections 49 are so arcuately raised at positions quartering the circles as to form part of the individual concentric circles. In other words, the annular projections are so partially cut out over predetermined lengths to form arcuate notches as to leave the stopper projections 49. Moreover, those notches are fitted therein with the damper springs, as will be described in the following. Specifically, each of the four roots individually formed with the stopper projections 49 is fitted therein with eight (i.e., totally thirty two) damper springs 50a, 50b, 50c and 50d. These damper springs 50a to 50d are given spring constants smaller than those of the damper springs which are used for the identical applications in the prior art. The arrangement of the damper springs 50a to 50d will be described more specifically with reference to FIG. 3. A pair of damper springs 50a to 50d are fitted between the circumferentially adjacent stopper projections 49, i.e., in each of the notches such that each pair of them sandwich a spacer block 51. Here, the spacer blocks 51 can be circumferentially moved and are provided for preventing the damper springs 50a to 50d from any buckling by shortening them individually. Moreover, these damper On the other hand, the surface of the driven member 47 facing the drive member 48 is formed, as shown in FIG. 4, with a plurality of arcuate push projections 52 which are positioned to quarter the circumference and shaped to form part of concentric circles. These push projections 52 are associated with the aforementioned stopper projections 49 to push and compress the damper springs 50a to 50d when the drive member 48 and the driven member 47 are turned relative to each other. The push projections 52 are interleaved between the stopper projections 49 and the annular projections 48a to 48f of the drive member 48 while holding slight clearances from these projections 49 and 48a to 48f. Incidentally, the interleaving states of these projections 49 and 48a to 48f are shown in FIG. 5.

On the other hand, the drive member 48 is supported to have its inner and outer circumferences sliding on the driven member 47 such that the sliding portions of the inner and outer circumferences of the driven member 47 and the drive member 48 are sealed up with X-shaped seals 55. The hollow portion sealed up between the driven member 47 and the drive member 48 by those X-shaped seals 55 is filled up with highly viscous oil such as silicone oil together with a suitable amount of air, thus constituting a variable capacity type viscous attenuation mechanism 56. Incidentally, the highly viscous oil is injected into holes (shown in FIG. 4), which are formed at two positions in the circumferential edge of the driven member 47. After this, steel balls 58 are press-fitted in the individual holes 57, and their openings are caulked and shut off. The amount of the highly viscous oil to be injected into the viscous attenuation mechanism 56 is set to retain a side clearance $\Delta h$ between the damper spring 50a, for example, and the bottom of the root between the annular projections 48a and 48b, even in case the maximum pressure to be supposed acts to bring the driven member 47 closer to the drive member 48 so that the clearance, as indicated at L in FIG. 6, between the driven member 47 and the drive member 48 is reduced to the clearance indicated at L1.

A friction member 59 is adhered to the inner surface of the front cover 42a. When the drive member 48 is pushed onto the friction member 59, the input torque is transmitted to the output shaft 46 through the drive member 48, the damper springs 50a to 50d and the driven member 47. Thus, here is formed a lock-up clutch 60.

Figure 6:
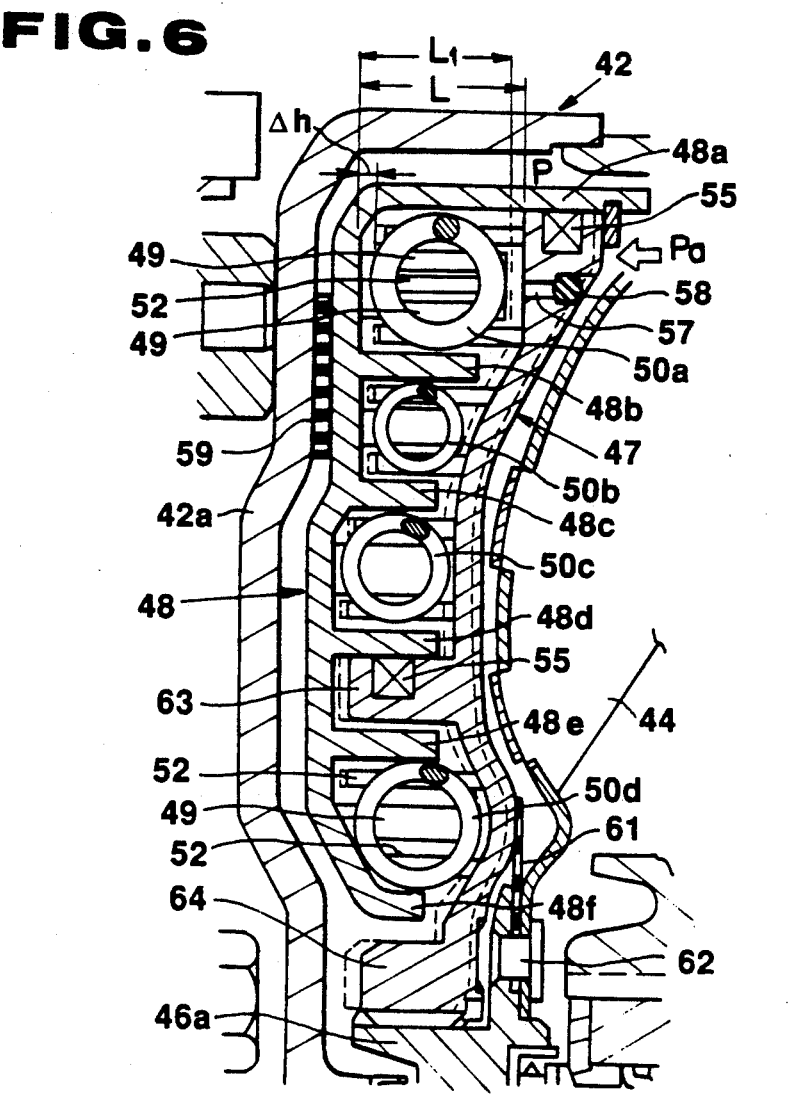
FIG. 6 is a section showing a major portion of the torque converter in the first embodiment.

Incidentally, reference numeral 61 appearing in FIG. 6 designates a sealing member for preventing leakage of the oil pressure. This sealing member 61 is fixed together with the turbine runner 44 to the hub 46a by means of rivets 62. On the other hand, numeral 63 appearing in FIG. 4 designates a sealing projection, and numeral 64 appearing in FIG. 5 designates a boss.

Next, the operations of the torque converter 40 thus constructed will be described in the following.

Before the running state of the vehicle reaches the lock-up range, the oil is fed to the clearance between the front cover 42a and the drive member 48 so that the drive member 48 is apart from the friction member 59 adhered to the inner surface of the front cover 42a, thus establishing a state in which the lock-up clutch 60 is released. In this state, the torque is transmitted from the pump impeller 43 integrated with the housing 42 through the AT oil to the turbine runner 44 and further to the output shaft 46. Thus, outside of the lock-up range, the torque transmission through the fluid is effected, and the vibrations due to the torque fluctuations are cut as a result of the slippage of the torque converter 40.

Moreover, for example, when the vehicle speed increases so that the running state of the vehicle reaches the lock-up range, the oil pressure Pa at the side of the turbine runner 44 is increased relative to the oil pressure between the front cover 42a and the drive member 48. As a result, the driven member 47, which is axially movably fitted on the hub 46a, is moved toward the front cover 42a (i.e., leftwardly of FIG. 1).

Since a suitable amount of air is filled together with the highly viscous oil between the driven member 47 and the drive member 48, the drive member 48 is pushed toward the front cover 42a and onto the friction member 59 as the driven member 47 moves. In other words, the lock-up clutch 60 is engaged. In this case, when the drive member 48 just begins contacting with the frictional member 59, the air confined together with the highly viscous oil is not compressed yet so that the engaging pressure of the lock-up clutch 60 is still low. After this, the driven member 47 is further moved to get close to the drive member 48 thereby to compress the aforementioned air. Then, the pressure between the drive member 48 and the driven member 47 is gradually increased so that the engaging pressure of the lock-up clutch 60 is accordingly increased. In other words, the air confined together with the highly viscous oil performs the damping action so that the engaging pressure of the lock-up clutch 60 is gradually increased.

Since the drive member 48 is thus supported slidably relative to the driven member 47, the depth of insertion of the individual projections 48a to 48f and 49 of the drive member 48 and the projections 52 are held no less than a constant value when the lock-up clutch 60 is engaged, so that a predetermined viscous torque is retained.

With the lock-up clutch 60 being engaged, the drive member 48 rotates together with the housing 42. As a result, most of the input torque is transmitted from the drive member 48 through the damper springs 50a to 50d to the driven member 47 and further to the output shaft 46. In this state, the individual damper springs 50a to 50d are under compression according to the magnitude of the torque transmitted from the drive member 48 to the driven member 47. As a result, the individual damper springs 50a to 50d are further compressed or tensioned in the presence of the torque fluctuations of the engine, and these extension and shrinkage are effected in accordance with the fluctuations of the input torque. In other words, the relative turns are caused between the drive member 48 and the driven member 47 to reduce the vibrations due to the fluctuations of the input torque. Especially in the aforementioned torque converter 40, a sufficient space is retained for the damper springs 50a to 50d, and the damper springs 50a to 50d used have small spring constants. As a result, the torque converter 40 can suppress the transmission of the vibrations of relatively high frequency, which might otherwise cause the booming noise. This means that the aforementioned torque converter 40 is superior in preventing the booming noise to the torque converter of the prior art.

If, on the other hand, the spring constants of the damper springs 50a to 50d are reduced, the vibrations of low frequency and large amplitude for causing the surging are liable to occur. In the aforementioned torque converter 40, however, the relative turns or torsions between the drive member 48 and the driven member 47 can be effectively attenuated because the projections of the viscous attenuation mechanism 56 are formed even on the outer circumferences of the drive member 48 and the driven member 47 to provide excellent viscous attenuation characteristics. As a result, the torque converter 40 is superior in the effect of preventing the surging, too.

Figure 7A:
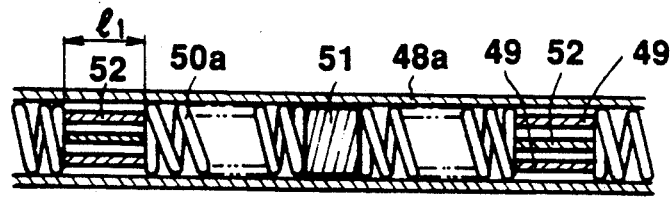
FIGS. 7A to 7C are partial sections linear models for explaining the operations of a viscous attenuation mechanism in the first embodiment.
Figure 7B:
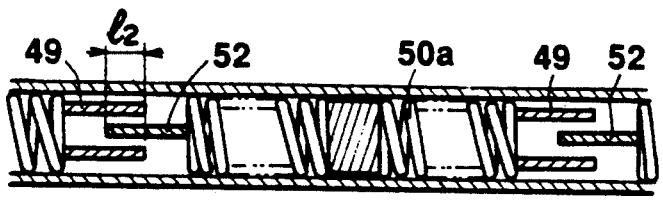
Figure 7C:
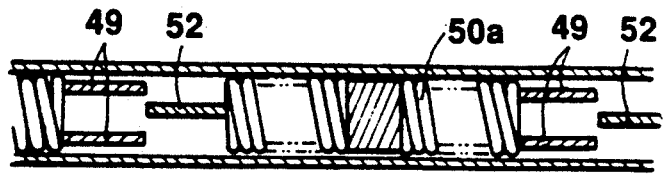

These operations will be described in more detail in the following. If the engine torque fluctuations are caused with the lock-up clutch 60 being engaged, they are transmitted at first to change the rotational speed of the drive member 48 so that the push projections 52 formed at the side of the driven member 47 compress the individual damper springs 50a to 50d between themselves and the stopper projections 49. The operations of the viscous attenuation mechanism 56 in this state will be described in the following. FIGS. 7A to 7C illustrate the behaviors of the viscous attenuation mechanism 56 by using linear models so as to facilitate the description. FIG. 7A shows the state, in which the relative turns, i.e., torsions between the drive member 48 and the driven member 47 are not caused because no torque is applied. In this state, the stopper projections 49 and the push projections 52 completely overlap to have a "large" overlap length $l_1$ so that the viscous attenuation torque Ta is also "high". On the other hand, FIG. 7B shows a slightly twisted state, in which the overlap length $l_2$ between the stopper projections 49 and the push projections 52 is "medium" so that the viscous attenuation torque Tb is also "medium". Moreover, FIG. 7C shows a further twisted state, in which the overlap length l between the stopper projections 49 and the push projections 52 is zero, i.e., l=0 so that the viscous attenuation torque T=0.

Figure 8A:
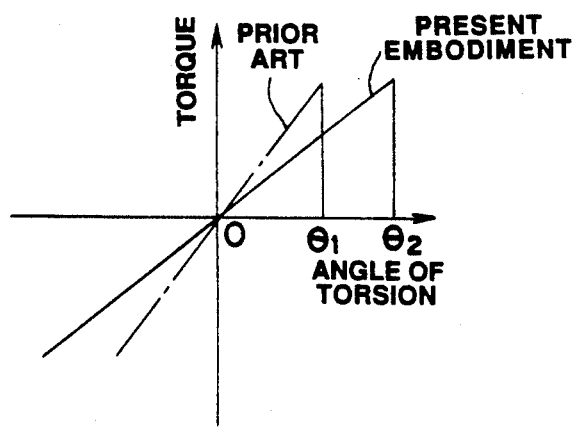
FIGS. 8A to 8E are diagrams showing the viscous attenuation characteristics of the first embodiment.
Figure 8B:
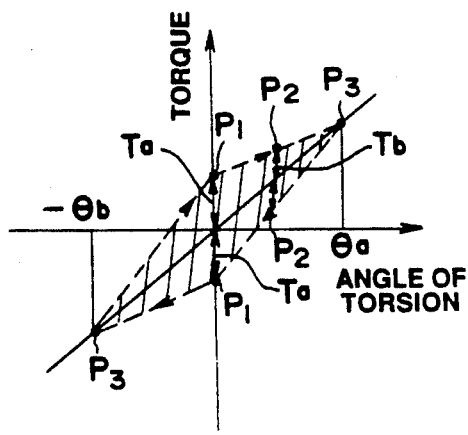

In the aforementioned torque converter 40, moreover, many damper springs 50a to 50d are used by reducing their spring constants. As seen from the diagram of FIG. 8A showing the difference in the torsional characteristics, an angle of torsion $\theta_2$ for a constant torque is larger than an angle of torsion $\theta_1$ of the torque converter of the prior art. Thus, the angle of torsion is highly changed by small torque fluctuations, as schematically shown in FIG. 8B. FIG. 8B illustrates an example, in which it is assumed that the angle of torsion change at a constant rate from $\theta_a$ to $-\theta_b$. At point $P_1$, the overlap length $l_1$ is "large" in the situation of FIG. 7A so that the viscous attenuation torque Ta is also "high". At point $P_2$, on the other hand, the overlap length $l_2$ is "medium" in the situation of FIG. 7B so that the viscous attenuation torque Tb is also "medium". At point P₃, on the other hand, the overlap length l=0 in the situation of FIG. 7C so that the viscous attenuation torque T=0. As a result, the viscous attenuation torque changes within the hatched range of FIG. 8B to attenuate the vibrations accompanying the torque fluctuations so that the surging is effectively prevented.

Figure 8C:
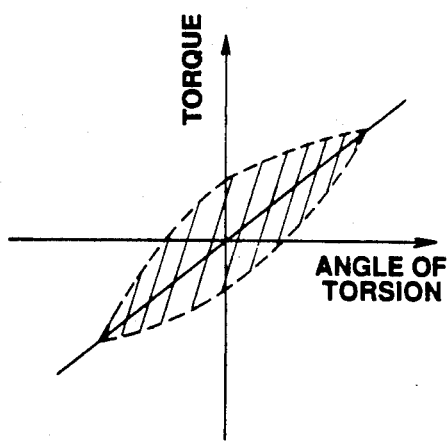

Incidentally, it is assumed in FIG. 8B that the changing rate of the angle of torsion be constant. As a matter of fact, however, the changing rate of the angle of torsion takes its maximum at the point $P_1$ and gradually decreases at the two sides so that the viscous attenuation torque resembles the situation shown in FIG. 8C.

Figure 8D:
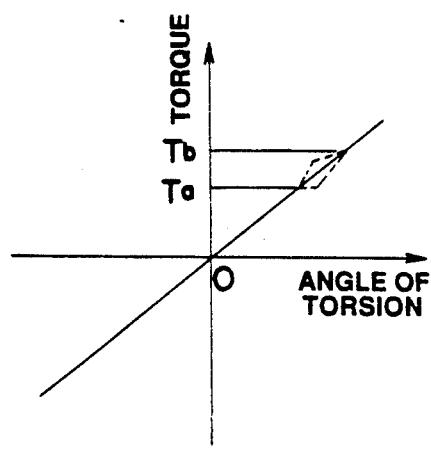
Figure 8E:
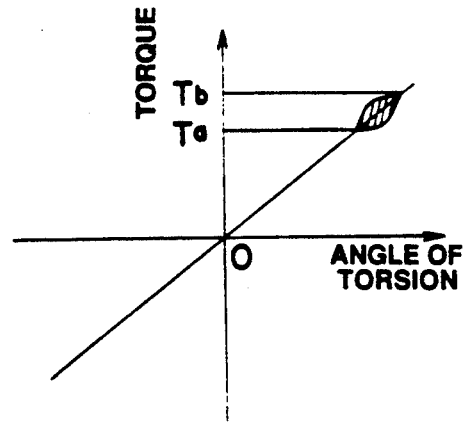

In the aforementioned torque converter 40, moreover, the damper springs have the small spring constants but the large angle of torsion to raise an effect that the booming noise can be prevented, in addition to the following effects. Because of the small spring constants, the angle of torsion is large for a low torque. In case the vehicle is driven with the torque changing between Ta and Tb, for example, the angle of torsion is large, and the viscous attenuation torque is low, as shown in FIG. 8D. This is because the aforementioned projections 49 and 52 have a short overlap length. In this state, therefore, the vibrations of high frequency are hard to transmit through the individual projections 49 and 52 and the highly viscous oil so that the booming noise can be prevented. Because of the low attenuation, moreover, the energy loss is reduced. Although FIG. 8D is expressed with an assumption that the angle of torsion change at a constant rate, the changing rate of the angle of torsion is varied in fact. If this change is considered, FIG. 8D is illustrated as in FIG. 8E.

As has been described hereinbefore, the aforementioned torque converter 40 has its viscous attenuation mechanism 56 constructed by forming the projections all over the opposed surfaces of the drive member 48 and the driven member 47 and accommodating therein the damper springs 50a to 50d. These damper springs 50a to 50d can have their spring constants reduced but their number increased to enhance the viscous attenuation characteristics.

In the aforementioned torque converter 40, moreover, the force for engaging the lock-up clutch 60 can be slowly increased by the elasticity of the air which is confined together with the highly viscous oil in the viscous attenuation mechanism 56. As a result, it is possible to prevent the lock-up shocks.

In the aforementioned torque converter 40, still moreover, the driven member can be moved in the axial direction. When the lock-up clutch 60 is engaged, the driven member 47 is moved in the direction to engage the lock-up clutch 60, i.e., in the direction to get close to the drive member 48. As a result, the overlap between the projections 48a to 48f and 49 and the projections 52 can be prevented from decreasing to retain establishment of the sufficient viscous torque. Thus, a high viscous torque can be generated, when the drive member 48 and the driven member 47 are turned relative to each other by the torque fluctuations of the engine, to prevent the surging effectively.

In the aforementioned torque converter 40, furthermore, the stopper projections 49 and the push projections 52 are arcuately formed. If the drive member 48 and the driven member 47 are turning relative to each other within a predetermined angle range, the surging can be prevented by the viscous torque of the highly viscous oil between the aforementioned projections 49 and 52. If the angle of relative turns of the drive member 48 and the driven member 47 exceeds a predetermined value, the aforementioned projections 49 and 52 are circumferentially deviated. As a result, the transmission of the vibrations through the highly viscous oil is suppressed to prevent the booming noise. Thus, the lock-up range can be extended to a lower rate without increasing the booming noise, and the fuel economy can also be improved.

Figure 9:
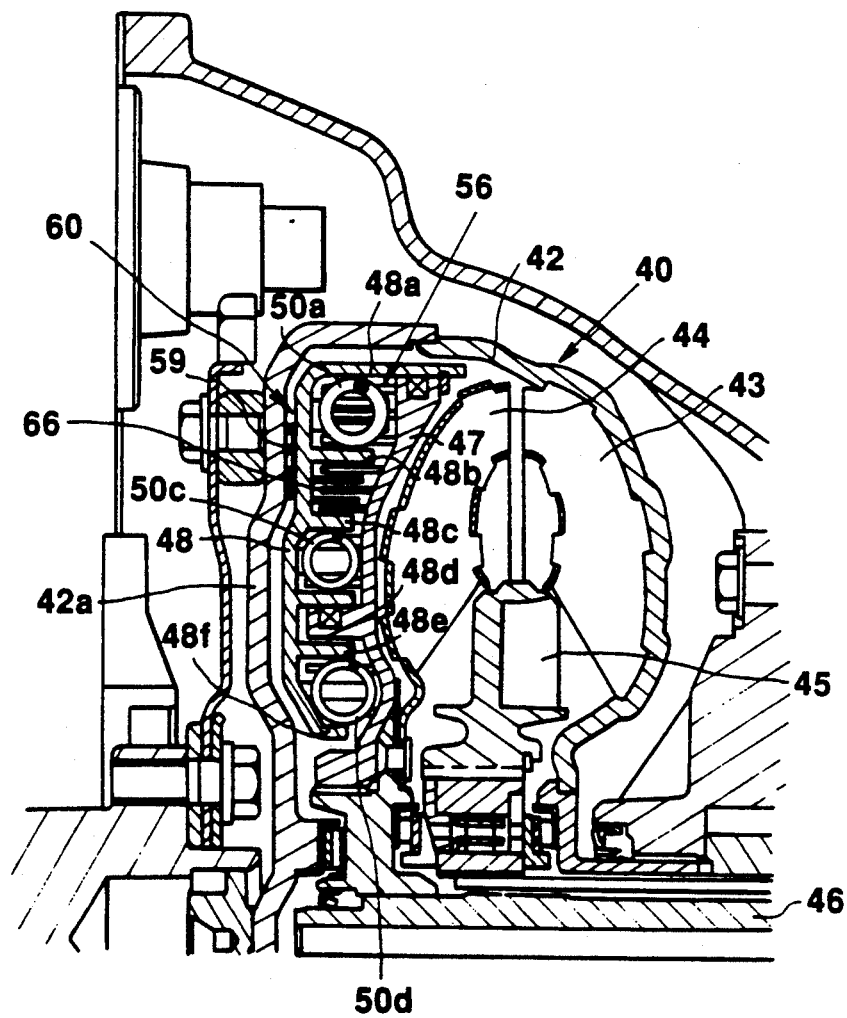
FIG. 9 is a section showing a torque converter according to a second embodiment.
Figure 10:
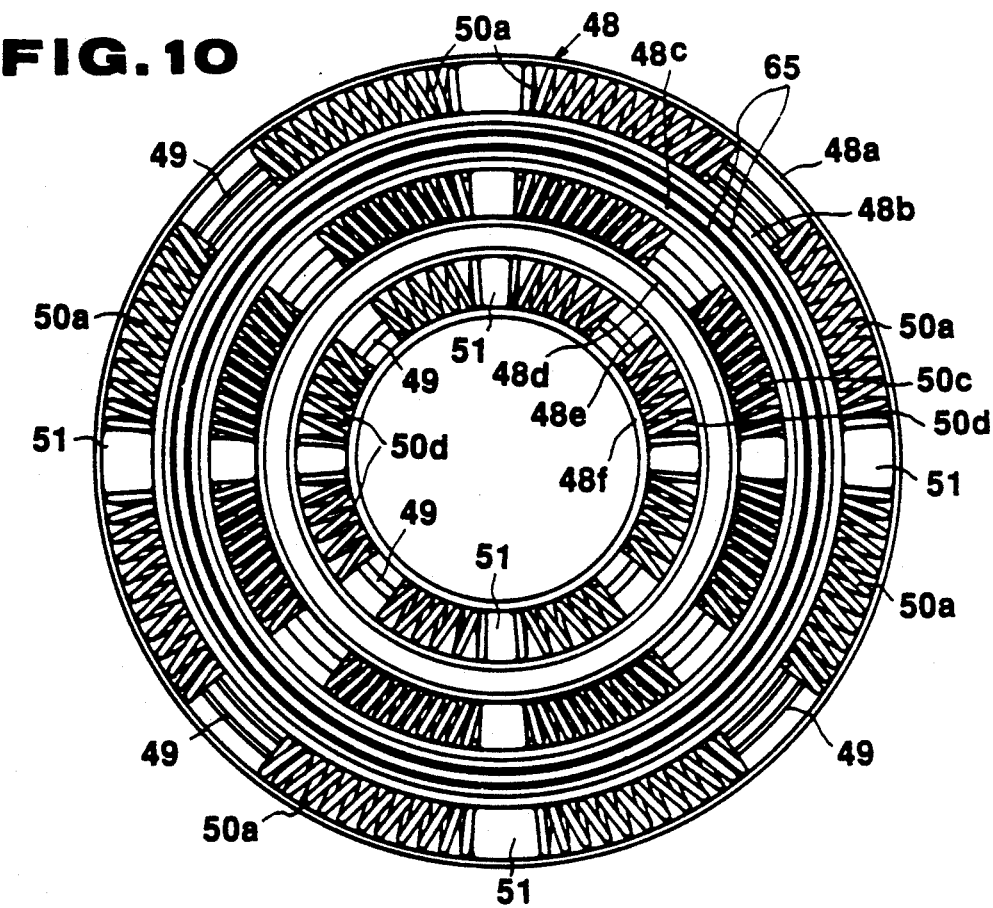
FIG. 10 is a front elevation showing a drive member in the second embodiment.
Figure 11:
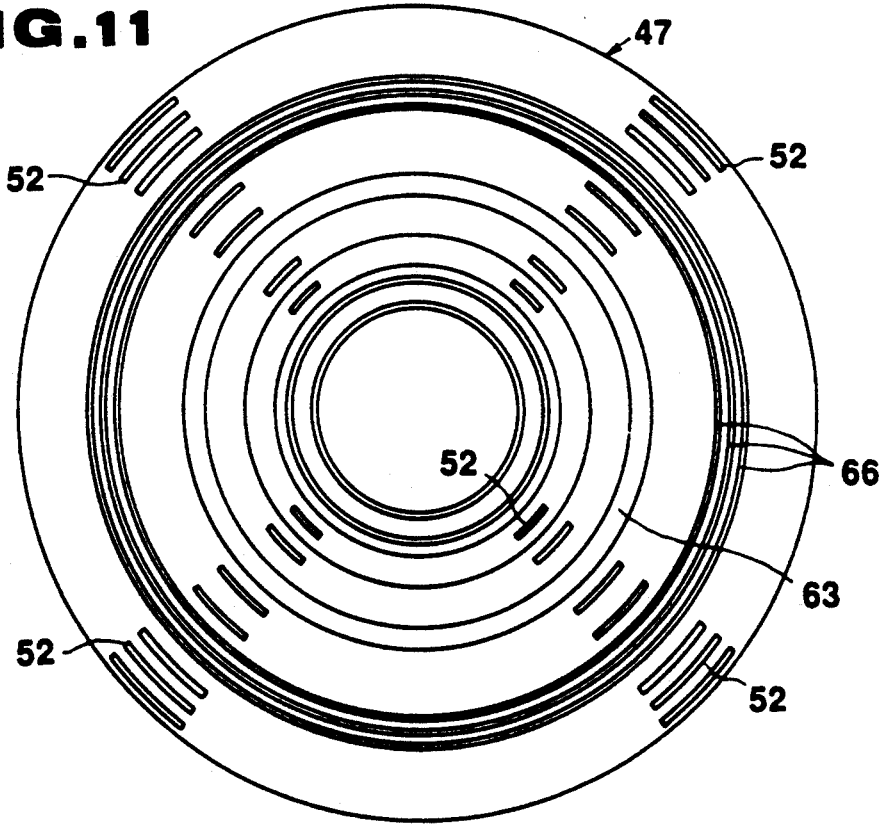
FIG. 11 is a front elevation showing a driven member in the second embodiment.

FIGS. 9 to 11 show a second embodiment of the present invention, in which the shown torque converter has its viscous attenuation characteristics improved over those of the aforementioned torque converter of the first embodiment. In FIGS. 9 to 11, the portions identical to those shown in FIGS. 1 to 6 are designated at the common reference numerals of FIGS. 1 to 6, and their repeated descriptions will be omitted.

In FIGS. 9 to 11, the second groove from the outer circumference of the drive member 48, i.e., the groove between the annular projections 48b and 48c is formed, in place of the aforementioned stopper projections 49, with two thin annular projections 65 which are narrowly spaced. On the contrary, the driven member 47 is formed, in place of the push projections 52, with three annular projections 66 which are to be interleaved with a predetermined clearance in the annular projections 65 of the drive member 48. Moreover, the viscous attenuation mechanism 56 is constructed by injecting the highly viscous oil such as the silicone oil into the hollow portion which is sealed up between the drive member 48 and the driven member 47.

In the torque converter 40 shown in FIG. 9, the annular projections 65 of the driven member 48 and the annular projections 66 of the driven member 47 are always in meshing engagement through the highly viscous oil so that a high attenuation force can be achieved to prevent the surging without fail. Since, moreover, the high impact torque to be applied can be absorbed by the viscous attenuation mechanism 56 having excellent attenuation characteristics, the damper springs can be prevented from being broken. Still moreover, the effect of preventing the booming noise is excellent like the aforementioned first embodiment.

In the first and second embodiments thus far described, the compressions and tensions of the damper springs may be suppressed by the highly viscous oil because the damper springs are fitted in the hollow portion which is filled up with the highly viscous oil.

The following third and fourth embodiments are improved by separating the damper mechanism and the viscous attenuation mechanism completely.

FIGS. 12 to 16 show a third embodiment of the present invention. Like the aforementioned torque converter 40 of the first embodiment, a torque converter, as generally designated at 70, is provided, in the housing 42, with: the pump impeller 43 made rotatable integrally with the housing 42; the turbine runner 44, to which the torque is transmitted from the pump impeller 43 through the AT oil; and the stator 45. In the housing 42, moreover, there is disposed at the side of the turbine runner 44 a disc-shaped driven member 71 which is made rotatable with the turbine runner 44 and axially movable on the output shaft 46 through the hub 46a. Between the driven member 71 and the front cover 42a of the housing 42, on the other hand, there is arranged a drive member 72, which is formed, as shown, of a disc portion facing the driven member 71 and a cylindrical portion axially extending from the outer circumference of the disc portion. Moreover, the drive member 72 is axially slidably supported such that its annular projections 72d and 72e have their inner surfaces slidably interleaved on a sealing projection 73 and a boss 74, which are formed closer to the center of the driven member 71. At the same time, the drive member 72 is sealed liquid-tight by an X-shaped sealing member 74a which is fitted in the sliding portion of the driven member 71.

Figure 13:
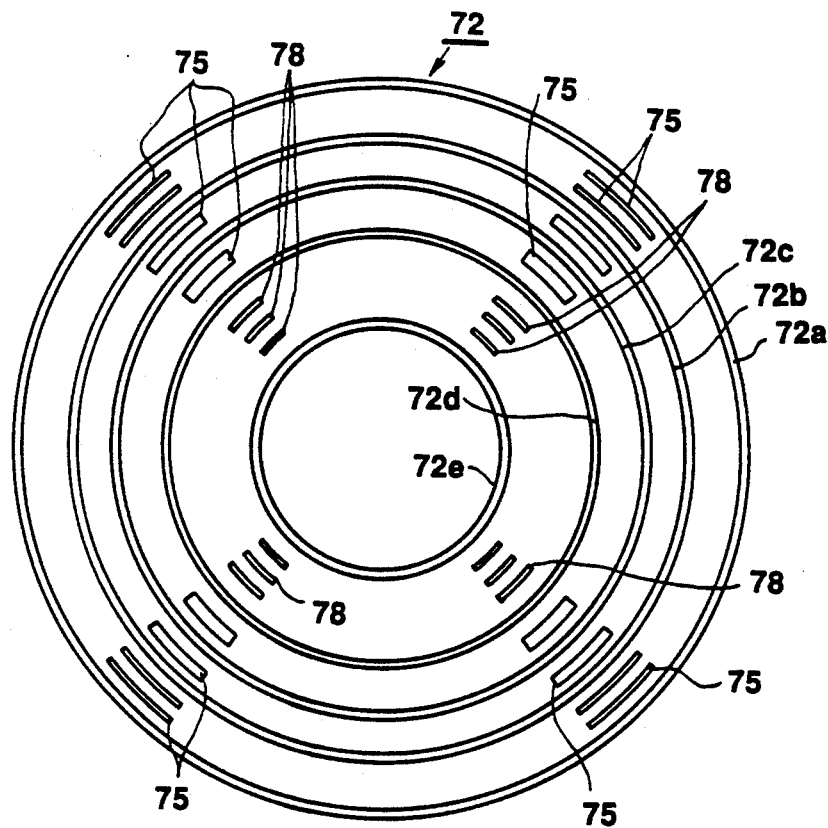
FIG. 13 is a front elevation showing a drive member in the third embodiment.
Figure 14:
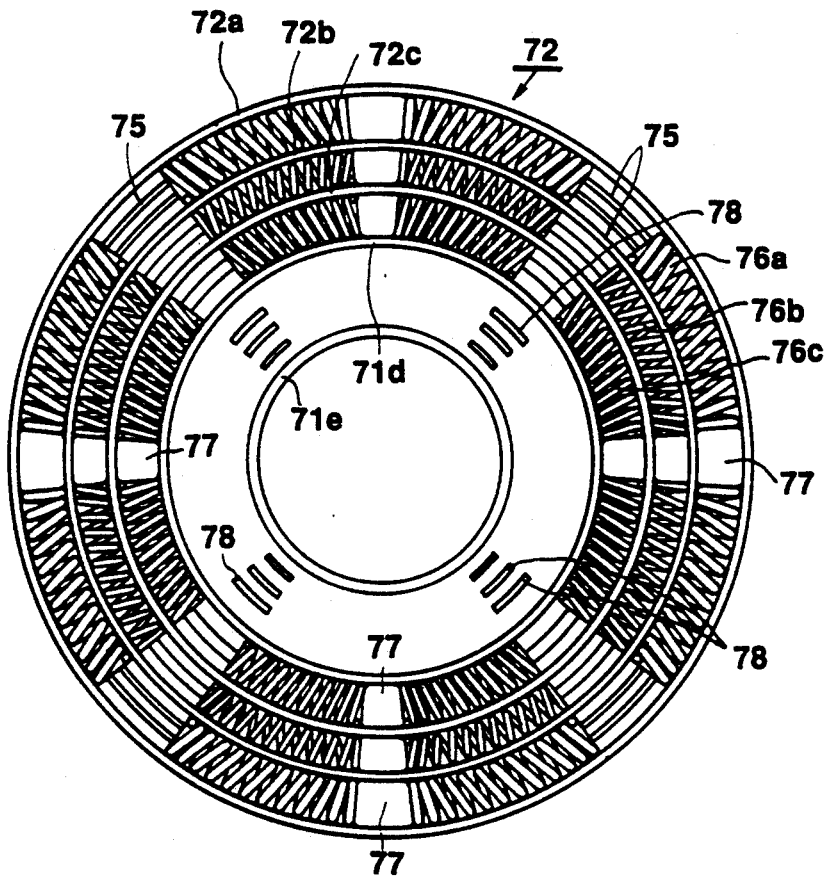
FIG. 14 is a front elevation showing the drive member provided with a damper spring.

On the other hand, the surface of the driven member 72 facing the driven member 71 is formed with concentric annular projections 72a to 72e. Stopper projections 75 are so formed between the annular projections 72a and 72b, between the annular projections 72b and 72c and between the annular projections 72c and 72d that they are positioned to quarter the circumference and shaped into arcs forming part of the concentric circles (as shown in FIG. 13). In other words, the stopper projections 75 are formed by cutting the annular projections partially to predetermined lengths to leave annular notches, in which the following damper springs are fitted. In the three grooves defined by the stopper projections 75, specifically, there are fitted eight for each groove and totally twenty four damper springs 76a, 76b and 76c which have smaller spring constants than those of the damper springs used for similar applications in the prior art. This fitting state will be described more specifically with reference to FIG. 14. Each pair of the damper springs 76a, 76b and 76c is fitted between the circumferentially adjacent stopper projections 75, i.e., in each notch such that the paired springs sandwich spacer blocks 77 inbetween. Incidentally, these spacer blocks 77 are made circumferentially movable like the spacer blocks 51 of the foregoing embodiments and are provided for shortening the lengths of the individual damper springs 76a, 76b and 76c to prevent their buckling. On the other hand, these damper springs 76a, 76b and 76c may be given different spring constants.

In the groove, which is sealed up by the X-shaped sealing member 74a between the annular projection 72d and the annular projection 72e closest to the center, there are formed four groups each composed of three arcuate projections 78, which are positioned on lines joining the stopper projections 75 and the center and which are arranged concentrically at a predetermined clearance.

Figure 15:
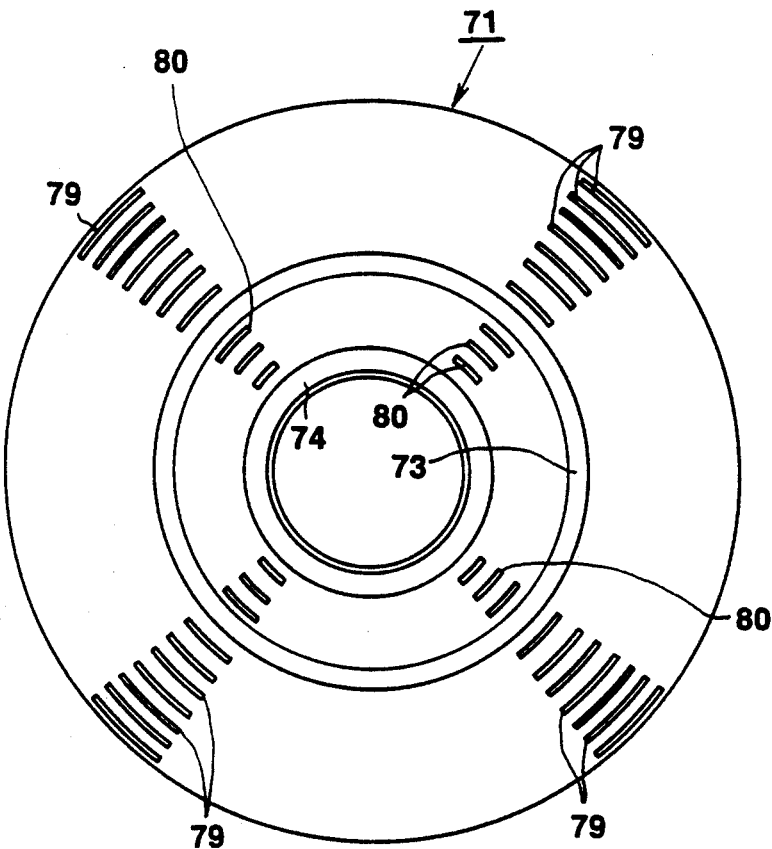
FIG. 15 is a front elevation showing a driven member in the third embodiment.
Figure 16:
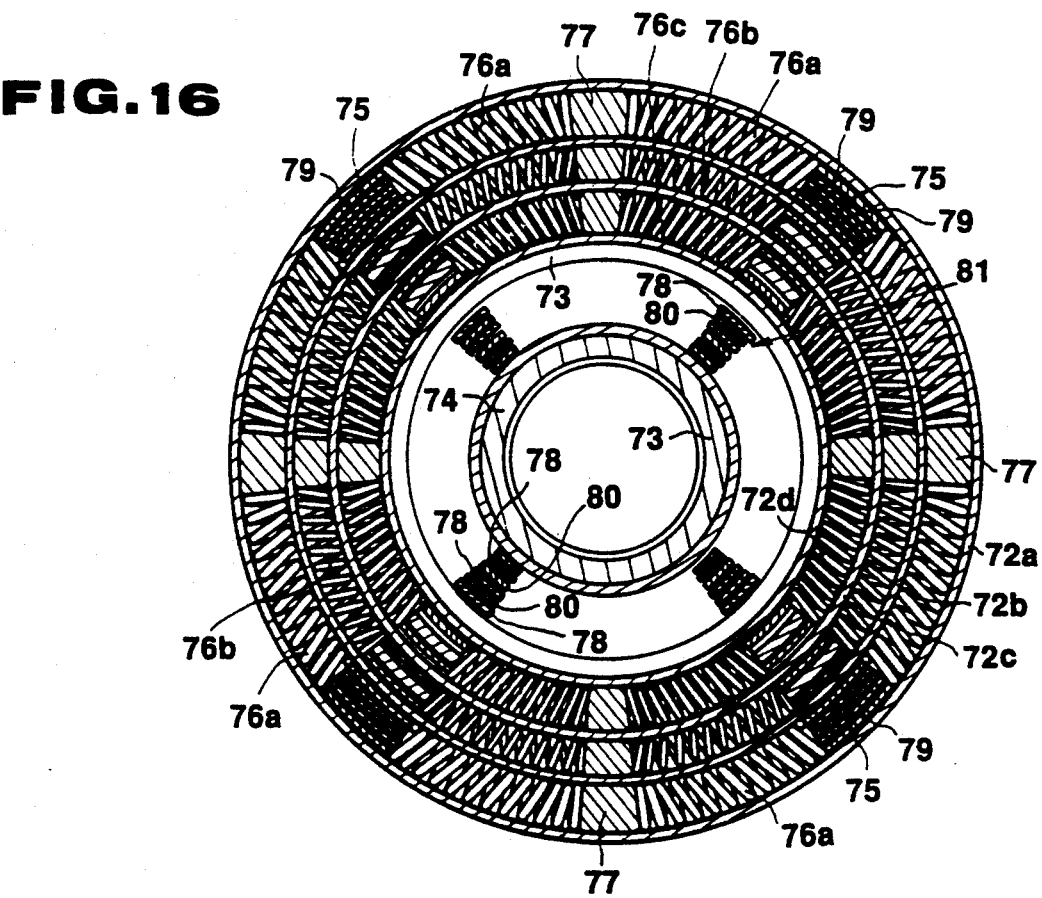
FIG. 16 is a section taken along line XVI—XVI of FIG. 12.

FIG. 15 is a front elevation showing the driven member 71 and taken from the side facing the drive member 72. The driven member 71 is formed with push projections 79 corresponding to the stopper projections 75. Specifically, the push projections 79 are shaped into arcs having substantially equal lengths to those of the corresponding stopper projections 75. When the drive member 72 and the driven member 71 are assembled, as shown in FIG. 16, the push projections 79 are interleaved in the grooves between the individual annular projections 72a to 72e and the individual stopper projections 75 but at predetermined clearances from the corresponding ones of the stopper projections 75.

The driven member 71 is further formed with three arcuate projections 80 which are to be interleaved on the three arcuate projections 78 formed on the drive member 72. The arcuate projections 80 are positioned concentrically with the aforementioned push projections 79, sealing projection 73 and boss 74.

When the driven member 71 is brought into abutment against the drive member 72 holding the numerous damper springs 76a, 76b and 76c, the push projections 79 are individually interleaved between the stopper projections 75, and the arcuate projections 80 are interleaved between the three arcuate projections 78. Moreover, the sealing projection 73 is held liquid-tight in sliding contact with the annular projection 72d, and the boss 74 is held liquid-tight in sliding contact with the annular projection 72e. Still moreover, a viscous attenuation mechanism 81 is constructed by injecting highly viscous oil such as silicone oil into a hollow portion which is formed closer to the center and sealed up with the sealing member 74a between the drive member 72 and the driven member 71.

To the inner surface of the front cover 42a of the housing 42, there is adhered the friction member 59. If the drive member 72 is pushed onto the friction member 59, the input torque is transmitted to the output shaft 46 through the drive member 72, the damper springs 76a, 76b and 76c and the driven member 71. Thus, here is constructed a lock-up clutch 82.

Figure 12:
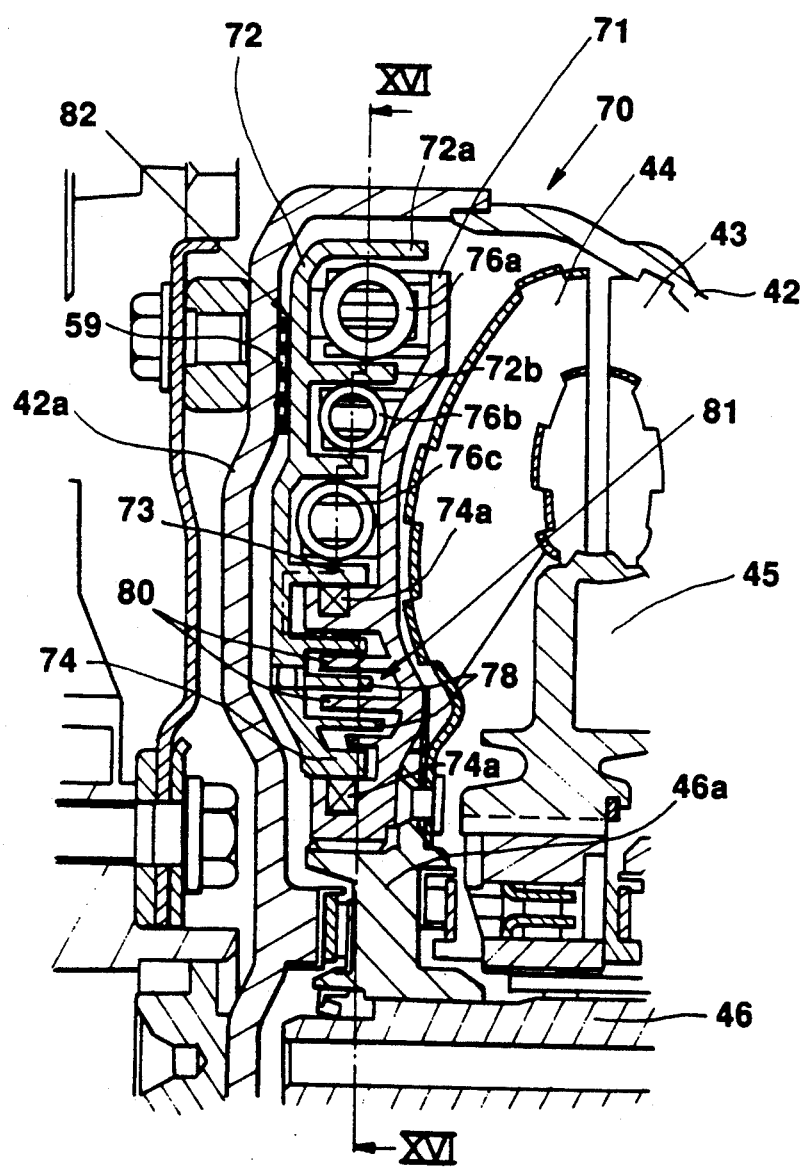
FIG. 12 is a section showing a torque converter according to a third embodiment.

As has been described hereinbefore, the torque converter 70 shown in FIG. 12 is constructed such that the viscous attenuation mechanism 81 is disposed closer to the center of the driven member 71 and the drive member 72 by separating the viscous torque generation unit and the damper unit, and such that the outer circumferential portion fitting the damper springs 76a, 76b and 76c is filled up with the AT oil of low viscosity, which also fills up the inside of the housing 42. As a result, the frictional resistance to the oil when the damper springs 76a, 76b and 76c are compressed or tensed is reduced to a lower level than that of the torque converter 40 of the first embodiment, in which the whole structure including the damper unit is arranged in the highly viscous oil, so that the booming noise can be reduced.

FIGS. 17 to 20 show a fourth embodiment of the present invention, in which the shown torque converter has its viscous attenuation mechanism arranged at the outer circumference. Like the aforementioned torque converters 40 and 70 of the aforementioned two embodiments, a torque converter, as generally designated at 90, is provided, in the housing 42, with: the pump impeller 43 made rotatable integrally with the housing 42; the turbine runner 44, to which the torque is transmitted from the pump impeller 43 through the AT oil; and the stator 45. In the housing 42, moreover, there is disposed at the side of the turbine runner 44 a disc-shaped driven member 91 which is made rotatable with the turbine runner 44 and axially movable on the output shaft 46 through the hub 46a. Between the driven member 91 and the front cover 42a of the housing 42, on the other hand, there is arranged a drive member 92, which is formed, as shown, of a disc portion facing the driven member 91 and a cylindrical portion axially extending from the outer circumference of the disc portion. Moreover, the drive member 92 is axially slidably supported such that its outermost annular projection 92a and next annular projection 92b have their outer surfaces slidably interleaved on both a sealing projection 93, which is formed closer to the outer circumference of the driven member 91, and the outer circumference of the driven member 91. At the same time, the drive member 92 is sealed liquid-tight by X-shaped sealing members 94 which are fitted in the sliding portion of the driven member 91.

On the other hand, the surface of the drive member 92 facing the driven member 91 is formed with concentric annular projections 92a, 92b, 92c, 92d and 92e. Stopper projections 95 are so formed between the annular projections 92b and 92c, between the annular projections 92c and 92d and between the annular projections 92d and 92e that they are positioned to quarter the circumference and shaped into arcs forming part of the concentric circles. In other words, the stopper projections 95 are formed by cutting the annular projections partially to predetermined lengths to leave annular notches, in which the following damper springs are fitted. In the three grooves defined by the stopper projections 95, specifically, there are fitted eight for each groove and totally twenty four damper springs 96a, 96b and 96c which have smaller spring constants than those of the damper springs used for similar applications in the prior art. This fitting state will be described more specifically with reference to FIG. 18. Each pair of the damper springs 96a, 96b and 96c is fitted between the circumferentially adjacent stopper projections 95, i.e., in each notch such that the paired springs sandwich spacer blocks 97 inbetween. Incidentally, these spacer blocks 97 are made circumferentially movable like the spacer blocks 51 of the foregoing embodiments and are provided for shortening the lengths of the individual damper springs 96a, 96b and 96c to prevent their buckling. on the other hand, these damper springs 96a, 96b and 96c may be given different spring constants.

Figure 20:
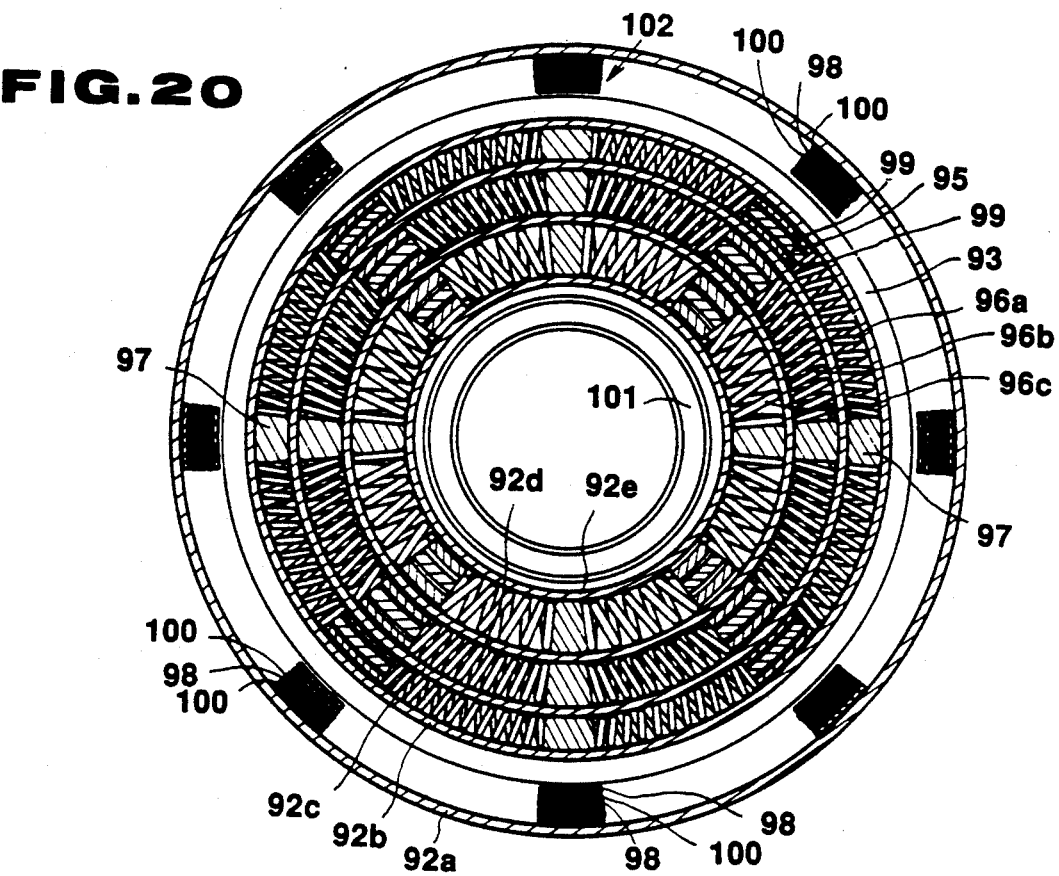
FIG. 20 is a section taken along line XX—XX of FIG. 17.

In the groove, which is sealed up by the X-shaped sealing members 94 between the annular projection 92a and the annular projection 92b, there are formed eight groups each composed of three arcuate projections 98, which are positioned on lines joining the stopper projections 95 and the center and which are arranged concentrically at a predetermined clearance. The surface of the driven member 91 facing the drive member 921 is formed with push projections 99. These push projections 99 are shaped into arcs having substantially equal lengths to those of the corresponding stopper projections 95. When the drive member 92 and the driven member 91 are assembled, as shown in FIG. 20, the push projections 99 are interleaved in the grooves between the individual annular projections 92a to 92e and the individual stopper projections 95 but at predetermined clearances from the corresponding ones of the stopper projections 95.

The driven member 91 is further formed with groups each composed of three arcuate projections 100, which are to be interleaved on the groups each composed of there arcuate projections 98 formed on the drive member 92. The arcuate projections 100 are positioned concentrically with the aforementioned push projections 99, sealing projection 93 and boss 101.

When the driven member 91 is brought into abutment against the drive member 92 holding the numerous damper springs 96a, 96b and 96c, the push projections 99 are individually interleaved between the stopper projections 95, and the arcuate projections 100 are interleaved between the three arcuate projections 98. Moreover, the sealing projection 93 is held liquid-tight in sliding contact with the annular projection 92b, and the outer circumference of the driven member 91 is held liquid-tight in sliding contact with the annular projection 92a. Still moreover, a viscous attenuation mechanism 102 is constructed by injecting highly viscous oil such as silicone oil into a hollow portion which is formed in the outer circumference and sealed up with the sealing members 94 between the drive member 92 and the driven member 91.

To the inner surface of the front cover 42a of the housing 42, there is adhered the friction member 59. If the drive member 92 is pushed onto the friction member 59, the input torque is transmitted to the output shaft 46 through the drive member 92, the damper springs 96a, 96b and 96c and the driven member 91. Thus, here is constructed a lock-up clutch 103.

Figure 17:
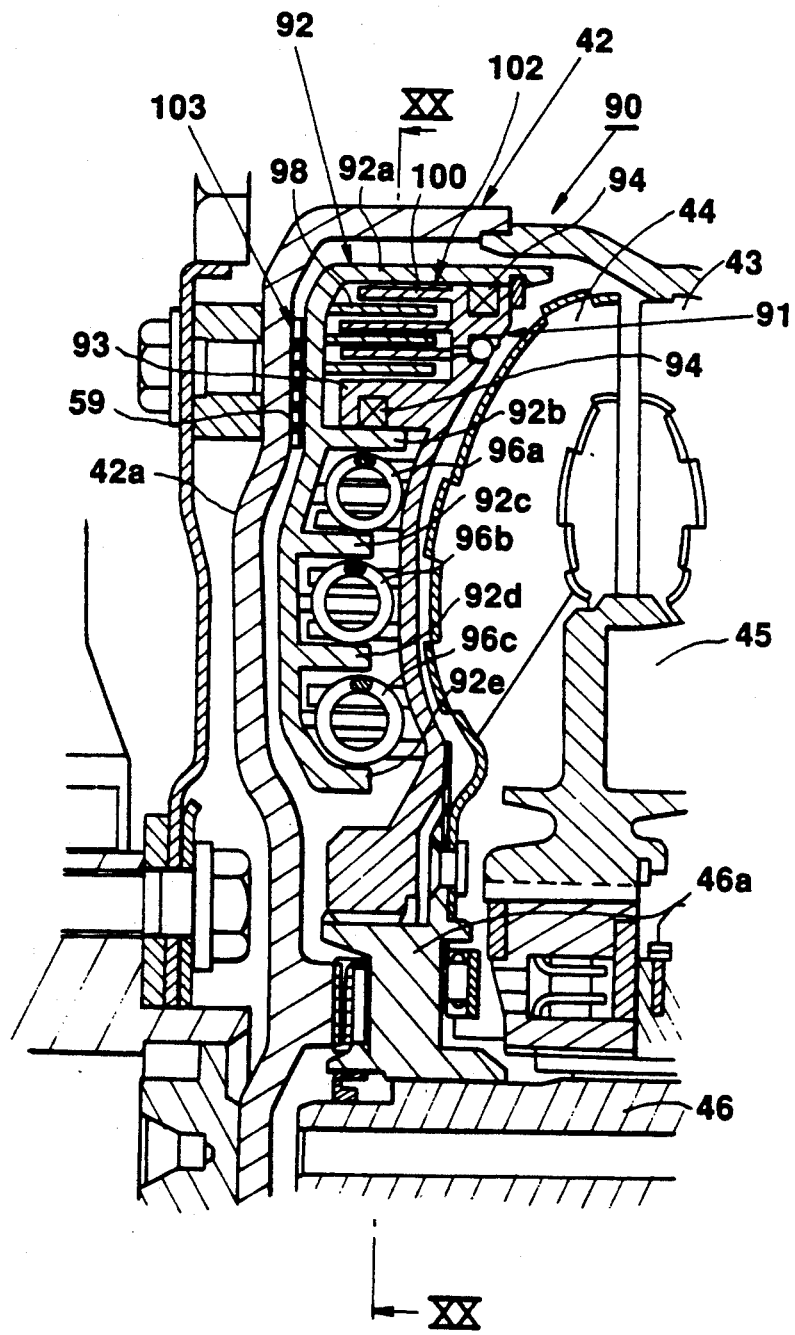
FIG. 17 is a section showing a torque converter according to a fourth embodiment.
Figure 18:
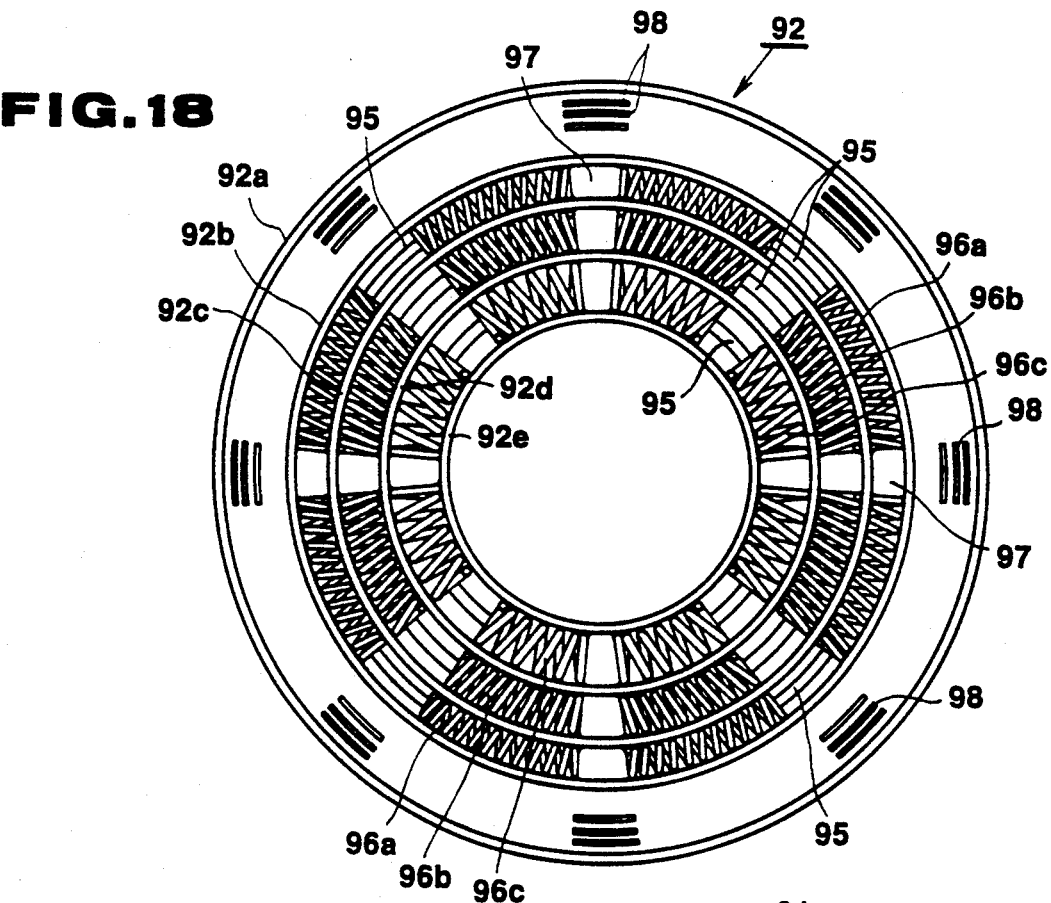
FIG. 18 is a front elevation showing a drive member in the fourth embodiment.
Figure 19:
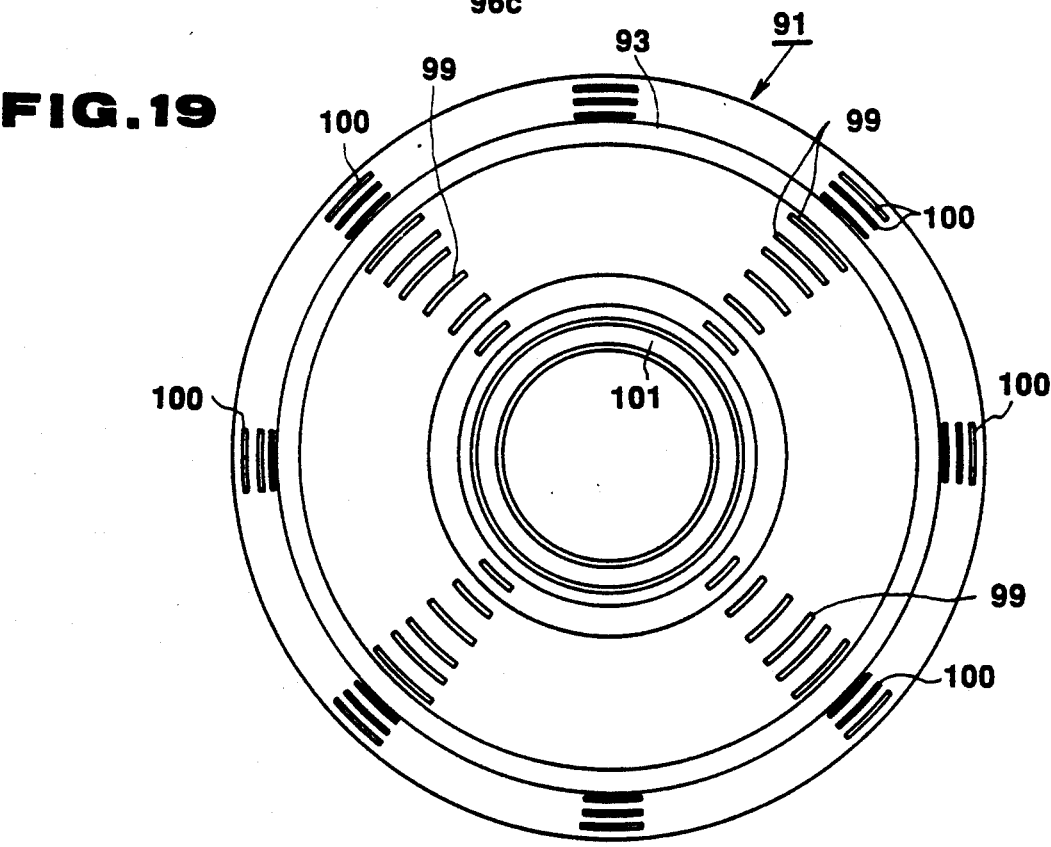
FIG. 19 is a front elevation showing a driven member in the fourth embodiment.

As has been described hereinbefore, the torque converter 90, as shown in FIG. 17, has its viscous attenuation mechanism 102 disposed at the outer circumference so that it can achieve a higher viscous torque than that of the third embodiment and is superior in the action to prevent the surging.

Here will be described a fifth embodiment of the present invention, in which the viscous torque is prominently changed in dependence upon the relative angle of rotation (or angle of torsion) of the drive member and the driven member.

Figure 21:
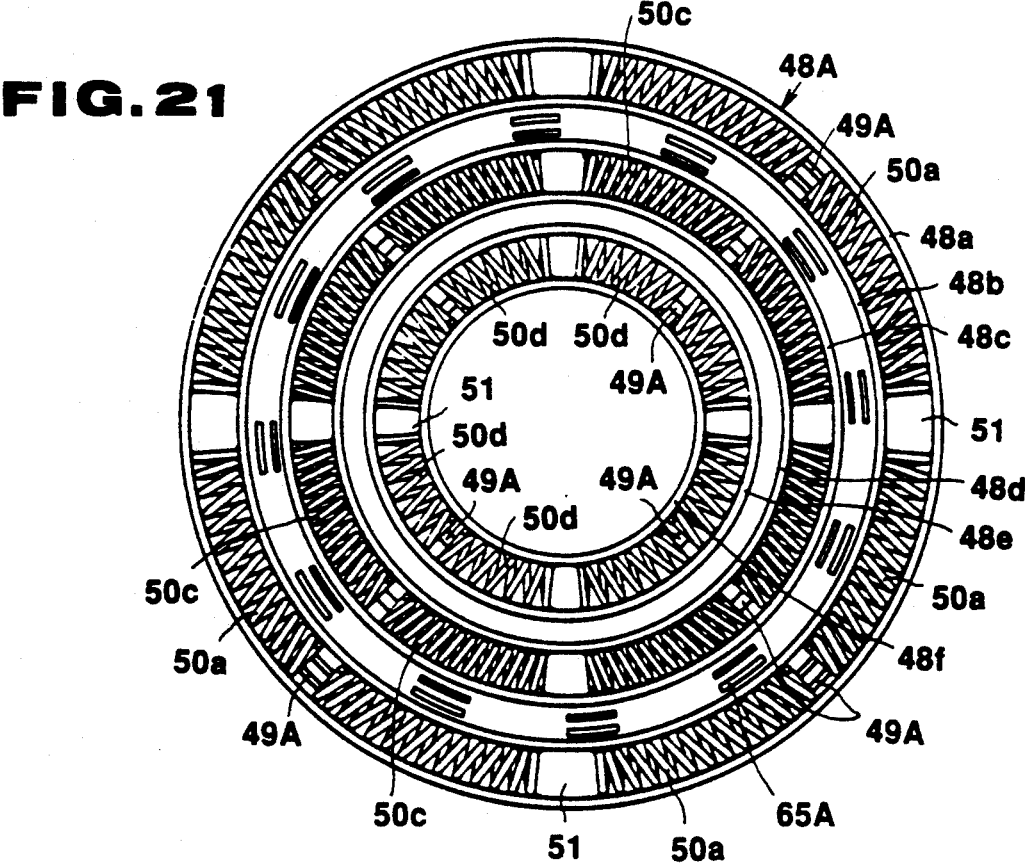
FIG. 21 is a front elevation showing a drive member in a fifth embodiment.

A drive member 48A, as shown in FIG. 21, is an improvement over the aforementioned drive member 48 shown in FIG. 10. In this improvement, stopper projections 49A are made shorter than the stopper projections 49 of the drive member 48 of FIG. 10. Moreover, the second groove from the outer circumference is formed with a plurality of pairs of arcuate projections 65A in place of the aforementioned annular projections 65. The paired annular projections 65A are formed at a constant spacing in the circumferential direction. The remaining structure is identical to that shown in FIG. 10, and the shared structural components are designated at the common reference numerals in FIG. 21 while their description being omitted.

Figure 22:
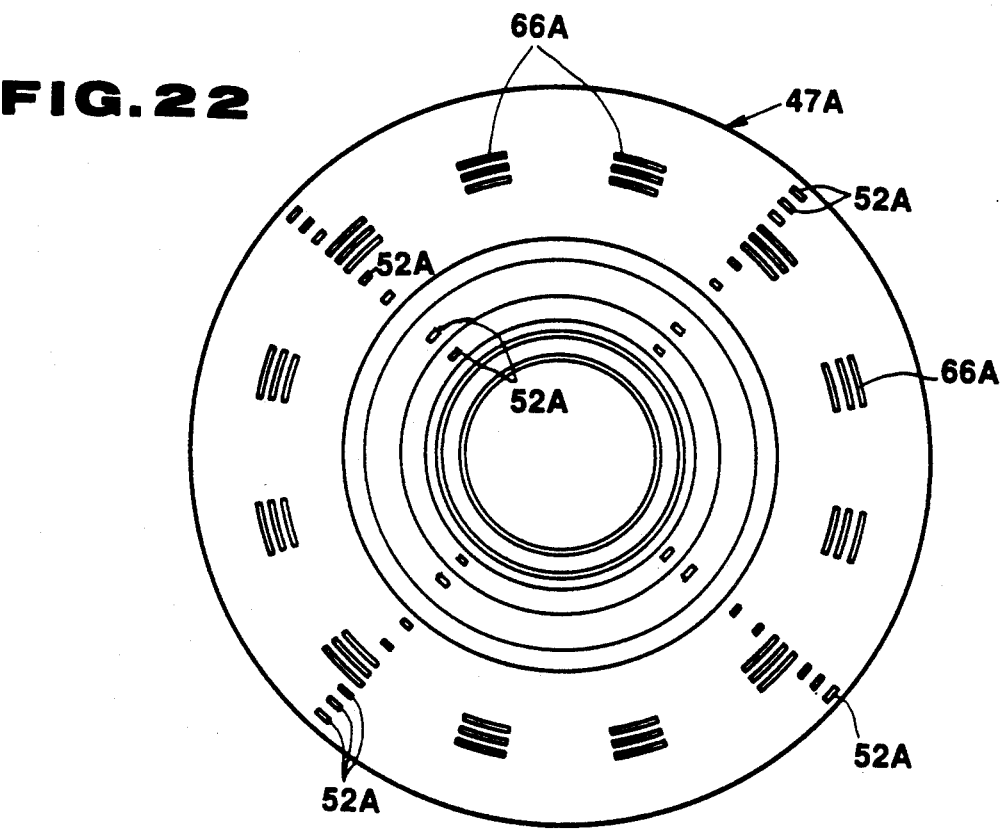
FIG. 22 is a front elevation showing a driven member in the fifth embodiment.

On the other hand, a driven member 47A, as shown in FIG. 22, is an improvement of the aforementioned driven member 47 shown in FIG. 11. The driven member 47A is formed with push projections 52A, which are shortened to correspond to the stopper projections 49A shown in FIG. 21, and further with a plurality of groups each composed of three arcuate projections 66A. These arcuate projections 66A are given a substantially equal length to that of the arcuate projections 65A and arranged at a constant spacing in the circumferential direction. The remaining structure is identical to that shown in FIG. 11.

Figure 24:
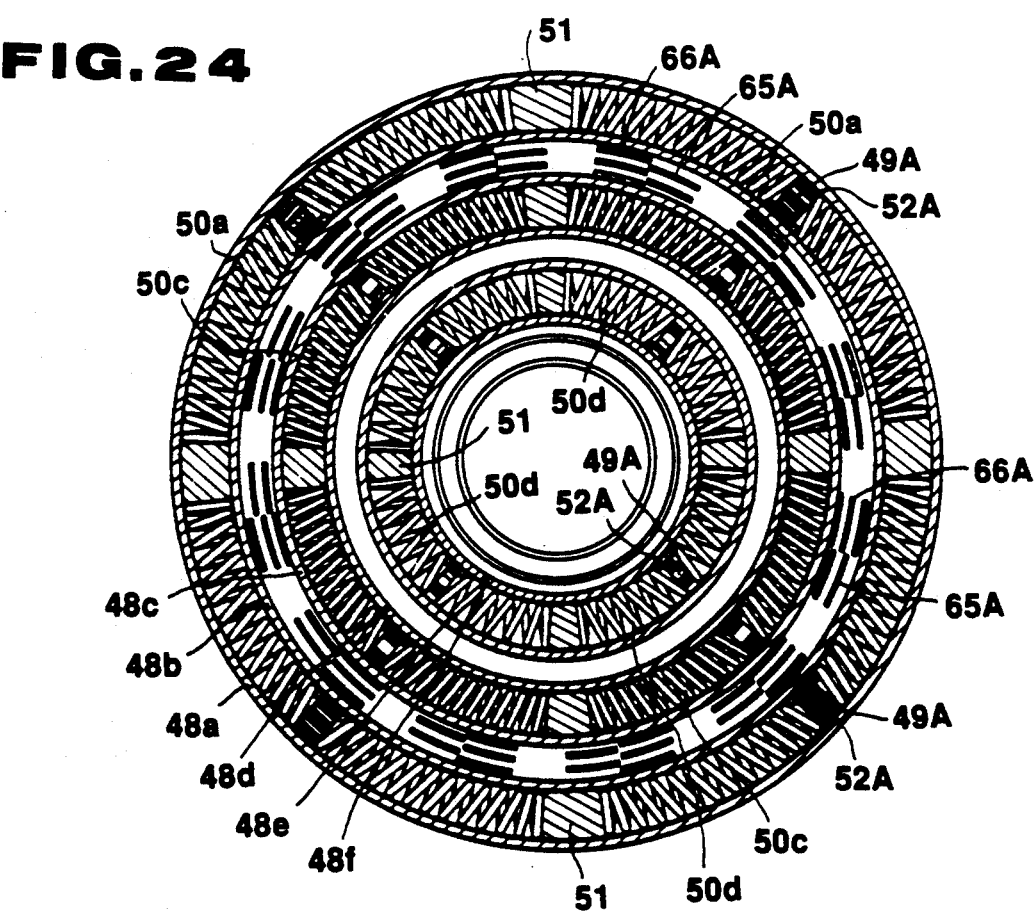
FIG. 24 is a sectional front elevation showing the drive member which is provided with the driven member in the fifth embodiment.
Figure 23:
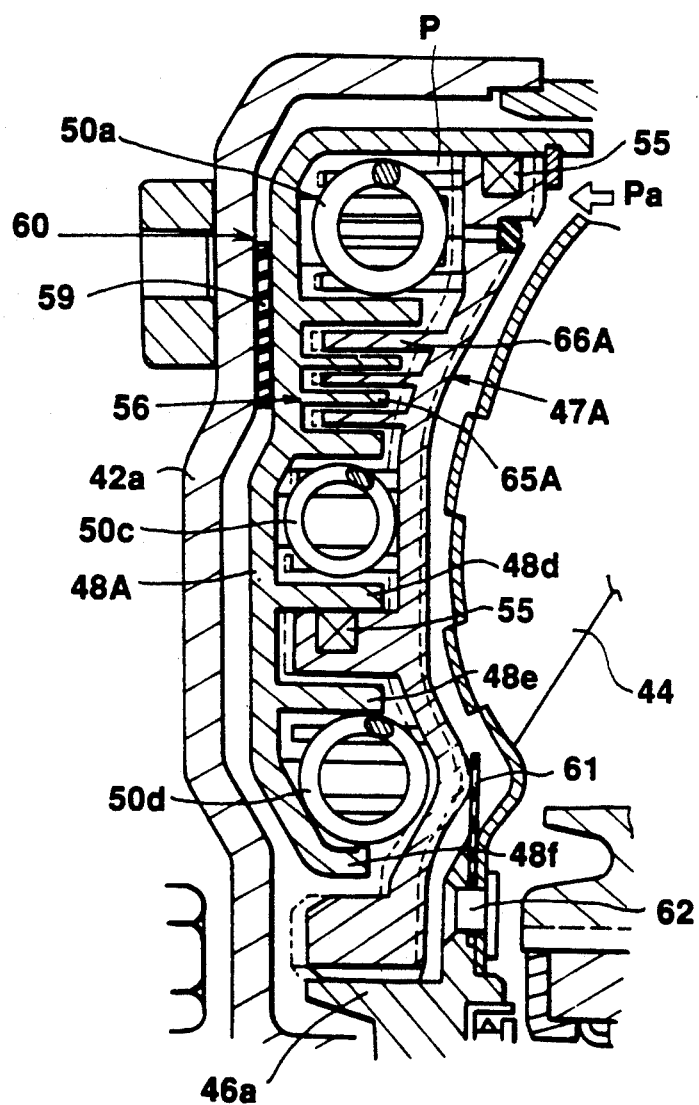
FIG. 23 is a section showing a major portion of a torque converter according to the fifth embodiment.

These drive member 48A and driven member 47A are assembled like the foregoing second embodiment, as shown in FIG. 23, to construct the torque converter. FIG. 24 is a section showing the state in which the drive member 48A and the driven member 47A are assembled. In FIGS. 23 and 24, the identical portions to those of FIGS. 6 to 9 and 10 are designated at the common reference numerals, and their description will be omitted.

The operations of the torque converter shown in FIGS. 21 to 24 will be described in the following.

Before the running state of the vehicle reaches the lock-up range, the oil is fed to the clearance between the front cover 42a and the drive member 48A so that the drive member 48A is apart from the friction member 59 adhered to the inner surface of the front corner 42a, thus establishing a state in which the lock-up clutch 60 is released. In this state, the torque is transmitted from the pump impeller integrated with the housing through the AT oil to the turbine runner 44 and further to the output shaft. Thus, outside of the lock-up range, the torque transmission through the fluid is effected, and the vibrations due to the torque fluctuations are absorbed as a result of the slippage of the torque converter 40.

Since, in this state, the drive member 48A and the driven member 47A are not rotating relative to each other, the relative positions between the stopper projections 49A and the push projections 52A and between the individual arcuate projections 65A and 66A are fixed, as shown in FIG. 24.

Moreover, for example, when the vehicle speed increases so that the running state of the vehicle reaches the lock-up range, the oil pressure Pa at the side of the turbine runner 44 is increased relative to the oil pressure between the front cover 42a and the drive member 48A. As a result, the driven member 47A is moved toward the front cover 4a (i.e., leftwardly of FIG. 23). Since a suitable amount of air is filled together with the highly viscous oil between the driven member 47A and the drive member 48A, the drive member 48A is pushed toward the front cover 42a and onto the friction member 59 as the driven member 47A moves. In other words, the lock-up clutch 60 is engaged. In this case, when the drive member 48A just begins contacting with the frictional member 59, the air confined together with the highly viscous oil is not compressed yet so that the engaging pressure of the lock-up clutch 60 is still low. After this, the driven member 47A is further moved to get close to the drive member 48A thereby to compress the aforementioned air. Then, the pressure between the drive member 48A and the driven member 47A is gradually increased so that the engaging pressure of the lock-up clutch 60 is accordingly increased. In other words, the air confined together with the highly viscous oil performs the damping action so that the engaging pressure of the lock-up clutch 60 is gradually increased.

When the lock-up clutch 60 is in complete engagement, the drive member 48A rotates integrally with the housing so that the input torque is transmitted from the drive member 48A through damper springs 50a, 50c and 50d to the driven member 47A and further to the output shaft. If, in this state, the torque fluctuations of the engine are inputted, for example, the driven member 47A mounted on the output shaft and the drive member 48A rotate relative to each other so that the angle of their relative displacement (as will be called the "angle of torsion") is increased to compress the damper springs 50a, 50c and 50d thereby to reduce the vibrations. If, moreover, the vehicle is running on a rough road so that the torque to be inputted from the wheels is high, the individual damper springs 50a, 50c and 50d are also compressed. Specifically, the angle of torsion between the drive member 48A and the driven member 47A is further increased to reach a predetermined value. Then, the viscous attenuation mechanism 56 has its individual arcuate projections 65A and 66A superposed radially to establish a shearing resistance due to the highly viscous oil.

This resistance established by the viscous attenuation mechanism 56 suppresses the change in the angle of torsion to absorb the input torque partially. As a result, the shocks, which might otherwise be increased by the abrupt rise in the torque, can be reduced to prevent any overload upon the individual damper springs 50a, 50c and 50d. Thus, it is possible to prevent the damage of the springs due to the overload and to prevent the shortening of the lifetime.

Figure 25A:
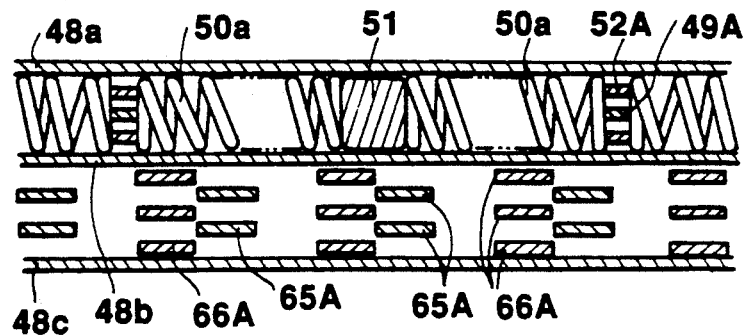
FIGS. 25A to 25C are partial sections showing linear models for explaining the operations of a viscous attenuation mechanism in the fifth embodiment.

The positional relations and operations of the individual arcuate projections 65A and 66A composing the viscous attenuation mechanism 56 will be described in connection with the linear models shown in FIGS. 25A to 25C. The drive member 48A and the driven member 47A are so assembled in phase that they take the state of the linear model of FIG. 25A when the individual arcuate projections 65A and 66A are positioned at the angle of torsion=0 degrees.

Figure 25B:
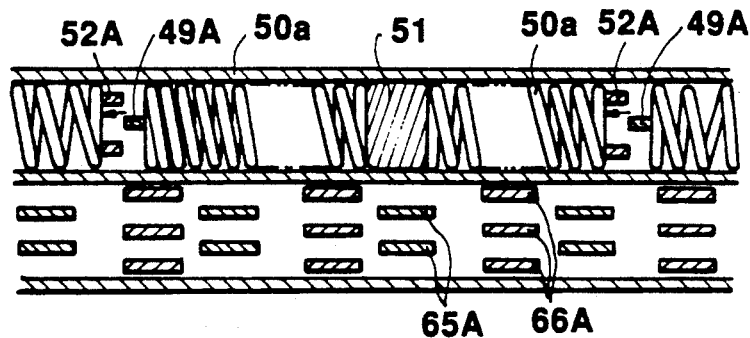
Figure 25C:
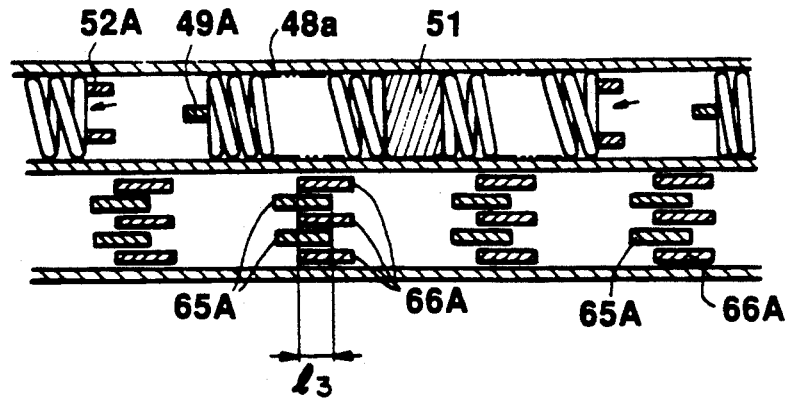

When the lock-up clutch 60 is engaged, the damper springs 50a, 50c and 50d connecting the drive member 48A and the driven member 47A are compressed by the torque of the engine so that the torque is transmitted in the slightly twisted state (as shown in FIG. 25B). As a result, the vibrations to be caused by the torque fluctuations of the engine or the like are reduced because the damper springs 50a, 50c and 50d are compressed or tensed.

When a high torque is inputted from the wheels so that the angle of torsion between the driven member 47A and the drive member 48A reaches a predetermined angle, the arcuate projections 65A individually come into engagement with the arcuate projections 66A so that a highly viscous attenuation force (as will be called the "viscous torque") is established by the shearing resistance of the highly viscous oil. At this time, the overlapped length $l_3$ of the individual arcuate projections 65A and 66A is changed (as shown in FIG. 25C) in proportion to the magnitude of the torque inputted.

In case, on the other hand, the driven member 47A and the drive member 48A are relatively disposed in the opposite directions (or negative directions), although not shown, the arcuate projections 65A and 66A begin their overlap simultaneously with the establishment of the relative displacements so that the viscous torque is established to reduce the vibrations instantly.

Figure 26A:
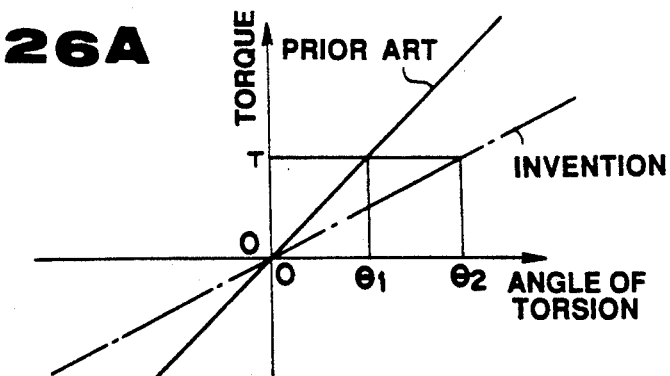
FIGS. 26A to 26D are diagrams showing the viscous attenuation characteristics of the fifth embodiment.

In this embodiment, the damper springs 50a, 50c and 50d used are large in the number but small in the value of their spring constants. As seen from the diagram of FIG. 26A showing the difference in the torsion characteristics, the stopper projections 49A and the push projections 52A have their interleaving states changed to establish the viscous torque, when the damper springs 50a, 50c and 50d are compressed in the present embodiment to the angle of torsion $\theta_2$ ($>\theta_1$, i.e., the angle of torsion of the damper springs used in the prior art). Thus, the amount of deformation of the damper spring 50a can be two times as large as that of the prior art so that the booming noise can be effectively prevented.

Figure 26B:
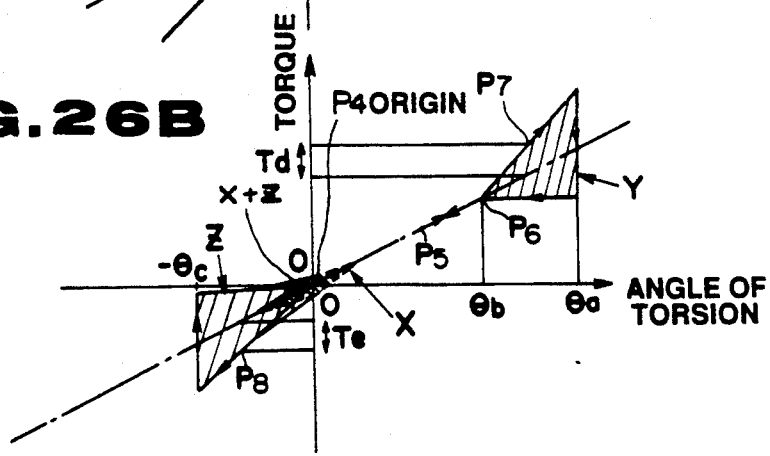

On the other hand, FIG. 26B shows the case, in which the surging phenomena occur to cause vibrations between the angles of torsion $\theta_a$ and $-\theta_c$. Here, it is assumed that the angle of torsion $\theta$ taken in the direction to compress the damper spring 50a be increased or decreased at a constant rate. With this assumption, the overlapped length of the arcuate projections 65A and 66A is at 0 degrees, namely, l=0 in the vicinity of point $P_4$ (at an angle of torsion $\theta=0$ degrees). As a result, no viscous torque is established but for the viscous torque which is generated by the stopper projections 49A and the push projections 52A (as indicated at X in FIG. 26B).

At point $P_5$, on the other hand, the individual arcuate projections 65A and 66A are not overlapped to establish no viscous torque. Nor is established the viscous torque by the stopper projections 49A and the push projections 52A.

At point $P_6$, moreover, the arcuate projections 65A and 66A begin their overlapping to generate the viscous torque. When the arcuate projections 65A and 66A take an overlapped length $l_3$ at point $P_7$ (in the state, as shown in FIG. 25C), the viscous torque=Td so that the viscous attenuation acts in the hatched range Y, as shown in FIG. 26B.

If the angle of torsion is negative, on the other hand, the individual arcuate projections 65A and 66A overlap each other while establish the angle of torsion between the driven member 47A and the drive member 48A. At point P$_8$, the viscous torque Te is generated so that the viscous attenuation acts in the hatched range Z, as shown in FIG. 26B.

Figure 26C:
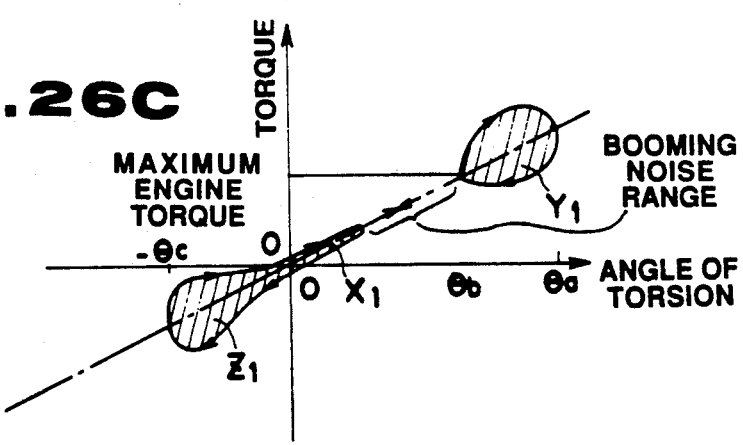

Incidentally, the increasing or decreasing rate of the angle of torsion takes its maximum, when the angle of torsion is in the vicinity of $\{\theta_a+(-\theta_c)\}$, and is reduced to 0 when the angle of torsion is the maximum or minimum. As a matter of fact, as shown in FIG. 26C, a high viscous attenuation occurs in the hatched ranges Y$_1$ and Z$_1$ so that the energy is absorbed to prevent the surging.

Figure 26D:
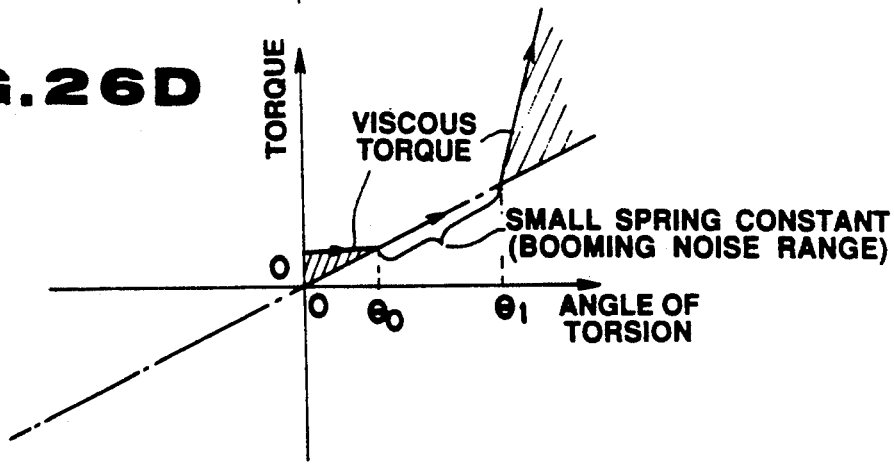

Moreover, FIG. 26D shows the torsion characteristics when a torque having a high rate of angle of torsion, i.e,. a high torque is inputted in an impact manner. Then, the viscous torque is established in the hatched ranges.

When this high impact torque is inputted, the viscous torques to be individually generated by the stopper projections 49A, the push projections 52A and the arcuate projections 65A and 66A are higher because of their high angular rates than those to be generated for preventing the surging or the booming noise. As a result, the shocks due to the abrupt rise of the torques can be absorbed to prevent the damper springs from being damaged by the overload. Thus, the energy is thermally absorbed by the viscous attenuation so that the damper springs are protected. As a result, the shocks can be reduced to a lower level than those which are caused by the spring protection mechanism using the double damper springs of the prior art, as could be illustrated by folded line in the spring characteristic diagram, so that the damper springs can be protected against the overload while retaining an excellent driving feel.

FIGS. 27 to 31 show a sixth embodiment of the present invention. This sixth embodiment is constructed such that the viscous attenuation mechanism establishes the viscous torque, when the angle of torsion θ is at 0 degrees, but not temporarily as the angle θ increases.

Figure 27:
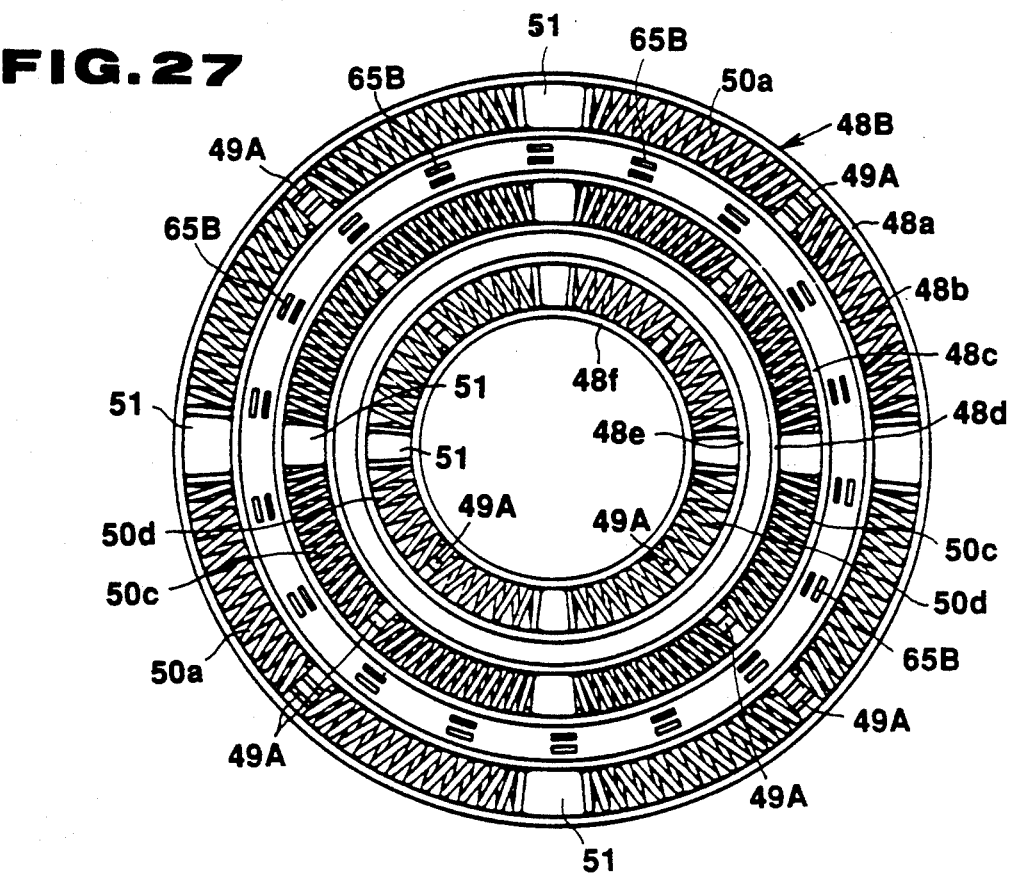
FIG. 27 is a front elevation showing a drive member in a sixth embodiment.

FIG. 27 shows a drive member 48B in the sixth embodiment, which is improved over the drive member 48A shown in FIG. 21. Specifically, the drive member 48B is formed with a larger number of pairs of shorter arcuate projections 65B than the projections shown in FIG. 21. The remaining structure is similar to that of the drive member 48A shown in FIG. 21.

Figure 28:
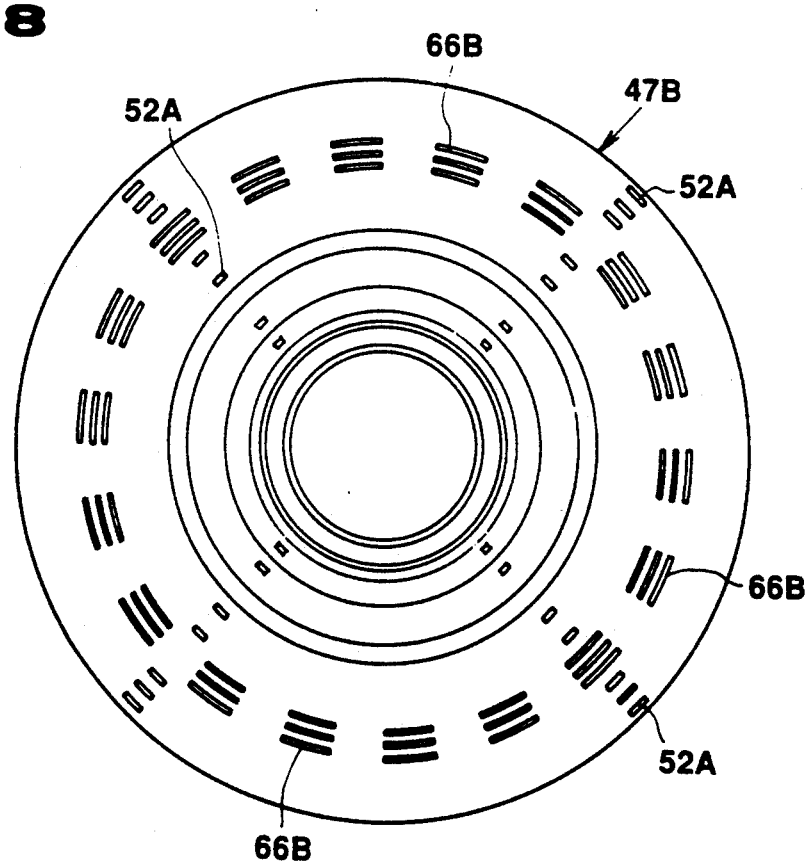
FIG. 28 is a front elevation showing a driven member in the sixth embodiment.

FIG. 28 shows a driven member 47B in the sixth embodiment, which is improved over the driven member 47A shown in FIG. 22. Specifically, the driven member 47B is formed with a plurality of groups each composed of three arcuate projections 66B. These arcuate projections 66B are given a length equal to that of the projections shown in FIG. 22 and are identical in the number to that of the arcuate projections 65B shown in FIG. 27. As a result, the circumferential clearance between the arcuate projections 66B is narrower than that of the projections shown in FIG. 22. The remaining structure is identical to that of the driven member 47A shown in FIG. 22.

Figure 29:
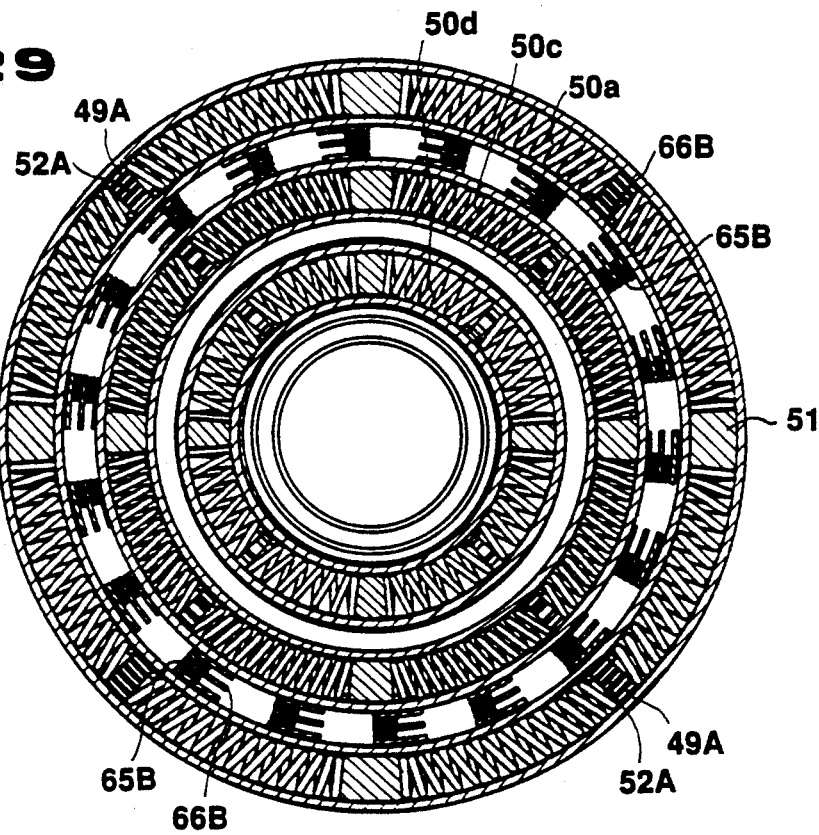
FIG. 29 is a sectional front elevation showing the drive member provided with the driven member in the sixth embodiment.

The drive member 48B shown in FIG. 27 and the driven member 47B shown in FIG. 28 are assembled like the aforementioned drive member 48A and driven member 47A of the foregoing fifth embodiment, to constitute a torque converter. This torque converter has a section identical to that of FIG. 23 so that its illustration is omitted. FIG. 29 is a section showing the state, in which the drive member 48B and the driven member 47B are assembled. Incidentally, FIG. 29 shows the state for an angle of torsion=0 degrees.

Figure 30A:
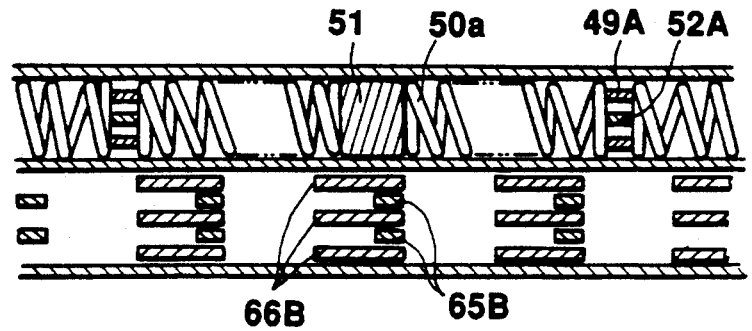
FIGS. 30A to 30C are partial sections showing linear models for explaining the viscous attenuation mechanism in the sixth embodiment.

In the torque converter of the sixth embodiment using the drive member 48B and driven member 47B thus far described, the drive member 48A and the driven member 47A are so assembled in phase that they take the state of the linear model of FIG. 30A for the angle of torsion=0 degrees, namely, that the individual arcuate projections 65B and 66B are interleaved on each other.

Figure 30B:
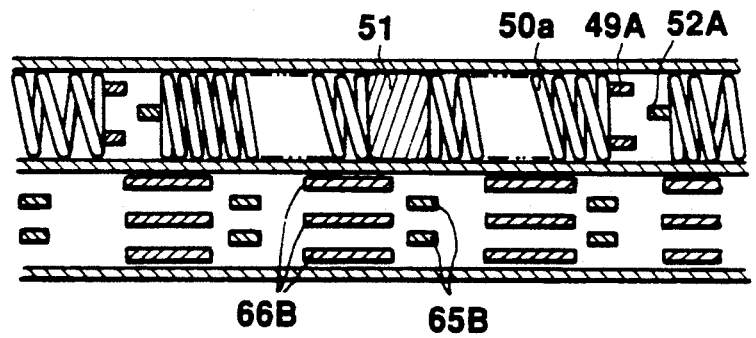

When the lock-up clutch is engaged, the damper springs 50a, 50c and 50d connecting the drive member 48B and the driven member 47B are compressed so that the torque is transmitted in the slightly twisted state (as shown in FIG. 30B). As a result, the torque fluctuations of the engine or the like are absorbed because the damper springs 50a, 50c and 50d are compressed or tensed.

Figure 30C:
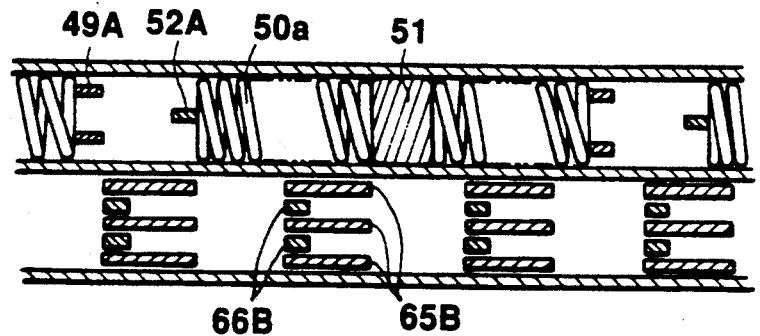

When a high torque is inputted from the wheels so that the angle of torsion between the driven member 47B and the drive member 48B having a high angular rate exceeds a predetermined angle, the arcuate projections 65B are individually overlapped with the arcuate projections 66B so that a high viscous torque is established by the shearing resistance of the highly viscous oil (as shown in FIG. 30C).

In this embodiment, the damper springs 50a, 50c and 50d used are large in the number but small in the value of their spring constants. In case, for example, the surging phenomena occurs so that the torque vibrates between the angles of torsion $\theta_a$ and $-\theta_c$, as shown in the diagram of the spring characteristics of FIG. 31A, the viscous torque is the sum of one, which is caused by the arcuate projections 65B and 66B interleaved on each other (as indicated at Z in FIG. 31A) and one, which is caused by the stopper projections 49A and the push projections 52A (as indicated at X in FIG. 31A), in the vicinity of an origin (for the angle of torsion θ=0 degrees), if the angle of torsion θ of the damper spring 50a is increased or decreased at a constant rate. As a result, the viscous torque is generated simultaneously with the angle of torsion even if this angle is negative.

Between the angles of torsion $\theta_a$ and $\theta_b$, moreover, the individual arcuate projections 65B and 66B are overlapped so that the viscous torque is generated in accordance with the overlapped length. As a result, the viscous attenuation acts in the hatched range, as indicated at Y in FIG. 31A.

Figure 31A:
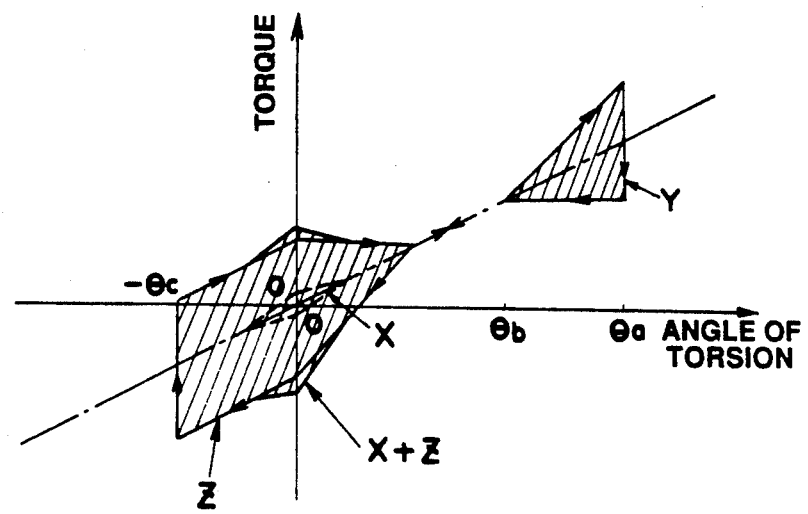
FIGS. 31A and 31B are diagrams showing the viscous attenuation characteristics of the sixth embodiment.
Figure 31B:
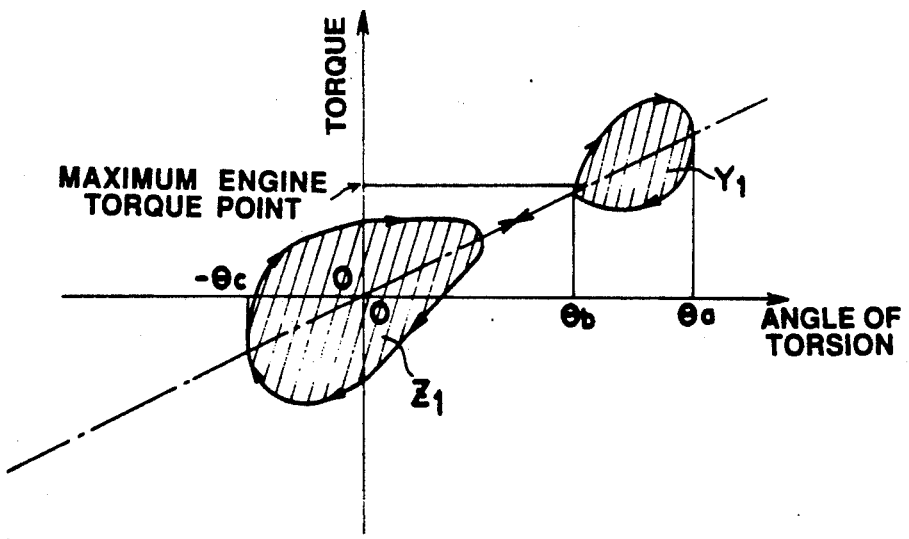

Incidentally, the increasing or decreasing rate of the angle of torsion is not constant but takes its maximum, when the angle of torsion is in the vicinity of $\{\theta a+(-\theta c)\}$, and is reduced to 0 when the angle of torsion is the maximum or minimum. As a matter of fact, as shown in FIG. 31B, a high viscous attenuation occurs in the hatched ranges Y$_1$ and Z$_1$ so that the energy is absorbed. When a high torque is inputted from the wheels, the drive member 48B and the driven member 47B are displaced relative to each other to a predetermined extent or more. As a result, viscous torque having a magnitude according to the angle of torsion is generated to absorb the energy so that the shocks due to the abrupt rise of the torque can be absorbed to prevent the overload upon the damper springs 50a, 50c and 50d and accordingly the damage of the springs. Moreover, the sixth embodiment is effective for preventing the surging because higher viscous torque is established in the vicinity of an angle of torsion $\theta=0$ degrees than that of the foregoing fifth embodiment.

Here will be described an embodiment which is constructed such that the damper mechanism has its spring characteristics changed in two steps.

Figure 32:
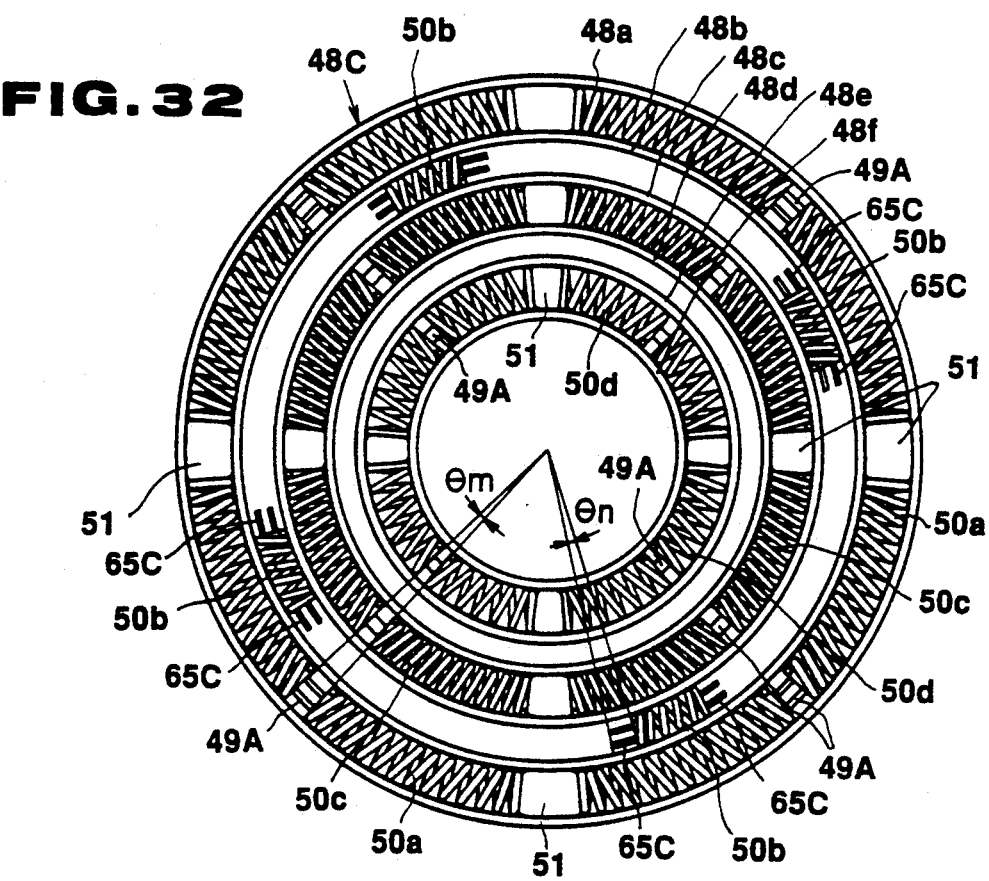
FIG. 32 is a front elevation showing a drive member in a seventh embodiment.

FIG. 32 shows a drive member to be used in this seventh embodiment, which is improved over the drive member 48A shown in FIG. 21. Specifically, the drive member, as indicated at 48C, is provided with four damper springs 50b in the second groove from the outer circumference, i.e., between the annular projections 48b and 48c. These damper springs 50B are equidistantly arranged to have their individual two ends supported by a pair of short arcuate projections 65C. These arcuate projections 65C are given a length to set a central angle $\theta_n$, and the stopper projections 49A are given a length to set a central angle $\theta_m$. Incidentally, the spring constants of the damper springs 50b may be equal to or different from those of the other damper springs 50a, 50c and 50d. The remaining structure of the drive member 48C is identical to that of the drive member 48A shown in FIG. 21, and its description will be omitted by designating it at the reference numerals of FIG. 32.

Figure 33:
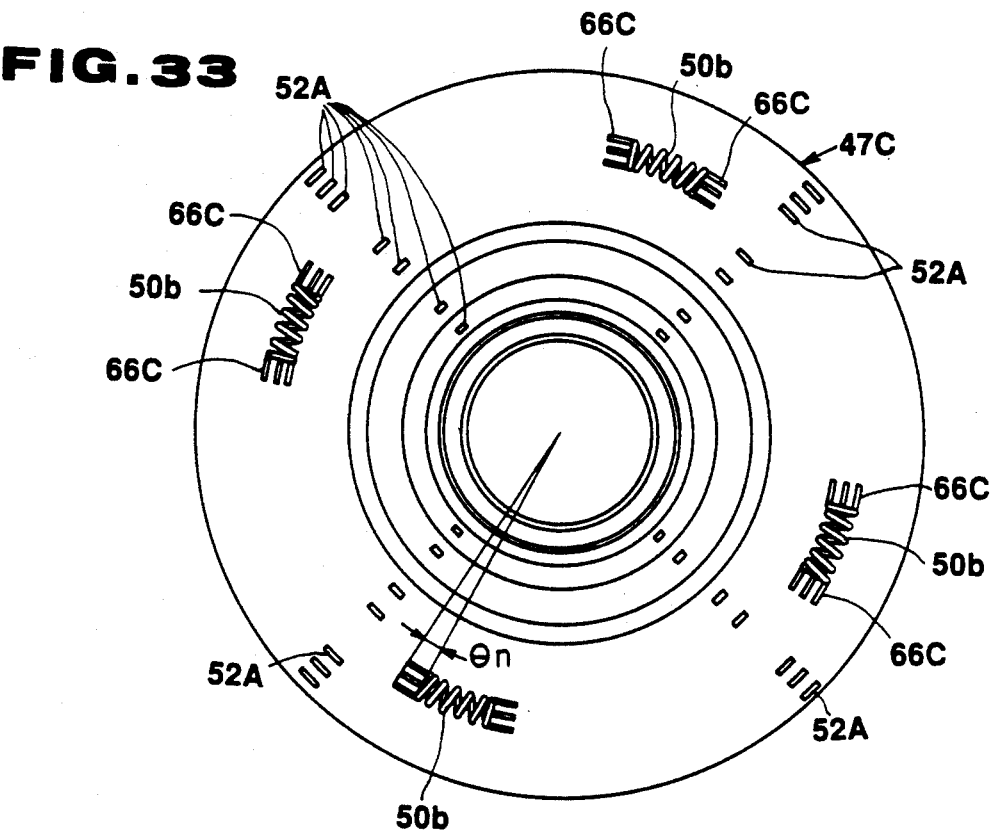
FIG. 33 is a front elevation showing a driven member in the seventh embodiment.

On the other hand, FIG. 33 shows a driven member to be used in the seventh embodiment. This driven member is improved over the driven member 47A shown in FIG. 22. The driven member, as indicated at 47C in FIG. 33, is formed equidistantly with four damper springs 50b which are arranged on a circle having a radius equal to that of the damper springs 50b of the driven member 47C shown in FIG. 32. Each of the four damper springs 50b has its two ends supported by a pair of three short arcuate projections 66C. These arcuate projections 66C are given such a length like the arcuate projections 65C of the drive member 48C as to set the central angle at $\theta_n$. The remaining structure is identical to that of the driven member 47A shown in FIG. 22, and its description will be omitted by designating it at the reference numerals in FIG. 33.

Incidentally, the four damper springs 50b in the drive member 48C and the four damper springs 50b in the driven member 47C are offset from each other at one half pitch in the circumferential direction.

Figure 34:
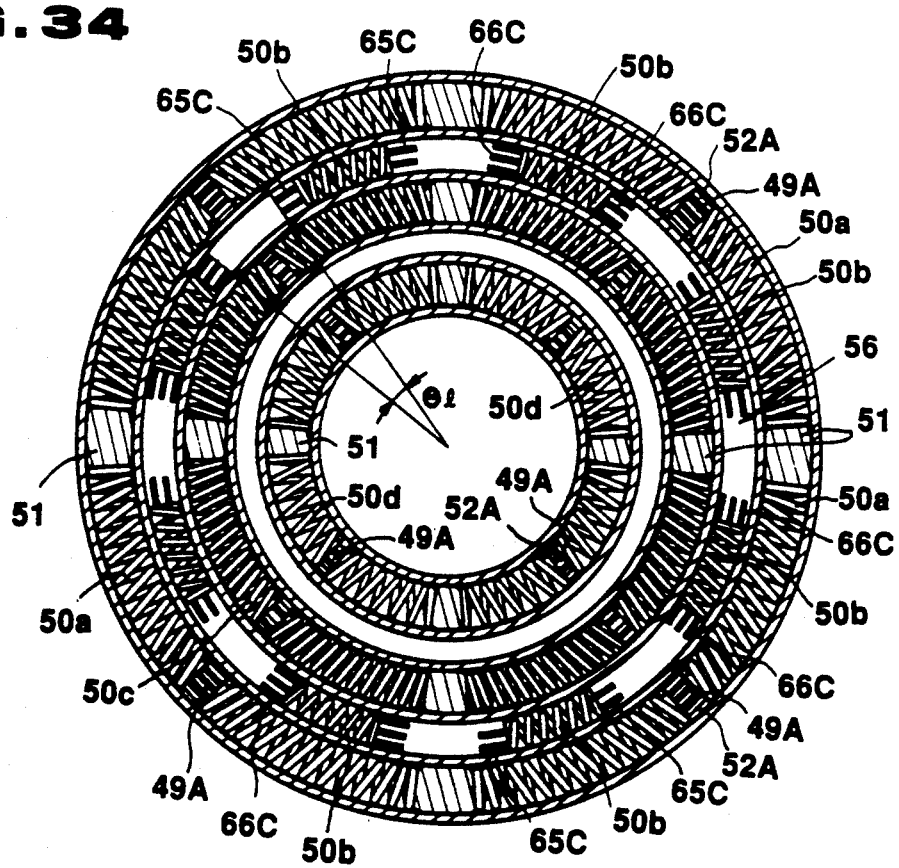
FIG. 34 is a sectional front elevation showing the drive member which is provided with the driven member in the seventh embodiment.

These drive member 48C and driven member 47C are assembled in the torque converter like the drive member 48A shown in FIG. 21 and the driven member 47A shown in FIG. 22. The section of this torque converter is identical to that of FIG. 1 and will be omitted. FIG. 34 is a section showing the state, in which the drive member 48C and the driven member 47C are assembled. Incidentally, FIG. 34 shows the state for the angle of torsion at 0 degrees, and the clearance between the ends of the arcuate projections 65C of the drive member 48C and the ends of the adjoining arcuate projections 66C of the driven member 47C is set to give a central angle of $\theta_l$.

In the torque converter using the drive member 48C and driven member 47C thus far described, too, most of the input torque is transmitted, with the lock-up clutch being engaged, to the output shaft through the drive member 48C and the driven member 47C so that the torsional torque is applied between those two members 48C and 47C. If the input torque is no more than a predetermined torque, the damper springs 50a, 50c and 50d having small spring constants are compressed to establish a relative torsion between the drive member 48C and the driven member 47C. If the input torque further increases, the damper springs 50b are also compressed to prevent the overload. As a result, the vibrations are reduced by the damper springs 50a, 50c and 50d, if the angle of relative torsion between the drive member 48C and the driven member 47C is no more than a predetermined value, and the input torque is absorbed by the damper springs 50a, 50c and 50d if the angle of torsion is no less than a predetermined value. Thus, the spring characteristics change in the two stages.

Figure 35A:
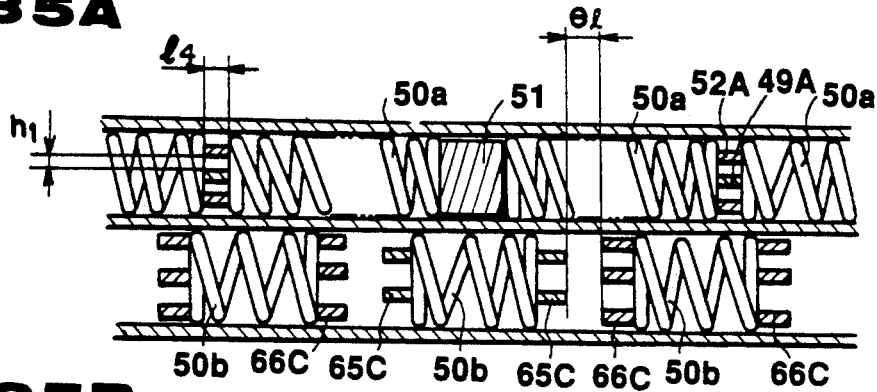
FIGS. 35A to 35D are partial sections showing linear models for explaining the viscous attenuation mechanism in the seventh embodiment.

The operations of those damper springs 50a, 50b, 50c and 50d will be described with reference to the schematic diagrams of FIGS. 35A to 35D. These Figures are expanded views showing the aforementioned individual projections extended linearly. FIG. 35A shows the state, in which no torsional torque is applied. In this state, the stopper projections 49A of the drive member 48C and the push projections 52A of the driven member 47C are completely interleaved on each other, i.e., radially overlapped to have the largest overlapped length $l_4$. On the other hand, the individual arcuate projections 65C and 66C are spaced at the maximum clearance, as expressed in terms of the value $\theta_l$ of the central angle in FIG. 34 and FIG. 35A, i.e., an opening angle $\theta_l$ in the assembled state. Moreover, no compressive force higher than that for the assembly is applied to any of the damper springs 50a to 50d.

Figure 35B:
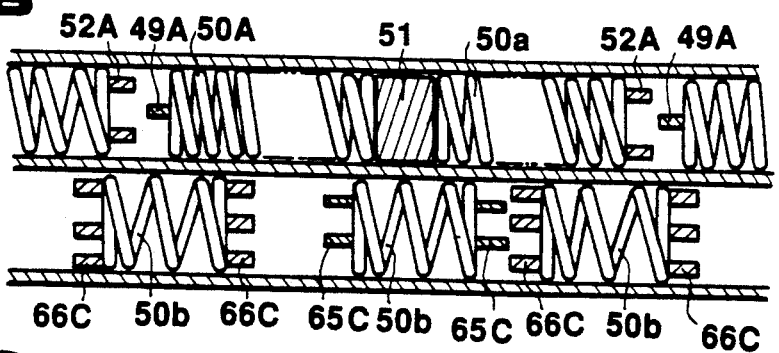

If the torque is inputted to the torque converter, the torsional torque acts upon the damper mechanism so that the drive member 48C and the driven member 47C are twisted. FIG. 35B shows the state, in which the damper mechanism is twisted until the angle of torsion slightly exceeds the central angle $\theta_m$ of the stopper projections 49A. In this state, the stop projections 49A and the push projections 52A are circumferentially moved relative to each other so that their interleaved relations are released. As a result, the damper springs 50a, 50c and 50d are compressed by the stopper projections 49A and the push projections 52A. For a larger angle of torsion, those projections 49A and 52A take an overlapped length of "0". In the state of FIG. 35B, on the other hand, the angle of torsion does not reach the initial angle $\theta_l$ of the individual arcuate projections 65C and 66C yet. As a result, these projections 65C and 66C are not radially overlapped. Nor is applied to the damper spring 50b a compression force higher than that at the time of the initial assembly.

Figure 35C:
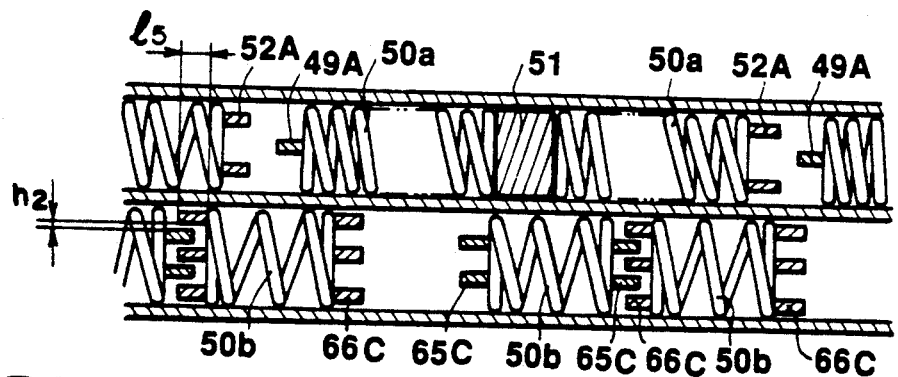

Those projections 65C and 66C begin to be interleaved on each other when the angle of torsion is increased over the initial opening angle $\theta_l$ of the arcuate projections 65C and 66C by the high input torque. This state is shown in FIG. 35C, in which the arcuate projections 65C and 66C come into their grooves so that their overlapped length is gradually increased. At this time, the damper springs 50b are not compressed more than the initial state yet.

Figure 35D:
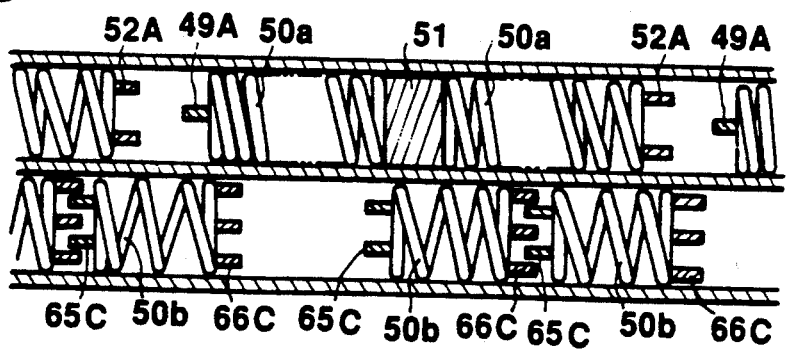

If the angle of torsion exceeds the summed value $(\theta_l+\theta_n)$ of the initial opening angle $\theta_l$ of the arcuate projections 65C and 66C and the central angle $\theta_n$ for the length of the projections 65C and 66C, the mating arcuate projections 65C and 66C come out to the opposite sides so that the damper springs 50b are clamped and compressed by those projections 65C and 66C. This state is shown in FIG. 35D, and the individual projections 65C and 66C have their overlapped length $l_5$ gradually decreased. If the angle of torsion further increases to allow the projections 65C and 66C to come out, their overlapped length is reduced to "0".

Figure 36A:
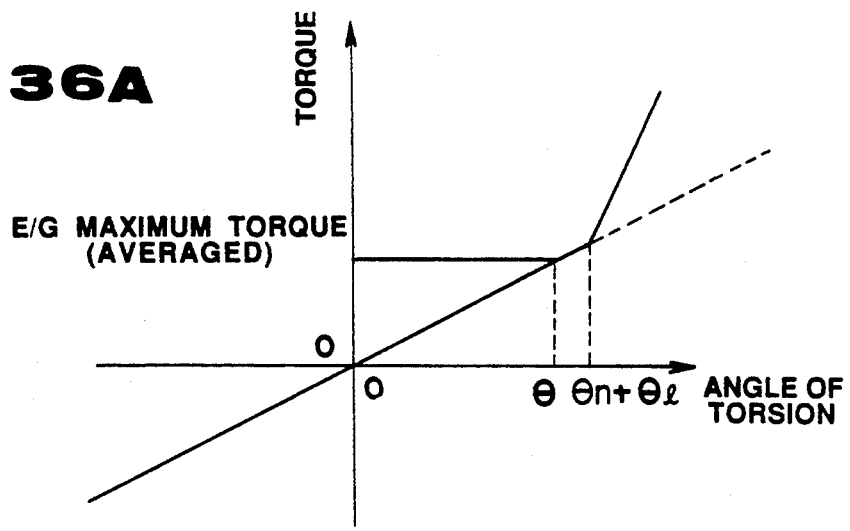
FIGS. 36A to 36C are diagrams showing the viscous attenuation characteristics of the seventh embodiment.

As has been described hereinbefore, the damper springs 50a, 50c and 50d are compressed until the angle of torsion exceeds the value $(\theta_l+\theta_n)$, and both the damper springs 50a, 50c and 50d and the damper springs 50b are compressed when the angle of torsion exceeds. Thus, the spring characteristics of the aforementioned damper mechanism change in the two steps. These characteristics are expressed by a line which is folded at a point for the angle of torsion of $(\theta_l+\theta_n)$, as shown in FIG. 36A. In FIG. 36A, the torque is plotted in the characteristic curve against the angle of torsion. Incidentally, the point of the angle of $(\theta_l+\theta_n)$ in the coordinates will be tentatively called the "changing point".

Therefore, the spring constants of the damper springs 50a, 50c and 50d are so set that the angle of torsion $\theta$ by the averaged maximum torque of the engine inputted to the torque converter may be slightly smaller than the changing point. With this setting, the fluctuations of the input torque from the engine can be absorbed by the tensions and compressions of the drive member 48C to prevent the booming noise which might otherwise be generated by the fluctuations of the engine torque.

In case, moreover, the high impact torque exceeding the averaged maximum torque of the engine is inputted from the wheels running on a rough road, the damper springs 50b having the larger spring constants also begin to be compressed when the angle of torsion exceeds the changing point. As a result, the high impact torque is absorbed by the two kinds of damper springs 50a, 50c and 50d and damper springs 50b so that the angle of torsion cannot grow excessive to prevent the damage of the damper mechanism.

Incidentally, the aforementioned arcuate projections such as the stopper projections 49A and the push projections 52A act not only to push and compress the damper springs 50a to 50d but also to establish the viscous torque. This viscous attenuation will be described in the following.

The aforementioned arcuate projections establish the viscous torque by shearing the highly viscous oil which is confined inbetween. This viscous torque has a magnitude inversely proportional to the clearances $h_1$ and $h_2$ between the projections 49A, 65C, 66C and 52A but proportional to the overlapped lengths $l_4$ and $l_5$ and the velocity difference in the shearing direction.

In the state of FIG. 35A for the angle of torsion of "0 degrees", therefore, the overlapped length $l_4$ between the stopper projections 49A and the push projections 52A is the maximum so that the viscous torque generated by the projections 49A and 52A takes its maximum for the angle of torsion of "0 degrees" if the changing rate of the angle of torsion is constant. Moreover, these projections 49A and 52A are given a length for the central angle $\theta_m$ and are overlapped over the length. If the angle of torsion changes in plus and minus directions from the value "0 degrees", the viscous torque Ta gradually decreases within the range of the angle $\theta_m$.

In the state of FIG. 35B for the angle of torsion exceeding the value $\theta_m$, none of the arcuate projections is overlapped to establish no viscous torque.

This state continues until the angle of torsion exceeds the value $\theta_l$. After this, the arcuate projections 65C and 66C are radially overlapped, as shown in FIG. 35C, so that they establish the viscous torque Tb. The overlapped length $l_5$ of these projections 65C and 66C takes its maximum at the changing point and then becomes gradually shorter. With a further torsion of the length of the projections 65C and 66C, i.e., the angle $\theta_n$ from the changing point, the overlapped length $l_5$ decreases to "0" so that the viscous torque Tb also decreases to "0". In short, the viscous torque by the arcuate projections 65C and 66C takes its maximum at the changing point and gradually decreases across the changing point within a range of $\pm\theta_n$.

As the angle of torsion increases, the relative velocities of the drive member 48C and the driven member 47C decrease. As a result, the viscous torque Tb by the arcuate projections 65C and 66C is lower than the viscous torque Ta by the stopper projections 49A and the push projections 52A.

Figure 36B:
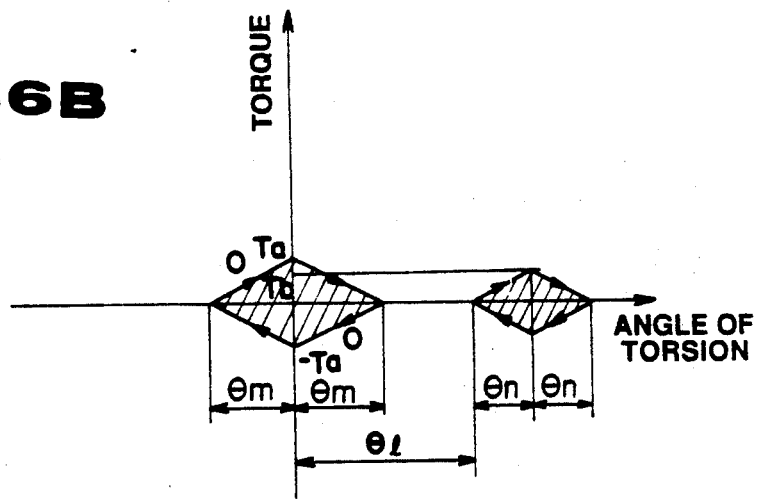

The viscous characteristics thus far described are illustrated in the diagram of FIG. 36B. The viscous torques Ta and Tb are generated within a range of $\pm\theta_m$ around the point of the angle of torsion of "0 degrees" and within a range of $\pm\theta_m$ around the changing point. These viscous torques Ta and Tb decrease the more if the range leaves the farther from the point of the angle of torsion of "0 degrees" and the changing point. Incidentally, the characteristic diagram of FIG. 36B is based upon the assumption that the changing rate of the angle of torsion for each range be constant.

Figure 36C:
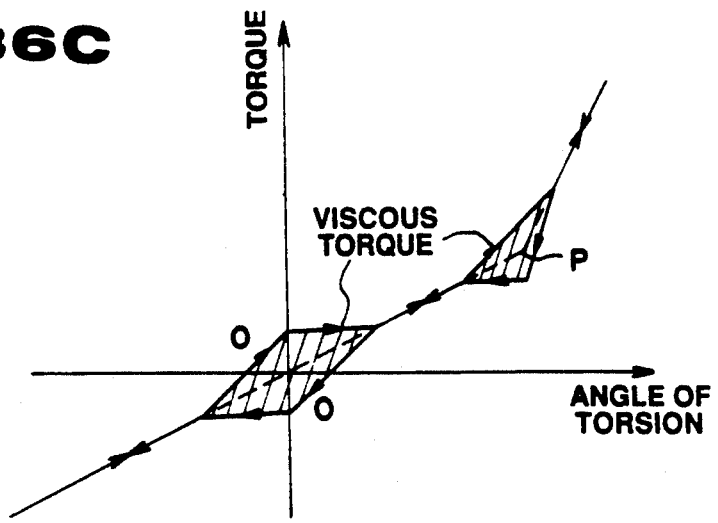

The spring characteristics and the viscous attenuation characteristics thus far described are illustrated together in FIG. 36C. In the torque converter of this embodiment, as seen from FIG. 36C, the viscous attenuation occurs within a range of $\pm\theta_m$ around the point of the angle of torsion of "0 degrees". Moreover, the damper springs 50a, 50c and 50d for reducing the vibrations due to the fluctuations of the engine torque have the small spring constants so that the surging phenomena are liable to occur. However, the viscous torque to be generated at the stopper projections 49A and the push projections 52A acts to suppress the relative twisting actions between the drive member 48C and the driven member 47C to prevent the surging effectively.

If, on the other hand, such impact torque as to increase the angle of torsion over the changing point is inputted, the input torque disappears or abruptly drops so that the damper springs 50a, 50c and 50d and the damper springs 50b are tensed to release the energy. Since, however, the damper springs 50b have relatively large spring constants, its high torsional torque acts until the angle of torsion decreases below the changing point. If this angle of torsion is below the changing point, the torsional torque disappears. The temporary large torque by the elastic energy of the damper springs 50b is similar to a temporary increase of the input torque to the torque converter. As a result, there may occur the surging phenomena, in which the angle of torsion increases or decreases around the changing point, if the damper springs 50b having the large spring constants releases the elastic energy. In the torque converter thus far described, however, the surging can be effectively prevented because the viscous attenuation occurs within a range of $\pm\theta_n$ around the changing point, as shown in FIG. 36C.

Let the case be considered, in which such high impact torque that the angle of torsion exceeds the changing point is inputted. At the instant when the angle of torsion reaches the value $\theta_1$, namely, when the angle of torsion increases to a value which is smaller by the value $\theta_n$ than the changing point for starting the compression of the damper springs 50b, the viscous torque Tb by the arcuate projections 65C and 66C is generated to act as the resistance to the input torque. Since, moreover, the viscous torque Tb gradually increases to the changing point, the resultant phenomena are as if the spring characteristics gradually change from the state of the angle of torsion $\theta_1$. As a result, the aforementioned torque converter is substantially prevented from any abrupt change in the spring characteristics so that neither abrupt change of the output shaft torque nor the accompanying shocks are caused to improve the riding comfort and stability of the vehicle.

Incidentally, it is preferable that the angle of $\theta$ to be established by the averaged maximum torque of the engine is smaller than the initial opening angle $\theta_1$ of the arcuate projections 65C and 66C. Specifically, the viscous attenuation is caused as a result that the kinetic energy is absorbed as the thermal energy by shearing the highly viscous oil. If $\theta < \theta_1$, therefore, a portion of the engine output is hardly absorbed by the attenuation of the arcuate projections 65C and 66C so that the fuel consumption can be prevented from any deterioration.

Next, an eighth embodiment of the present invention will be described with reference to FIGS. 37 to 40. The torque converter of this embodiment is improved over the aforementioned seventh embodiment such that the damper springs are held only in the drive member.

Figure 37:
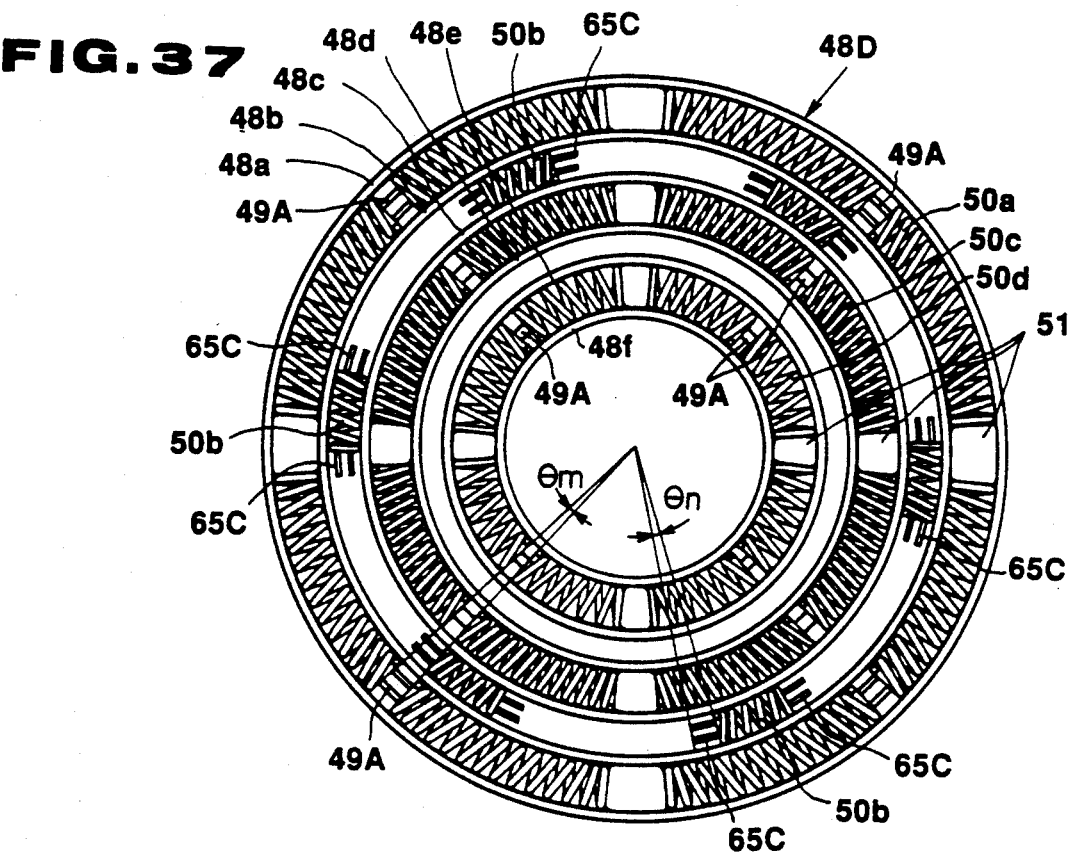
FIG. 37 is a front elevation showing a drive member in an eight embodiment.

This drive member, as designated at 48D in FIG. 37, is arranged at the second portion from the outer circumference with six equidistant damper springs 50b, each of which has its two ends held by a pair of arcuate projections 65C. The remaining structure is identical to that shown in FIG. 32, and its description will be omitted by adding the common reference numerals to FIG. 37.

Figure 38:
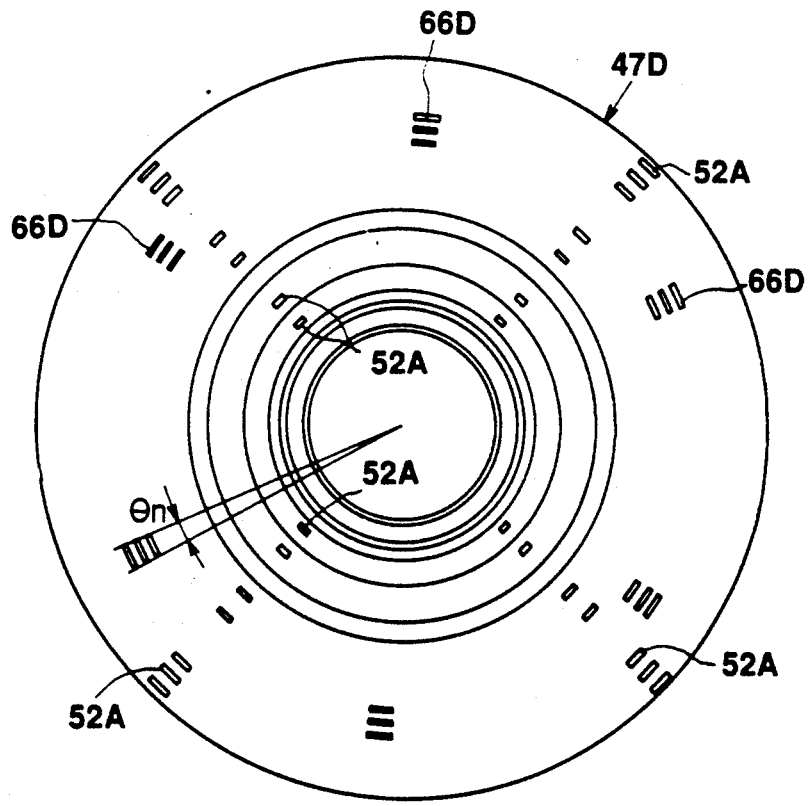
FIG. 38 is a front elevation showing a driven member in the eighth embodiment.

On the other hand, FIG. 38 shows a driven member 47D in the eighth embodiment, which is improved over the driven member 47C shown in FIG. 33. This driven member 47D is provided with six groups each composed of three arcuate projections 66D. These arcuate projections 66D are equidistantly arranged to correspond to the arcuate projections 65C of the drive member 48D. The arcuate projections 66D are given a length to set the central angle at $\theta_n$ like the aforementioned arcuate projections 66C. Moreover, these arcuate projections 66D are arranged between the aforementioned six damper springs 50b. The remaining structure is identical to that shown in FIG. 33, and its description will be omitted by adding the common reference numerals to FIG. 38.

These drive member 48D and driven member 47D are assembled to constitute the torque converter, as in FIG. 9, and the assembly is shown in section in FIG. 39. Incidentally, this section of the torque converter is omitter because it is identical to that of FIG. 1.

In the torque converter thus constructed, the individual damper springs and projections act to suppress the vibrations and prevent the surging phenomena, as will be described in the following.

Figure 40A:
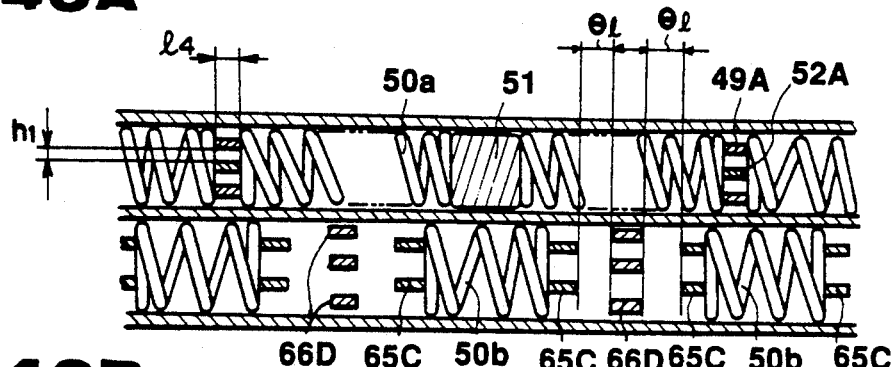
FIGS. 40A to 40D are partial sections showing linear models for explaining the viscous attenuation mechanism in the eighth embodiment.

Specifically, FIGS. 40A to 40D are schematic diagrams similar to FIGS. 35A to 35D. In the state of FIG. 40A for the angle of torsion of "0 degrees", the stopper projections 49A and the push projections 52A are radially overlapped all over their length, and the arcuate projections 66D are positioned between and apart from the arcuate projections 65C. On the other hand, the individual damper springs 50a to 50d are not compressed more than before they are assembled.

Figure 40B:
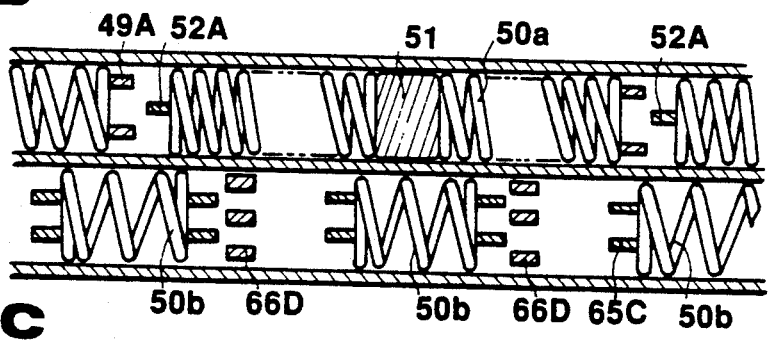

FIG. 40B shows the state, in which the angle of torsion increases immediately before the torque is inputted to overlap the individual arcuate projections 65C and 66D. In this state, the damper springs 50a, 50c and 50d are compressed by the stopper projections 49A and the push projections 52A, and these projections 49A and 52A are prevented from coming out of each other to establish no viscous torque. On the contrary, the damper springs 50b are not loaded, nor overlapped are the individual projections 65C and 66D, so that no viscous torque is established.

Figure 40C:
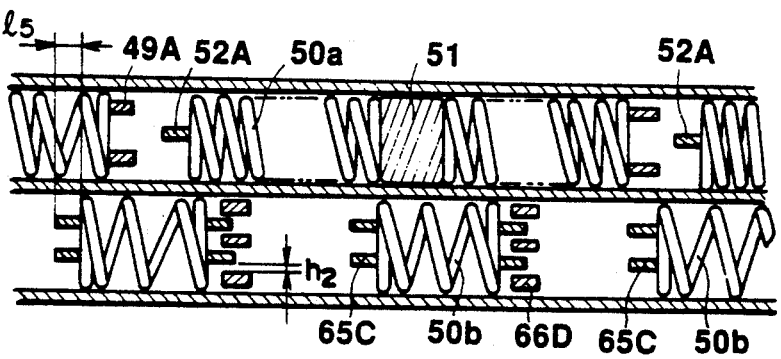

If the angle of torsion further increases, the individual arcuate projections 65C and 66D are radially overlapped, as shown in FIG. 40C, to establish the viscous torque according to their overlapped length $l_5$.

Figure 40D:
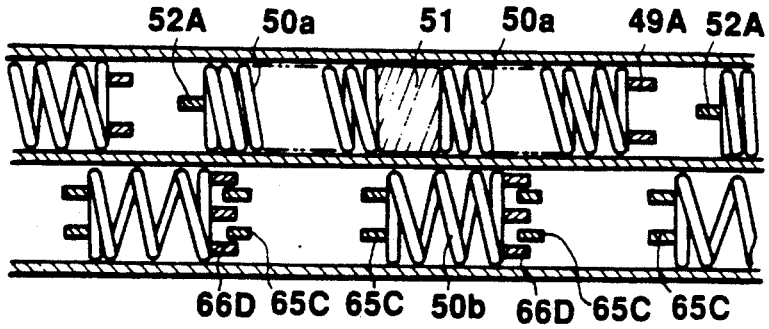

If the angle of torsion exceeds the changing point, i.e., the sum of the initial opening angle $\theta_1$ of the arcuate projections 65C and 66D and the central angle $\theta_n$ according to the length of the projections 65C and 66D, these projections 65C and 66D begin to compress the damper springs 50b so that the viscous torque takes its maximum. If this changing point is exceeded, the overlapped length $l_5$ of these projections 65C and 66D becomes short, as shown in FIG. 40D, and the damper springs 50b are more compressed to reduce the viscous torque gradually.

In this embodiment, too, the booming noise due to the fluctuations of the engine torque can be effectively prevented by reducing the spring constants of the damper springs 50a, 50c and 50d. Moreover, the surging phenomena to be caused by reducing the spring constants can be prevented by the viscous attenuation mechanism 56. Although the spring characteristics change in the two steps, high impact torque is partially absorbed, if inputted, by the damper springs 50b to prevent the overload, and the surging can also be prevented as in the seventh embodiment. In the eighth embodiment thus far described, moreover, the assembling efficiency can be improved because the damper springs 50b are assembled only in the drive member 48D.

FIGS. 41 to 44 show a ninth embodiment of the present invention. In the foregoing seventh and eighth embodiments, the arcuate projections are so equidistantly arranged that the viscous torque is generated when the angle of torsion exceeds the predetermined angle. In addition to this structure, low viscous torque is always established in this ninth embodiment.

Figure 42:
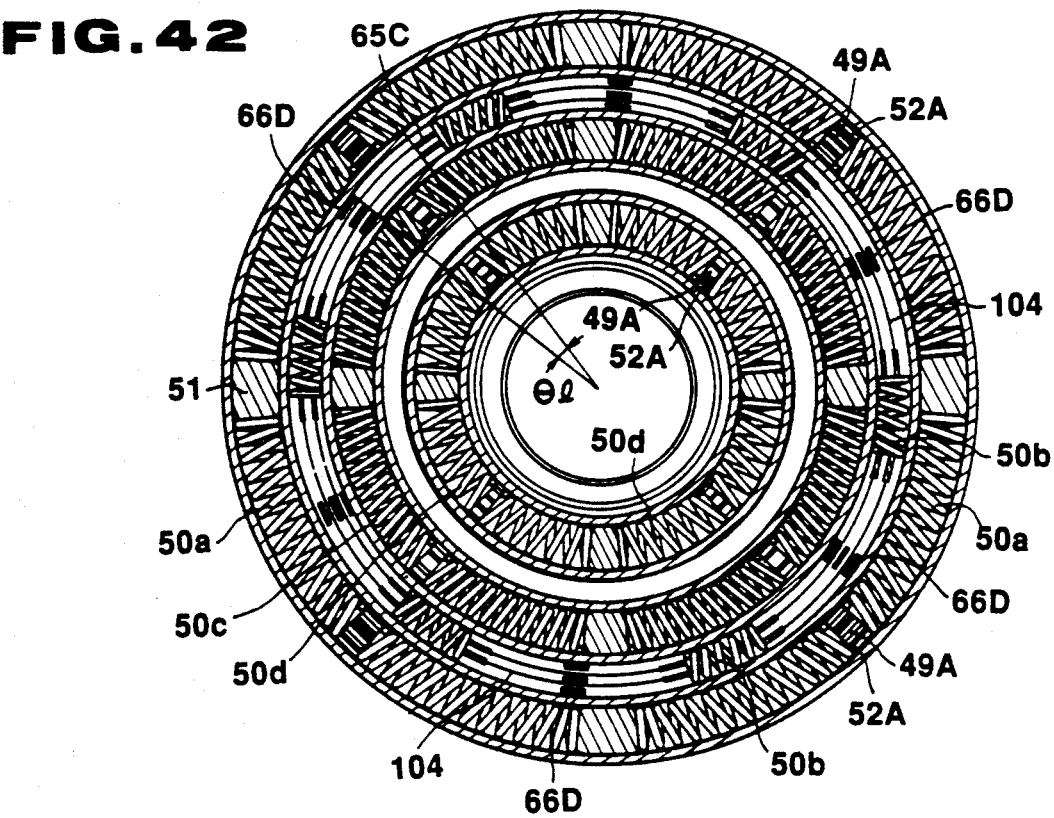
FIG. 42 is a sectional front elevation showing the drive member which is provided with a driven member in the ninth embodiment.

Between the circumferentially adjacent arcuate projections 65C, as shown in FIGS. 41 and 42, there are integrally formed thin and arcuate intermediate projections 104 for engaging those projections 65C. The arcuate projections 66D formed on the driven member 47D are circumferentially moved relative to each other while holding the intermediate projections 104 inbetween at a predetermined clearance. The remaining structure is similar to the aforementioned one of the eighth embodiment. The identical portions or parts are designated at the common reference numerals, and their description will be omitted.

The arcuate projections 66D are relatively moved in accordance with an increase in the angle of torsion according to the input torque from the intermediate positions to the one side of the arcuate projections 65C. These situations are shown in schematic diagrams in FIGS. 43A to 43D similar to FIGS. 40A to 40D. In the states shown in FIGS. 43A and 43B, namely, until the arcuate projections 66D are radially overlapped on the arcuate projections 65C, the arcuate projections 66D and the intermediate projections 104 are circumferentially moved relative to each other to establish the viscous torque. Since, however, the intermediate projections 104 are made thin, the clearances between those projections 66D and 104 are so wide that the viscous torque generated is low.

Figure 43A:
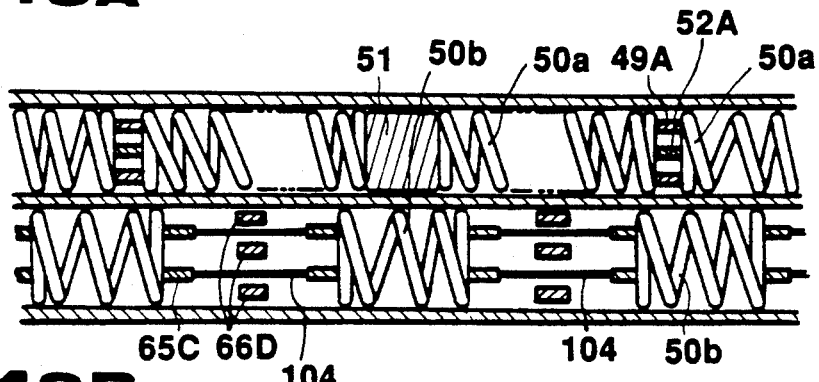
FIGS. 43A to 43D are partial sections showing linear models for explaining the viscous attenuation mechanism in the ninth embodiment.
Figure 43B:
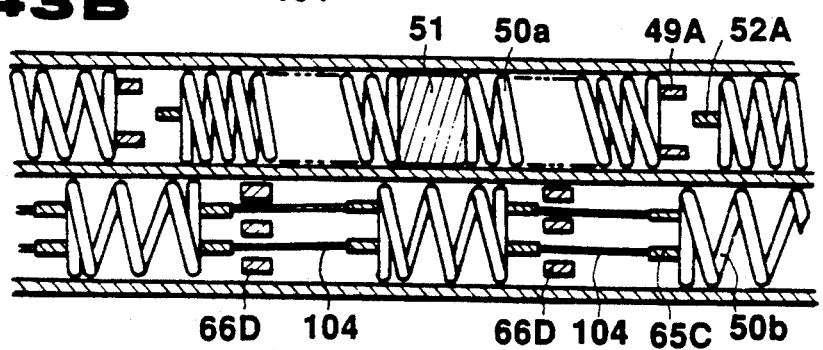
Figure 43C:
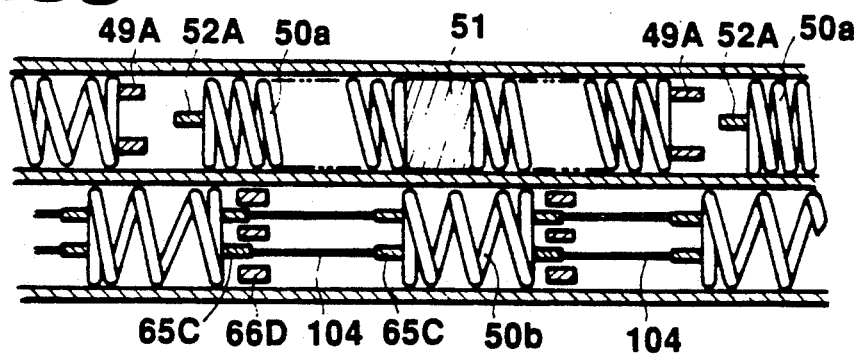
Figure 43D:
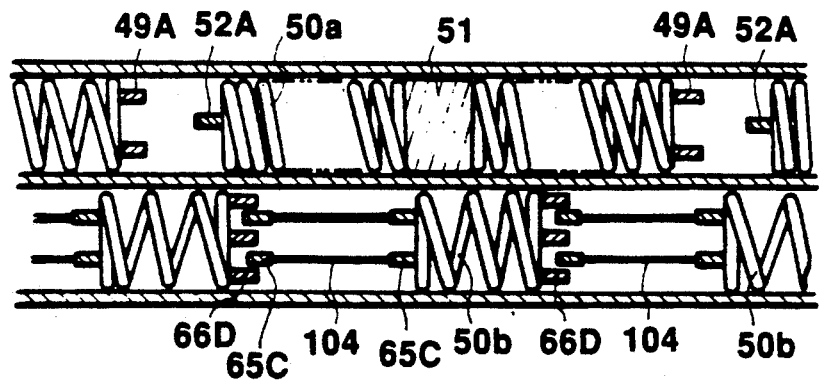
Figure 45:
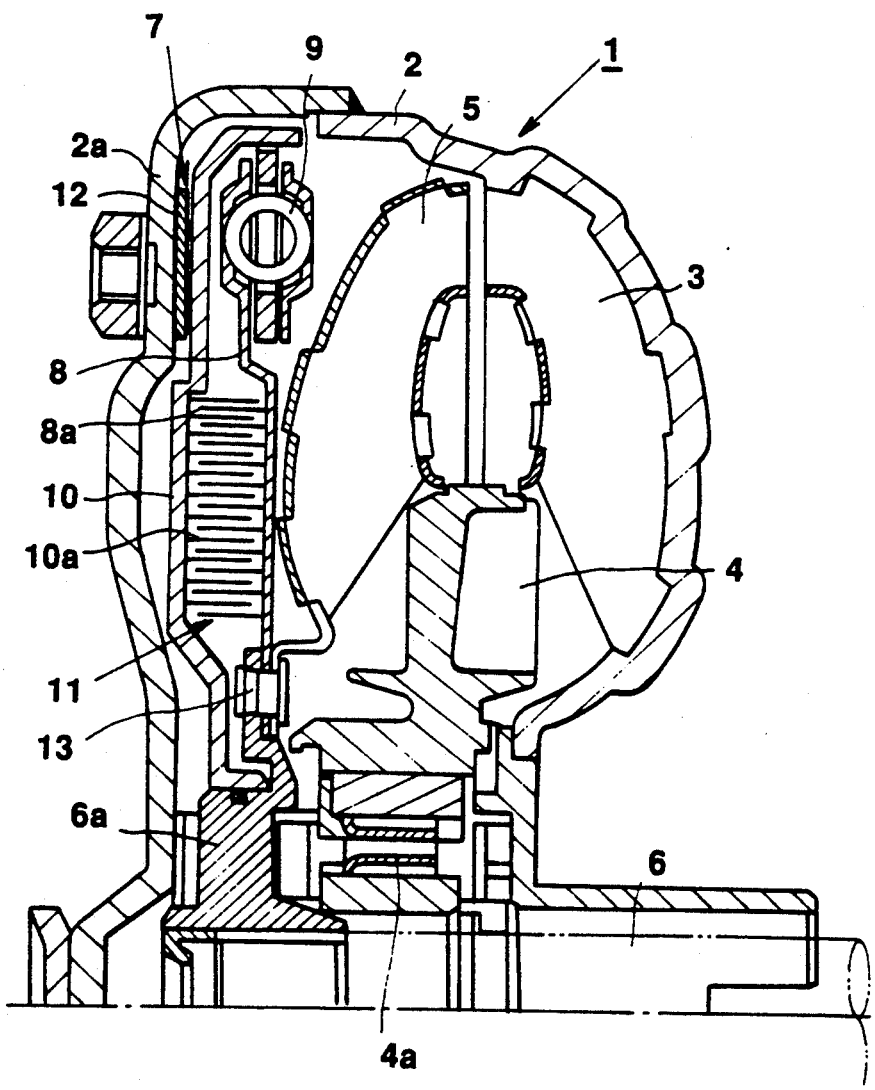
FIG. 45 is a section showing the torque converter of the prior art, which is provided with the viscous attenuation mechanism.
Figure 46:
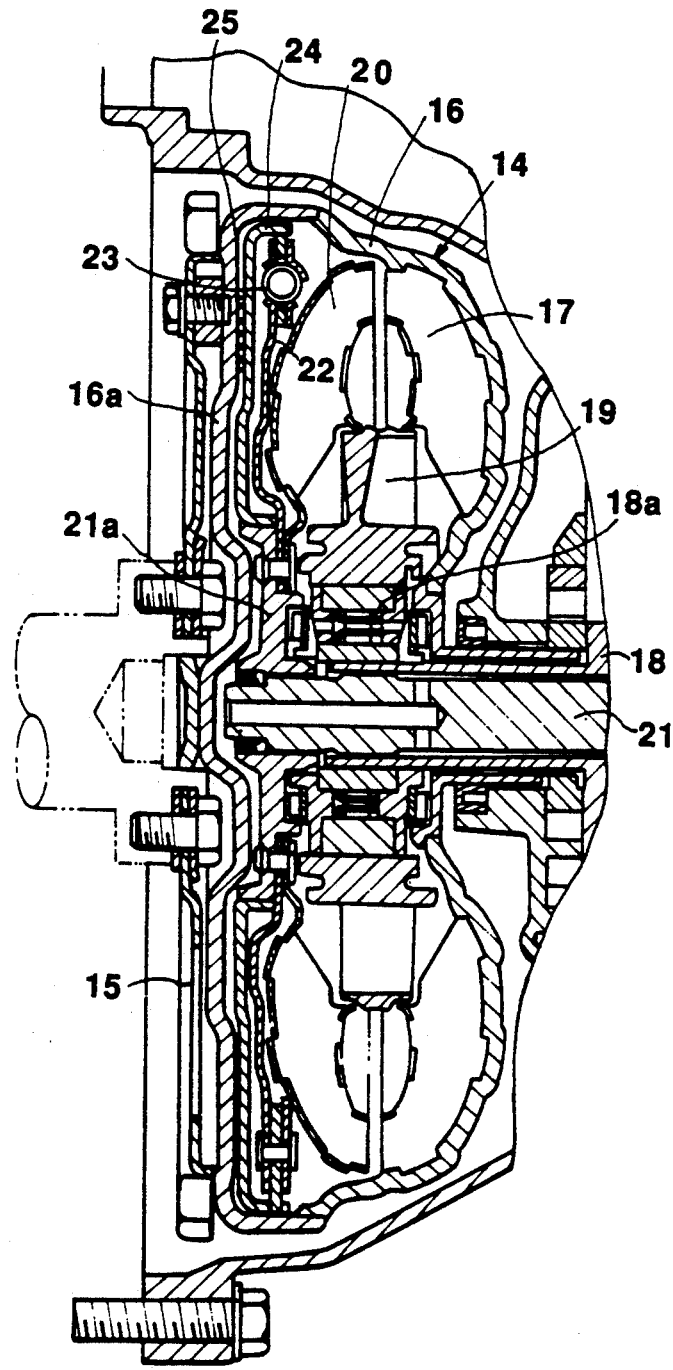
FIG. 46 is a section showing the torque converter of the prior art, which is provided with the lock-up clutch.
Figure 47:
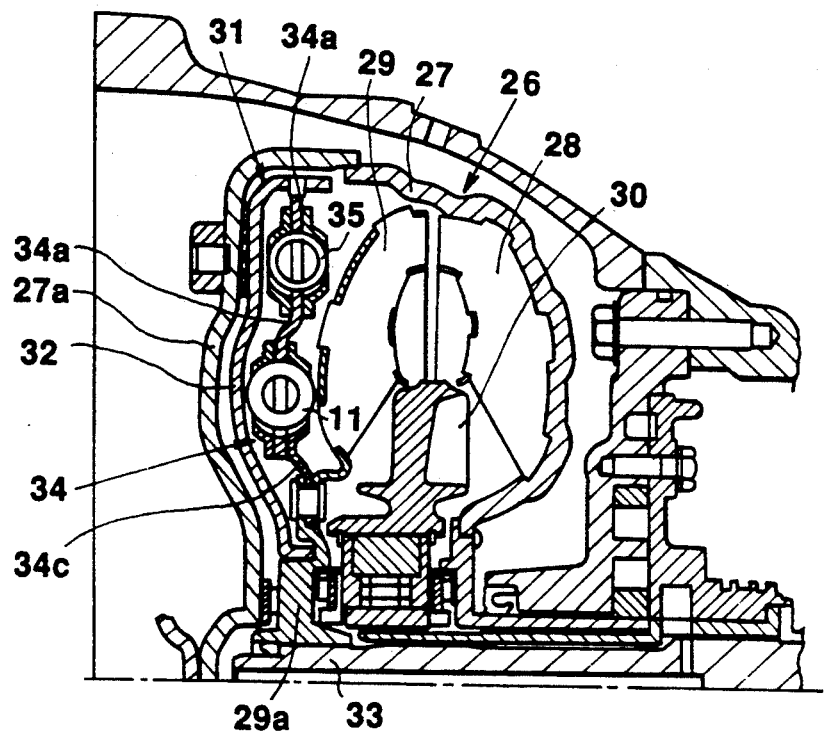
FIG. 47 is a section showing the torque converter of the prior art, which is provided with two sets of damper mechanisms.
Figure 48:
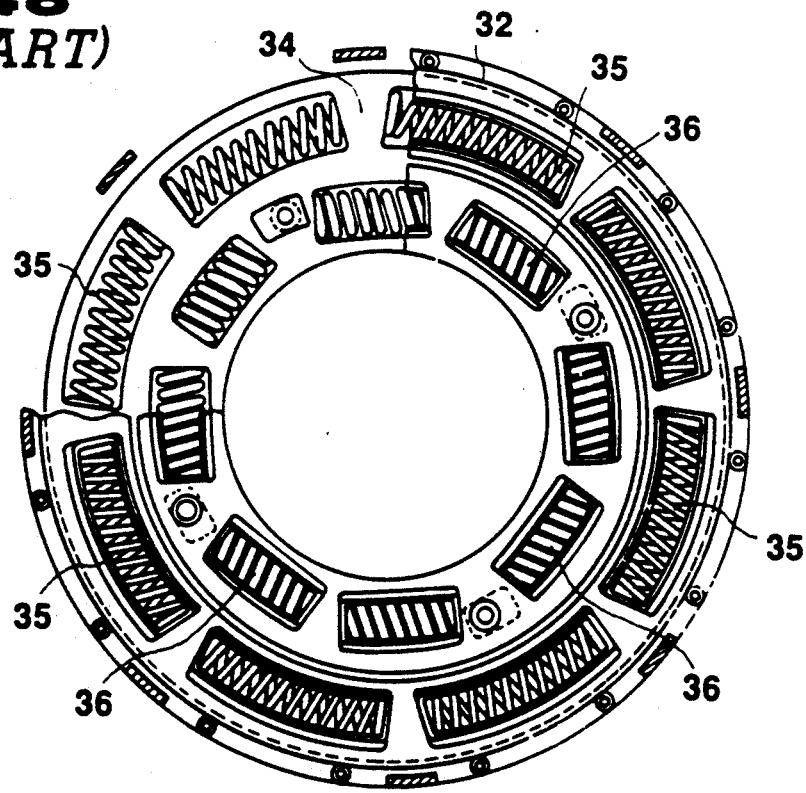
FIG. 48 is a partially broken front elevation showing the damper mechanism.

When the arcuate projections 66D come into the clearances between the arcuate projections 65C, as shown in FIGS. 43C and 43D, the clearances between the two projections 66D and 65C are narrowed because the arcuate projections 65C are thick, so that a relatively high viscous torque is established until the overlap between the two projections 66D and 65C disappears.

Incidentally, both the actions of the damper springs 50a, 50c and 50d and the damper springs 50b and the actions of the stopper projections 49A and the push projections 52A are similar to the aforementioned ones of the eighth embodiment.

Figure 44:
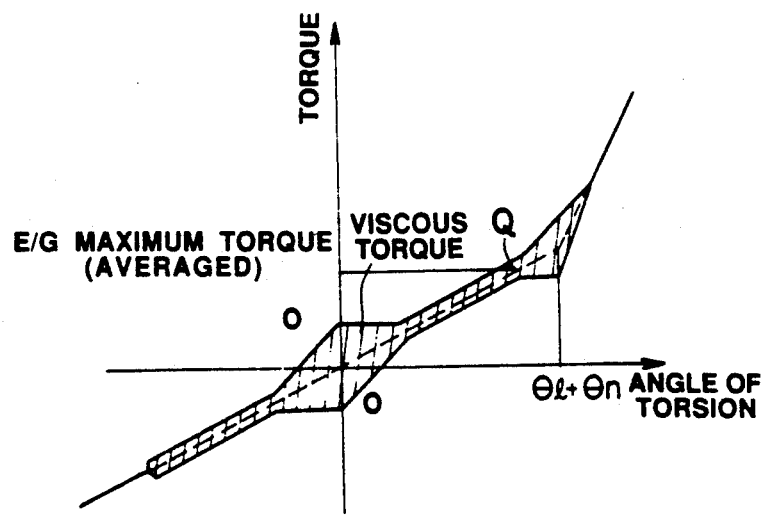
FIG. 44 is a diagram showing the viscous attenuation characteristics of the ninth embodiment.

In the ninth embodiment, as shown in the characteristic diagram of FIG. 44, the viscous torque is established by providing the intermediate projections 104, even within the range, in which the stopper projections 49A and the push projections 52A have a central angle no less than $\theta_m$ and in which the arcuate projections 65C and 66D have an initial opening angle no more than $\theta_1$. As a result, the viscous attenuation is always effected during the run of the vehicle at a rated output of the engine, so that an excellent effect for preventing the surging phenomena due to the fluctuations of the engine torque can be attained. Moreover, it is quite natural that the effects similar to those of the eighth embodiment can also be attained.

In the foregoing individual embodiments, the arcuate projections 65A, 65B, 65C, 66A, 66B, 66C and 66D are equidistantly arranged in the circumferential direction so that the viscous torques may be simultaneously established in several portions. If those projections are arranged at different clearances, the torsional characteristics of two steps can be changed to multiple steps such as three or four steps. If, in this case, there is provided a viscous attenuation mechanism which acts in the vicinity of the characteristic changing point of each spring, it is possible to reduce the shock due to the change in the spring characteristics.

In the foregoing individual embodiments, moreover, the viscous attenuation is caused around the angle of torsion, at which the spring characteristics change. Despite of this fact, however, the present invention should not be limited to those individual embodiments but can be modified such that the angular range for the viscous attenuation may be either within a predetermined angular range lower than the changing point or within a predetermined angular range higher than the changing point. In this modification, the changing point may or may not be contained with the individual angular ranges.

The advantages to be obtained by the present invention will be synthetically described in the following.

Since the spaces for the damper springs can be sufficiently retained, according to the present invention, it is possible to use the damper springs which have small spring constants. As a result, there can be attained an excellent effect to prevent the booming noise. In the viscous attenuation mechanism, moreover, the projections for applying the shearing force to the highly viscous oil are formed substantially all over the drive member and the driven member, which face each other, so that high attenuation characteristic can be obtained. As a result, according to the present invention, there can be attained an excellent effect to preventing the surging phenomena which may result from the fact that the spring constants of the damper springs are reduced. If the torque converter having the lock-up clutch assembled with the damper mechanism of the present invention is used in a vehicle, the lock-up clutch can be engaged without deteriorating the riding comfort even at a low running speed so that the fuel economy can be improved over the prior art.

According to the present invention, furthermore, the drive member formed with the viscous attenuation mechanism is moved together with the drive member in a direction to engage the lock-up clutch. When the lock-up clutch is to be engaged, the clearance between the drive member and the driven member is not enlarged to retain the overlap of the viscous attenuation projections in the axial direction, and the stable viscous torque can be generated for relative rotations, to effectively attenuate the vibrations caused by the fluctuations of the engine torque.

According to the present invention, furthermore, the projections of the viscous attenuation mechanism to be interleaved on each other to establish the viscous torque are formed in such relative positions that they are not overlapped in the radial direction of the drive member and the driven member when the relative angle of rotation of the two members exceeds a predetermined value. As a result, the vibrations to be transmitted through the viscous attenuation mechanism can be cut by setting the interleaving relations of the projections in the booming noise generating range while retaining the attenuation in the vicinity of 0 degrees of the relative angle of rotation, at which the viscous torque to be generated takes its maximum. Thus, it is possible to achieve an excellent effect of preventing the surging and to reduce the booming noise in the medium and low speed ranges. In the vehicle using the torque converter having the lock-up clutch assembled with the damper mechanism of the present invention, the lock-up clutch can be engaged without deteriorating the riding comfort even at a low speed. Thus, the lock-up range can be drastically extended to the low speed side thereby to improve the fuel economy over the prior art.

According to the present invention, furthermore, the arcuate projections of the viscous attenuation mechanism are interleaved on each other to establish the attenuation when the relative angle of deviation of the driven member and the drive member exceeds a predetermined angle. If the input torque fluctuates, the viscous torque generated accords to the magnitude of the fluctuations to damp the shocks due to the abrupt rise of the torque, for example, thereby to effectively reduce the impact torque to be applied to the damper springs. Thus, the load to be exerted upon the damper springs can be suppressed less than the allowable value to prevent the damage of the springs thereby to prevent the shortening of the lifetimes of the damper springs.

According to the present invention, furthermore, the damper mechanism is constructed to have its spring characteristics changing with the increase in the angle of torsion and to establish the viscous attenuation before or after the spring characteristics change. As a result, the surging phenomena in the vicinity of the change in the spring characteristics can be effectively prevented, even if the impact torque inputted is such that the angle of torsion exceeds the angle at which the spring characteristics change. Thus, it is possible to improve the riding comfort and the stability of the vehicle.

What is claimed is:

1. A fluid power transmission system including a pump impeller, a first member integrated with said pump impeller, a turbine runner, a second member integrated with said turbine runner, a lock-up clutch, an annular drive member and an annular driven member, wherein fluid flow established by said pump impeller is fed to rotate said turbine runner, wherein said lock-up clutch is selectively engageable with said first member and is connected to said annular drive member, and wherein said annular driven member is arranged to face said drive member and made rotatable relative to said drive member and is connected to said second member whereby torque is transmitted between said drive member and said driven member, said fluid power transmission system comprising:

- a plurality of first projections arranged at a circumferentially constant clearance on a first surface of said drive member, wherein said first surface faces a second surface of said driven member and wherein each of said first projections has a predetermined circumferential length;
- a plurality of second projections arranged at a circumferentially constant clearance on the second surface of said driven member and wherein each of said second projections has a predetermined circumferential length for meshing with said first projections at a radially slight clearance;
- a plurality of damper springs arranged between a plurality of projections selected from the group including said plurality of first projections and said plurality of second projections and wherein each of said damper springs is adapted to be compressed by said first projections and said second projections; and
- a viscous fluid confined between said first projections and said second projections.

2. A fluid power transmission system according to claim 1,
wherein said first projections and said second projections are formed into arcuate shapes.

3. A fluid power transmission system according to claim 1,
wherein said first projections are concentrically arranged in a plurality of rows on said first surface,
wherein said second projections mesh with said first projections through said fluid and are concentrically arranged in a plurality of rows on said second surface.

4. A fluid power transmission system according to claim 1, further comprising at least two first annular projections formed on one of said first and second surfaces at a predetermined radial clearance,
wherein said damper springs are disposed between said first annular projections and wherein said first projections are formed between said first annular projections.

5. A fluid power transmission system according to claim 4,
wherein two of said damper springs are arranged in series between said first projections,
further comprising a spacer block so arranged between said two damper springs as to move in the circumferential direction.

6. A fluid power transmission system according to claim 1,
wherein said viscous fluid is silicone oil.

7. A fluid power transmission system according to claim 1,
wherein said fluid is automatic transmission oil.

8. A fluid power transmission system according to claim 1, comprising a hollow portion formed between said drive member and said driven member and sealed up liquid-tight,
wherein said first projections, said second projections and said damper springs are arranged in the hollow portion and the viscous fluid is also confined therein.

9. A fluid power transmission system according to claim 8,
wherein said viscous fluid is silicone oil.

10. A fluid power transmission system according to claim 8, further comprising:
an injection hole formed on one of said drive member and said driven member and communicating with said hollow portion; and
a plug member fitted in said injection hole and sealing the same hermetically.

11. A fluid power transmission system according to claim 10,
wherein said plug member is a steel ball which is fixed in said injection hole by caulking the opening of said injection hole.

12. A fluid power transmission system according to claim 1, further comprising a stator arranged between said pump impeller and said turbine runner for controlling the direction of the fluid flowing from said pump impeller to said turbine runner.

13. A fluid power transmission system according to claim 1,
wherein said lock-up clutch includes a friction member attached to said drive member for getting close to and apart from contact with said first member,
wherein said drive member is arranged to moved forward and backward in a direction close to and apart from said first member, and
wherein said driven member is arranged to move forward and backward together with said drive member.

14. A fluid power transmission system according to claim 1,
wherein said first member includes a front cover forming part of a housing accommodating said pump impeller, said turbine runner, said drive member and said driven member,
wherein said front cover is arranged at the side opposite to said pump impeller across said turbine runner,
wherein said drive member is arranged adjacent to the inner surface of said front cover, and
wherein said driven member is arranged between said drive member and said turbine runner.

15. A fluid power transmission system according to claim 14, further comprising a friction member attached to the surface of said drive member facing the inner surface of said front cover,
wherein said drive member is arranged to move forward and backward to the inner surface of said front cover.

16. A fluid power transmission system according to claim 15,
wherein said driven member is arranged to move backward and forward together with said drive member to the inner surface of said front cover.

17. A fluid power transmission system according to claim 14, further comprising a hub fixing the inner circumference of said turbine runner, wherein said driven member is fixed on said hub.

18. A fluid power transmission system according to claim 17,
wherein said driven member is so fixed on said hub as to move in the axial direction.

19. A fluid power transmission system according to claim 18, further comprising an annular sealing member having its inner circumference fixed on said hub and its outer circumference elastically contacting at all times, while holding liquid-tightness, with the surface of said driven member at the side of said turbine runner.

20. A fluid power transmission system according to claim 1, further comprising:
third annular projections formed on said one surface; and
fourth annular projections formed on said other surface and interleaved on said third annular projections at a slight clearance.

21. A fluid power transmission system according to claim 20, further comprising:
a hollow portion formed between said drive member and said driven member and accommodating said third annular projections and said fourth annular projections; and
another viscous fluid confined in said hollow portion.

22. A fluid power transmission system according to claim 21,
wherein said viscous fluid is automatic transmission oil, and said another viscous fluid is silicone oil.

23. A fluid power transmission system according to claim 1, further comprising:
a plurality of third projections arranged on said one surface in radial positions different from those of said first projections and at a circumferentially constant clearance and having a predetermined circumferential length; and
a plurality of fourth projections having a predetermined circumferential length arranged on said other surface in radial positions different from those of said second projections and at a circumferentially constant clearance and meshing with said third projections at a radially slight clearance,
wherein said fluid is confined between said third projections and said fourth projections.

24. A fluid power transmission system according to claim 23,
wherein said third projections and said fourth projections are formed into arcuate shapes.

25. A fluid power transmission system according to claim 3, further comprising:
a plurality of third projections arranged on said one surface at a circumferentially outer side than the circumferentially outermost one of said damper springs and at a circumferentially constant clearance and having a predetermined circumferential length; and
a plurality of fourth projections having a predetermined circumferential length arranged on said other surface at a circumferentially constant clearance and meshing with said third projections at a radially slight clearance,
wherein said fluid is confined between said third projections and said fourth projections.

26. A fluid power transmission system according to claim 3, further comprising:
a plurality of third projections arranged on said one surface at a circumferentially inner side than the circumferentially innermost one of said damper springs and at a circumferentially constant clearance and having a predetermined circumferential length; and
a plurality of fourth projections having a predetermined circumferential length arranged on said other surface at a circumferentially constant clearance and meshing with said third projections at a radially slight clearance,
wherein said fluid is confined between said third projections and said fourth projections.

27. A fluid power transmission system according to claim 23,
wherein said third projections and said fourth projections are circumferentially offset from each other when the angle of relative rotation of said drive member and said driven member is zero.

28. A fluid power transmission system according to claim 23,
wherein said third projections and said fourth projections have different lengths, and
wherein said third projections and said fourth projections are partially overlapped in the radial direction when the angle of relative rotation of said drive member and said driven member is zero.

29. A fluid power transmission system according to claim 1, further comprising:
a plurality of other damper springs arranged on said one surface on the circumference of a radial position different from that, in which said damper springs are arranged, and at a circumferentially constant clearance;
fifth projections having a predetermined circumferential length and formed on said one surface for supporting the two ends of said other damper springs; and
a plurality of sixth projections having a predetermined circumferential length formed on said other surface and interleaved on said fifth projections at a radially slight clearance for pushing the ends of said other damper springs when said drive member and said driven member rotate relative to each other,
wherein said fluid is confined between said fifth projections and said sixth projections.

30. A fluid power transmission system according to claim 29,
wherein said damper springs and said other damper springs have different spring constants.

31. A fluid power transmission system according to claim 29,
wherein said fifth projections and said sixth projections are circumferentially offset from each other when the angle of relative rotation of said drive member and said driven member is zero.

32. A fluid power transmission system according to claim 31, further comprising third damper springs arranged in the same radial positions as those of said other damper springs but in circumferentially offset positions from the same and having their two ends supported by said sixth projections.

33. A fluid power transmission system according to claim 29, further comprising annular projections made thinner than said fifth projections for engaging the ends of those of said circumferentially adjacent fifth projections, which are out of contact with said other damper springs, to each other,
wherein said fluid is confined between said annular projections and said sixth projections.

34. A fluid power transmission system according to claim 1,
wherein said damper springs are arranged in plurality, and
wherein any of said damper springs has a spring constant different from that of the others of said damper springs.

35. A fluid power transmission system according to claim 3,
wherein one of said damper springs in any radial position has a spring constant different from that of the damper springs in other radial positions.

* * * * *

UNITED STATES PATENT AND TRADEMARK OFFICE
CERTIFICATE OF CORRECTION

PATENT NO. : 5,230,409
DATED : 7/27/93
INVENTOR(S) : Koichi Tanaka et al

It is certified that error appears in the above-indentified patent and that said Letters Patent is hereby corrected as shown below:

| Column | Line | |
|---|---|---|
| 2 | 17 | After "6" insert --,--. |
| 2 | 32 | Change "attention" to --attenuation--. |
| 3 | 37 | After "are' insert --brought--. |
| 3 | 43 | After "its" insert --outer--. |
| 3 | 45 | After "its" insert --inner--. |
| 3 | 50 | Change "springs" to --spring--. |
| 3 | 62 | Change "is established as a" to --results from--. |
| 3 | 63 | Delete "result that"; change "is" to --being--. |
| 4 | 11 | Change "one-way" to --one-way--. |

UNITED STATES PATENT AND TRADEMARK OFFICE
CERTIFICATE OF CORRECTION

PATENT NO. : 5,230,409
DATED : 7/27/93
INVENTOR(S) : Koichi Tanaka et al

It is certified that error appears in the above-indentified patent and that said Letters Patent is hereby corrected as shown below:

| Column | Line | |
|---|---|---|
| 4 | 47 | After "cally" insert --,--. |
| 4 | 48 | After "spite" delete "of". |
| 4 | 65 | Change "being" to --is--. |
| 4 | 67 | Change "that" to --and--. |
| 5 | 4 | Change "stand" to --absorb--. |
| 5 | 8 | Change "its" to --sufficient--. |
| 5 | 64 | Change "socking" to --shocking--. |
| 5 | 68 | Change "are invited" to --arise--. |
| 6 | 1 | Change "highly" to --greatly--. |
| 6 | 16 | Change "highly" to --greatly--. |
| 6 | 33 | Change "is" to --are--. |

UNITED STATES PATENT AND TRADEMARK OFFICE
CERTIFICATE OF CORRECTION

PATENT NO. : 5,230,409  
DATED : 7/27/93  
INVENTOR(S) : Koichi Tanaka et al

Page 3 of 7

It is certified that error appears in the above-indentified patent and that said Letters Patent is hereby corrected as shown below:

| Column | Line | |
|---|---|---|
| 7 | 42 | After "drawings" change "be" to --are--. |
| 7 | 43 | Change "be" to --are--. |
| 7 | 58 | Change "sections" to --section--. |
| 9 | 27 | Change "clutch anism" to --clutch, a damper mechanism--. |
| 9 | 31 | Change "42:" to --42,--. |
| 9 | 34 | Change "At" to --AT--. |
| 10 | 18 | After "damper" insert --springs 50a to 50b may be given different spring constants. |
| 10 | 54-55 | Change "supposed" to --expected--. |
| 11 | 51 | After "held" insert --at--. |

UNITED STATES PATENT AND TRADEMARK OFFICE
CERTIFICATE OF CORRECTION

PATENT NO. : 5,230,409

DATED : 7/27/93

INVENTOR(S) : Koichi Tanaka et al

It is certified that error appears in the above-indentified patent and that said Letters Patent is hereby corrected as shown below:

| Column | Line | |
|---|---|---|
| 11 | 66 | Change "these" to --this--. |
| 12 | 15 | Delete "for". |
| 13 | 10 | Change "takes" to --reaches--. |
| 13 | 15 | Change "to raise an effect" to --thus allowing--. |
| 13 | 16 | Delete "that" and change "can" to --to--. |
| 15 | 9 | Change "driven" to --drive--. |
| 18 | 28 | Change "while" to --with--. |
| 18 | 57 | Change "corner" to --cover--. |
| 19 | 11 | Change "4a" to --42a--. |

UNITED STATES PATENT AND TRADEMARK OFFICE
CERTIFICATE OF CORRECTION

PATENT NO. : 5,230,409
DATED : 7/27/93
INVENTOR(S) : Koichi Tanaka et al

It is certified that error appears in the above-indentified patent and that said Letters Patent is hereby corrected as shown below:

| Column | Line | |
|---|---|---|
| 20 | 39 | After "$\theta_2$" delete "(". |
| 20 | 58 | After "overlapped" insert --,--; change "to" to --thus--. |
| 20 | 59 | Change "lish" to --lishing--. |
| 21 | 3 | Change "establish" to --establishing--. |
| 21 | 9 | Change "takes" to --reaches--. |
| 22 | 52 | Change "takes" to --reaches--. |
| 25 | 5 | After "exceeds" insert --the value $(\theta_1 + \theta_n)$--. |
| 25 | 60 | After "overlapped" insert --,--; change "to establish" to --establishing--. |
| 26 | 35 | Change "acts" to --act--. |

UNITED STATES PATENT AND TRADEMARK OFFICE
CERTIFICATE OF CORRECTION

PATENT NO. : 5,230,409

DATED : 7/27/93

INVENTOR(S) : Koichi Tanaka et al

Page 6 of 7

It is certified that error appears in the above-indentified patent and that said Letters Patent is hereby corrected as shown below:

| Column | Line | |
|---|---|---|
| 26 | 54 | Change "releases" to --release--. |
| 27 | 13 | Change "is caused as a result that" to --results from--. |
| 27 | 14 | After "energy" change "is" to --being--; delete "the". |
| 27 | 16 | Change "hardly" to --only slightly--. |
| 27 | 46 | Change "These" to --This--. |
| 27 | 50 | Change "omitter" to --omitted--. |
| 28 | 2 | Change "to" to --thus--. |
| 28 | 3 | Change "establish" to --establishing--. |
| 28 | 4 | Delete "overlapped". |
| 28 | 5 | After "66D" insert --overlapped--. |

UNITED STATES PATENT AND TRADEMARK OFFICE
CERTIFICATE OF CORRECTION

PATENT NO. : 5,230,409
DATED : 7/27/93
INVENTOR(S) : Koichi Tanaka et al

It is certified that error appears in the above-indentified patent and that said Letters Patent is hereby corrected as shown below:

| Column | Line | |
|---|---|---|
| 29 | 45 | Change "Despite" to --Inspite--. |
| 29 | 52 | Change "with" to --within--. |
| 29 | 55 | Delete "synthetically". |
| 29 | 67 | Change "to" to --for--. |
| 30 | 32 | Change "takes" to --reaches--. |
| 30 | 49 | Change "accords" to --corresponds--. |
| 30 | 54 | Before "less" insert --to--. |
| 31 | 12 | After "second member" insert --,--. |
| 32 | 35 | Change "moved" to --move--. |

Signed and Sealed this

Seventh Day of June, 1994

Attest:

BRUCE LEHMAN

Attesting Officer     Commissioner of Patents and Trademarks